United States Patent [19]

Goldwasser

[11] Patent Number: 4,891,786
[45] Date of Patent: Jan. 2, 1990

[54] STROKE TYPING SYSTEM

[76] Inventor: Eric P. Goldwasser, 993 Barberry Rd., Yorktown Heights, N.Y. 10598

[21] Appl. No.: 748,618

[22] Filed: Jun. 25, 1985

Related U.S. Application Data

[63] Continuation-in-part of Ser. No. 719,060, Apr. 2, 1985, and a continuation-in-part of Ser. No. 648,386, Sep. 7, 1984, and a continuation-in-part of Ser. No. 468,493, Feb. 22, 1983.

[51] Int. Cl.[4] .................................. G06F 15/21
[52] U.S. Cl. ........................... 364/900; 364/419; 400/98; 400/83; 341/29
[58] Field of Search ... 364/200 MS File, 900 MS File; 340/365 R, 365 S

[56] References Cited

U.S. PATENT DOCUMENTS

| | | | |
|---|---|---|---|
| 4,310,254 | 1/1982 | D'Angiolillo et al. | 400/109 |
| 4,310,839 | 1/1982 | Schwerdt | 340/365 R |
| 4,333,097 | 6/1982 | Buric et al. | 340/365 R |
| 4,396,992 | 8/1983 | Hayashi et al. | 400/98 |
| 4,417,239 | 11/1983 | Demke et al. | 340/709 |
| 4,459,049 | 7/1984 | Howell et al. | 400/98 |
| 4,464,070 | 8/1984 | Hanft et al. | 400/98 |
| 4,490,056 | 12/1984 | Whitaker | 400/94 |
| 4,498,073 | 2/1985 | Fisher et al. | 400/479 |
| 4,559,598 | 12/1985 | Goldwasser et al. | 364/900 |
| 4,564,301 | 1/1986 | Ueno | 400/63 |
| 4,566,065 | 1/1986 | Toth | 364/300 |
| 4,650,349 | 3/1987 | Westreich | 400/98 |
| 4,655,621 | 4/1987 | Holden | 340/365 S |
| 4,680,572 | 7/1987 | Meguire et al. | 340/365 S |

FOREIGN PATENT DOCUMENTS

| | | | |
|---|---|---|---|
| 48203 | 3/1982 | Japan | 340/365 R |
| 48206 | 6/1982 | Japan | 340/365 R |
| 48312 | 12/1982 | Japan | 340/365 R |
| 48401 | 1/1984 | Japan | 340/365 R |
| 48509 | 9/1985 | Japan | 340/365 R |

OTHER PUBLICATIONS

Published by Stenograph, "Stenograph Theory for Court Reporting", Stenotype Corporation; 1975; Catalog No. 600, pp. v.29.
Words & Living Center III "The Most Powerful Single Switch Argumentative Communication System Ever Developed".

Primary Examiner—Andrew J. James
Assistant Examiner—Viet Q. Nguyen
Attorney, Agent, or Firm—Pennie & Edmonds

[57] ABSTRACT

A storage method and control system for creating linguistic expressions such as natural language text by both sequential and simultaneous keypresses. The system controls a programmable digital processor to receive keypresses from the operator and to translate groups of keypresses to linguistic expressions or not to translate, according to (1) the timing of the keypresses, (2) the presence or absence of a delimiter character at the beginning or end of a group of keypresses, (3) the presence or absence of the group of keypresses in a dictionary of stored groups of keypresses, and/or (4) the sequence of keypresses that preceded or followed the group.

97 Claims, 12 Drawing Sheets

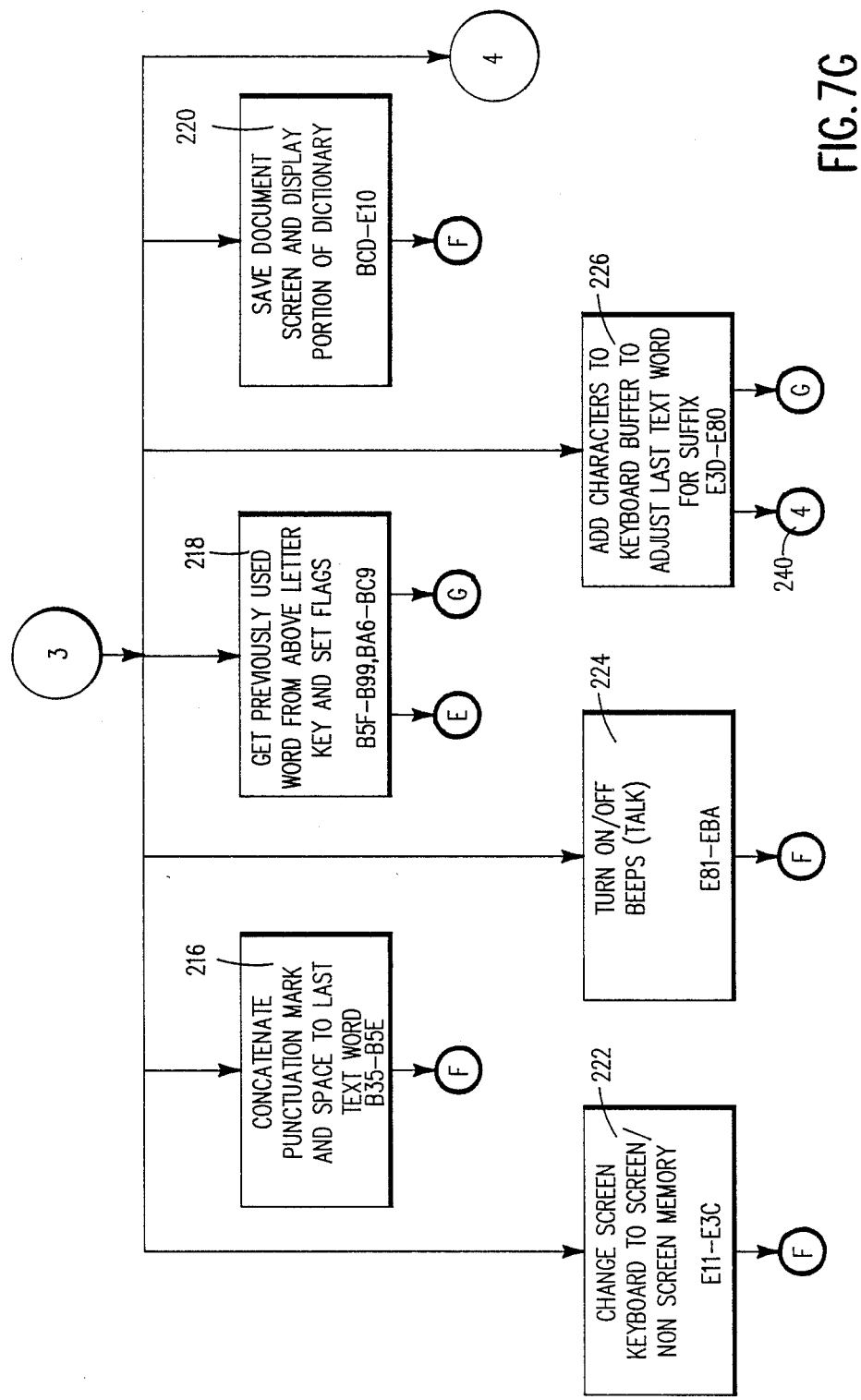

STROKE TYPING SYSTEM

CROSS-REFERENCE TO RELATED APPLICATION

This application is a continuation-in-part of the U.S. patent application of Eric P. Goldwasser, Ser. No. 648,386 filed Sept. 7, 1984 and entitled "Stroke Typing System".

This application is also a continuation-in-part of the U.S. patent application of Eric P. Goldwasser and Dorothy Goldwasser, Ser. No. 468,493 filed Feb. 22, 1983, and entitled "Method of Creating Text Using A Computer".

This application is also a continuation-in-part of the U.S. patent application of Eric P. Goldwasser and Dorothy Goldwasser Ser. No. 719,060 filed Apr. 2, 1985, and entitled "Quasi-Steno Keyboard for Text Entry Into a Computer."

BACKGROUND OF THE INVENTION

1. Field of the Invention

This invention relates generally to text processing systems and more particularly to a method of typing in which whole words or phrases are typed via a keystroke consisting of several simultaneous keypresses and/or a sequence of keypresses.

2. Description of the Prior Art

Stenotyping is a well known method of capturing very rapid speech. By using phonetic abbreviations for syllables and other abbreviations called "arbitraries" for common words, stenotypists can type words by simultaneously pressing keys on a steno machine keyboard. The keypresses are captured on either paper tape, magnetic tape or in a computer memory.

Another well known method of quickly entering text into a computer memory is programmed into the BASIC program of the IBM Personal Computer. By pressing and holding a special shift key and then pressing a second key, the word associated with the second key can be entered into the computer memory. More generally, there exist programs called "keyboard enhancers" which permit a user to define "macros", which are sequence of keypresses to which other longer sequences of keypresses are associated. By typing the shorter sequence, the longer sequence can be entered into the computer memory.

Furthermore, the U.S. Pat. No. 4,464,070 discloses a text entry system for a computer which permits the entry of multiplecharacter words by pressing an individual key on a specially designed keyboard. The keyboard includes a separate "stroke saver" key which, while depressed, invokes the word entry mode. When the stroke saver key is not depressed, the keyboard operates as a conventional keyboard for the character by character entry of text.

Except for direct stenotype entry into a computer, these known text entry systems operate in two distinct "modes": (1) a macro mode in which a word, phrase or command is entered into the system upon typing either a single key or two keys together, and (2) a normal typing mode in which an individual character is entered by typing a single key. Unless special function keys are provided for the direct entry of linguistic expressions, the user must always keep track of the instantaneous mode of operation and press or release appropriate keys to switch back and forth from one mode to the other.

SUMMARY OF THE INVENTION

A principal object of the present invention is to provide an improved method of entering text and/or commands into a computer memory which is both compatible with existing text entry methods and permits the entry of text and/or commands at a much higher rate of speed than is possible with conventional or standard typing.

This object, as well other objects which will become apparent from the discussion that follows, are achieved, according to the present invention, by interpreting individual keypresses on a standard keyboard as either (1) sequential keypresses, which are entered into the computer memory without translation, or (2) as part of a group of keypresses called a "keystroke" which is effectively treated as if it were another, usually larger, group of keypresses. This interpretation is effected by a computer program according to one or more of the following factors: (1) the timing of the ones of the group of keypresses; (2) the presence or absence of one or more delimiter characters at the beginning and/or end of the group of keypresses; (3) the presence or absence of the group of keypresses in a dictionary of stored keypresses; and (4) the sequence of keypresses that preceded or followed the group.

For example, the program may calculate the elapsed time between an individual keypress and either the preceding keypress or the first keypress of a group of keypresses. If the elapsed time between prescribed keypress and/or key release events is less than a threshold value, and/or the current keypress is not a delimiter keypress, then the current keypress may be stored in a buffer along with previous keypresses which also occurred within the threshold or after a delimiter. When the first of a group of such stored keypresses is released or the delimiter keypress or release is reached, the keystroke, consisting of the group of stored keypresses that occurred within the threshold or before the delimiter, is translated into another group of keypresses which is entered into the computer memory instead of the individual keypresses which comprise the keystroke.

Although the method according to the present invention is particularly adapted to the entry of text in a word processing system, it will be understood that it is equally adaptable to the entry of individual commands such as program instructions, commands for operating applications programs and the like. In order to avoid the repetitious use of the expression "text and/or commands", the word "text" will hereinafter be used to denote both conventional text, such as English language text, and computer commands. In all cases, the "text" consists of individual "words" as well as punctuation marks and spaces which are formed of symbolic characters; i.e., the characters which are designated on the individual keys of a standard keyboard. For example, the symbolic characters may be the so-called "alphanumeric" characters which include upper and lower case letters, numbers as well as punctuation marks and the "space" character.

In accordance with the present invention, the individual words, punctuation marks, and spaces form prescribed "linguistic expressions" which may be commonly used words (one word per linguistic expression) or phrases (two or more words per linguistic expression). The linguistic expressions may include a space character at the end of the word or phrase.

The improved method according to the present invention may be used with a standard digital computer system having a central processing unit, a memory, a character imaging device such as a CRT display and a standard character keyboard capable of sensing keypresses by the system operator that designate individual characters, such as alphanumeric characters, each of which is identified in the computer system by an associated character code. The digital computer system is operated with its own, conventional "operating system" software as well as any "word processing" software or other applications program which requires the entry of text. The present invention serves to enter text into a "text buffer" section of its random access memory. From the text buffer, the text is passed to a display refresh buffer which serves to maintain the image of the text on the associated display screen.

More particularly, the method according to the present invention comprises the steps of:

(a) storing in the memory of the computer a vocabulary of linguistic expressions each of which is comprised of at least two characters which are respectively identified by "first" character codes;

(b) storing in the computer memory a vocabulary of abbreviations called "keystrokes", each keystroke being associated with at least one linguistic expression and comprising at least two characters which are respectively identified by "second" character codes;

(c) accepting keypresses from the keyboard and, in response to each keypress, storing a "third" character code in the computer memory identifying the character designated by that keypress; and (d) determining with respect to successive keypresses:

(1) whether such successive keypresses are associated with a keystroke, whereby their respective third character codes designate, at least in part, a particular keystroke; or (2) whether at least one of the successive keypresses is not associated with a keystroke, whereby its respective third character code designates an associated individual character.

If the keypress under consideration is associated with a keystroke, then this keystroke, and thereby its associated linguistic expression, is identified by retrieving the second character codes of the keystroke, and the characters comprising the linguistic expression are imaged on the display screen using the first character codes which identify its characters. The imaged characters are concatenated with the text characters previously imaged on the display screen.

On the other hand, if the keypress under consideration is not associated with a keystroke, typically because it is typed alone, that is, without being a part of a keystroke, then the character associated with that keypress is imaged on the display screen, using the third character code which identifies this character. As in conventional text processing, the imaged character is concatenated with the text characters previously imaged on the display screen. In this way, the user is permitted to type in the normal mode or to perform "stroke typing" according to the invention, without having to press a control key or otherwise indicate to the software program that a particular keypress is simply the input of a single character or is part of a keystroke.

As mentioned above, the symbolic characters designated by the keypresses may be alphanumeric characters, which include letters, numbers, punctuation marks and a space. Preferably, the successive keypresses that comprise a keystroke designate a letter in the respective linguistic expression plus at least one other alphanumeric character, such as a number or a space. Thus, for example, the linguistic expression "the" plus a space may be entered into the computer by typing "t" and "slash", or by typing "t" and "space", substantially simultaneously.

The present invention thus facilitates the rapid entry of text into a computer system without interfering, in any way, with the normal typing capability and features of the machine. The rapid entry of text is made possible by the typing of so-called "keystrokes", which are respectively associated with so-called "linguistic expressions" that are entered into the computer and concatenated with the current line of text. The present invention is therefore denominated a "stroke typing system".

The method of interpreting whether or not successive keypresses are associated with a keystroke (or whether they represent successive characters in a standard typing mode) is preferably implemented by one or more of the following "algorithms":

(1) The determination as to whether or not successive keypresses are associated with a keystroke may be made in accordance with the timing of the keypresses. In this case, the algorithm keeps track of the instants of time that each key is depressed ($T_P$) and/or released ($T_R$). In any given sequence of keypresses, it is possible to determine one or more of the following:

$$(T_P - T_{PO}) < T_1,$$

$$(T_R - T_{RO}) < T_2,$$

$$(T_R - T_P) > T_3.$$

In the first of these formulae, the determination is made whether the respective instants of time that the successive keyboard keys are depressed fall within a respective first time window ($T_1$). In this case, $T_P$ is the instant of time that the current keyboard key is depressed, and $T_{PO}$ is the instant of time that either the previous keyboard key or the first keyboard key (that has not yet been released) was depressed.

Similarly, the second formula requires that the respective instants of time that the keys, in a group of key depressions, are released fall within a prescribed second time window ($T_2$). This test is advantageous because, when two or more keys are "stroked", they are normally released substantially simultaneously.

Finally, as an alternative or in addition to the tests with respect to the time windows $T_1$ and $T_2$, each key may be tested to determine whether the period during which it was depressed ($T_R - T_P$) exceeds a prescribed third time window ($T_3$). This test is advantageous because, when several keys are "stroked" together they are normally depressed for a longer period of time than when individual keys are depressed.

It will be appreciated, from the description above, that the determination as to whether a keypress is associated with a keystroke depends on the individual time windows $T_1$, $T_2$ and $T_3$. According to a particular feature of the present invention, these time windows may be of different length for different keystroke characters (since certain characters are normally depressed for a longer period of time than others, during standard typing) and for different users of the text entry system (in accordance with the respective typing skill of each operator). According to a still further preferred feature of the present invention, the time window(s) are automatically adapted to the user of the text entry system in dependence upon the skill of the user and in response to prompts by the user.

Still another method of determining whether or not successive keypresses are associated with a keystroke, which depends upon the timing of each keypress (both the instant of time of depression ($T_P$) and time of release ($T_R$)) involves determining whether all the instants of time of depression for a sequence of keypresses precede all the instants of time of release. In this case, it is assumed that, with a keystroke, all the keys associated with that keystroke will be depressed before any of such keys are released.

(2) A second method according to the invention for determining whether or not successive keypresses are associated with a keystroke involves the use of a known "delimiter character" which may, for example, be a space or a slash character. If a key which designates such a delimiter character is depressed in succession with other alphanumeric keys, and if the sequence of characters, designated by the keypresses, are capable of being translated into a linguistic expression, then the sequence of keypresses is determined to be a keystroke.

For example, if the delimiter character is a space, and the computer system user types keys designating "n", "o", and "v" plus a "space", and if the sequence "nov-space" has been previously designated as a translatable keystroke, then this sequence of keypresses is determined to be a keystroke. As an example, this keystroke could be translated into the linguistic expression "November".

(3) A third method according to the invention for determining whether a keypress is associated with a keystroke may be implemented by attempting to translate all the characters in the computer keypress buffer into a linguistic expression, upon release of each key, whenever two or more characters are present in the keypress buffer. Thus, when only one key has been depressed and then released, it is assumed that the standard typing mode has been invoked, and the designated character is simply concatenated with the text characters previously imaged on the character display screen. However, when two or more keys are depressed before one of these keys is released, an attempt is made, upon release of each key, to translate the contents of the keypress buffer into a linguistic expression. If the contents do not appear in the dictionary of keystrokes, then it is assumed that the standard typing mode has been invoked. If the sequence of keypresses does appear in the dictionary, they are considered to be a keystroke and the associated linguistic expression is concatenated with the text characters previously imaged on the character display screen.

(4) A fourth method according to the invention for determining whether a keypress is associated with a keystroke involves checking the sequence of keypresses that preceded this keypress. For example, if the operator types the characters "b", "e", and "a" sequentially and then strokes the characters "u" and "space" simultaneously, the stroke "U-space" may be translated to the linguistic expression "utiful-space" so that when this linguistic expression is concatenated to the text, the word "beautiful" and a following space will have been added to the text by a combination of individual sequential keypresses followed by a keystroke. Another example involves the punctuation character "comma". If the operator has just stroked a word and then strokes "comma-space", the characters "backspace", "comma", "space" will be added to the text to put the comma immediately after the last character of the text word rather than after the space that follows the last text word. However, if individual keypresses preceded the "comma-space" stroke, then the "comma" and "space" keypresses will be interpreted as two individual keypresses and their associated characters will be added to the text in the order in which the keys were pressed.

While these four methods or "algorithms" for determining whether a keypress is associated with a keystroke have been described herein as preferred embodiments of the present invention, it will be appreciated that other, equivalent algorithms may also be used. All such algorithms which are capable of automatically making the determination as to the presence or absence of a "keystroke", invoking the image of multiple characters on the character imaging device, are considered to be within the scope of the present invention.

In another preferred and advantageous feature of the present invention, linguistic expressions may be imaged as a result of either typing a single keystroke or by initially typing a portion of the linguistic expression in a normal typing mode followed by either the same or a different keystroke. This feature is helpful to the user who is unable to recall the keystroke for the linguistic expression. After typing an initial portion of the linguistic expression, the group of characters forming the keystroke may be highlighted on the display screen to call attention to the fact that the word or phrase is a linguistic expression. Thereafter, the user may type, for example, one further letter in the linguistic expression plus at least one other alphanumeric character such as a space, to complete the entry of the linguistic expression.

In still another preferred and advantageous feature of the present invention, the linguistic expressions include suffixes of inflected forms of root words and the system operates to adjust the spelling of a previously imaged root word and the suffix, when the suffix is a linguistic expression, to form a correctly spelled inflected form of the previously imaged root word. For example, the linguistic expression, and suffix, may be the plural form of a noun. By typing the keystroke for the plural form (which may, e.g., be "s-slash") the system changes the root word to its plural (e.g., "country" to "countries" or "mouse" to "mice"). This feature may be invoked whether or not the previously imaged root word was entered by normal typing (character by character) or was itself a linguistic expression that was entered by means of a keystroke.

In still another preferred and advantageous feature of the present invention, the linguistic expressions include a word or phrase plus a space, thereby eliminating the need for typing the space bar following the linguistic expression. Thus, for example, the word "the" plus a space may be entered by depressing the keys designating "t" and "space" substantially simultaneously (whereas in normal typing this expression would require the successive depression of keys representing "t", "h", "e" and "space").

In still another preferred and advantageous feature of the present invention, new linguistic expressions may be added to the system automatically in dependence upon their frequency of use. In particular, the system preferably keeps track of the frequency of usage of words or phrases which are entered by normal typing (i.e., character by character). The most frequently used words or phrases may be adopted as new linguistic expressions either automatically or in response to a prompt by the user. In the latter case, the user may be queried by the system by means of a screen image or by tones or spoken words produced by the system loudspeaker.

When a new linguistic expression is adopted, both it and an associated keystroke are stored in the system memory. The keystroke may be chosen by the user to be easily typed and easily remembered.

In still another preferred and advantageous feature of the present invention, a representation of the character keyboard is imaged on the display device, with the keyboard characters imaged in the same relative positions as they appear on the keyboard. In addition, one or more linguistic expressions are displayed above or below each key, with the linguistic expressions that are imaged adjacent a key being associated, in some way, with that key.

For example, beneath the key with the letter "t" on the screen keyboard, may be imaged the linguistic expression "the" (it being understood that the entire linguistic expression is "the-space"). This display is thus a memory aid for the user who will recall that pressing the character "t" plus the spacebar substantially simultaneously will call forth the linguistic expression "the-space".

The term "screen keyboard" will be used hereinafter to denote the keyboard which is imaged on the display screen (in contrast with the conventional, physical keyboard which is used for typing). The term "screen keyboard" will sometimes be abbreviated hereinafter as "skeyboard".

As indicated above, the linguistic expressions imaged adjacent to associated skeyboard characters may have a character in common with the skeyboard character with which they are associated. This common character may be the initial character of each linguistic expression or may be a character subsequent to the initial character. In the latter case, all of the displayed linguistic expressions may commence with the same initial character. The system user may invoke this display by typing a desired initial character (for example "t") in the normal manner (standard typing). Thereafter, up to 36 linguistic expressions (one for each alpha character and one for each number from 0-9), all commencing with "t" may be displayed on the skeyboard. If desired, more than one linguistic expression may be displayed in association with each key.

Preferably, the characters of each displayed linguistic expression which are used in its associated keystroke are displayed in a different manner than the remaining characters of that linguistic expression. For example, the characters used in the keystrokes may be displayed with greater brightness than the remaining characters. Furthermore, if a space is used in the keystroke associated with the displayed linguistic expression, the differently displayed characters may include a symbol representing a space.

In addition, or as an alternative, the characters of each displayed linguistic expression which are used in its associated keystroke are displayed in the text in a different manner than the remaining characters of that linguistic expression. Thus, no matter whether the linguistic expressions are entered by the user by normal typing or by means of keystrokes, the user may readily see which ones of the words and phrases in the text correspond to predetermined linguistic expressions and may also see the keystrokes that may be typed to call up these linguistic expressions by "stroke typing".

In still another preferred and advantageous feature of the present invention, a keyboard is used which includes a key capable of switching a mode between "on" and "off" states. (Alternatively, a keystroke may be used for this purpose.) For example, in the keyboard associated with the IBM PC, the "Alt" key arranged immediately to the left of the spacebar may be used for this purpose. With such a keyboard, the imaging of the screen keyboard may be implemented only when the mode is in the "on" state so that the system is responsive to the state of the mode for imaging or not imaging, respectively, the skeyboard. With this arrangement, the user may bring up the skeyboard at will for assistance in training and may remove the skeyboard from the screen after having been trained or when invoking standard typing.

A principal advantage of the skeyboard as thus employed is that the user is permitted to begin stroke typing according to the invention immediately, without completing any sort of training program. That is, the skeyboard at all times displays the options available to users to stroke type words. As the user gains further familiarity with the system, its advantages will be more readily used and will permit more efficient stroke typing. However, the advantages of the invention begin accruing to the user immediately.

Typical prior art systems require the user to indicate by way of a mode switch or the like whether a particular keypress is to be interpreted as the input of a single character code or is intended to retrieve a word from a dictionary of stored words. This requires that the user knows which words are stored, or consult a dictionary of stored words. By comparison, the system of the present invention signals the user, even after having begun typing the word in the ordinary fashion, that he can complete the word by stroke typing it according to the invention. In this way, the user need never concern himself with the mode of typing; instead, when a particular word can be conveniently stroke-typed, the system will simply so indicate to the user, as described immediately below. This greatly eases the education of the user to the advantages provided by the system. As noted, this is a significant improvement over typical prior art systems, which require extensive training programs and/or memorization of lists of stored words before they can be effectively used.

In still another preferred and advantageous feature of the present invention, an audible sound is produced after at least one character of a linguistic expression has been entered into the system by the user by means of standard typing. Such sound is intended to alert the user that he/she is typing a linguistic expression which can be entered into the system by means of a keystroke. The audible sound may be, for example, at least one beep tone. The beep tones may indicate, by number and/or pitch, the position of the character or characters of the linguistic expression which are contained in the associated keystroke after the entire linguistic expression has been entered. For example, a single beep tone may indicate the letter "t" in the linguistic expression "the-space".

Alternatively, the audible sound may be a synthesized voice pronouncing the character or characters of the linguistic expression which are contained in the associated keystroke after the linguistic expression has been entered.

In still another preferred and advantageous feature of the present invention, the system operates to allow a user to add a word or phrase to the vocabulary of linguistic expressions by first entering this word or phrase by standard typing. Following entry of the word or phrase, typed character by character, the user enters a prompt, by depressing one or more keys on the keyboard, which instructs the system to add the word or phrase to the linguistic expressions stored in memory.

If only one word is to be entered as a linguistic expression, the prompt may be the keystroke consisting of a space and a slash. If two or more words are to form the linguistic expression, the prompt may be a keystroke consisting of at least one alphanumeric character plus a number. The alphanumeric character(s) designate(s) the key entry as being a prompt and the number designates the number of words which are to be added to the vocabulary of linguistic expressions as a single linguistic expression.

For example, if the user has typed, by standard typing, the sentence:

"Let's go for a ride in the country."

After typing this sentence, the user may wish to designate the phrase "in the country" as a linguistic expression. If so, he/she may stroke "/3", whereupon the phrase "in the country" is added to the vocabulary of linguistic expressions. If, by mistake, the user types "/2" or "/4", thereby designating too few or too many words in the linguistic expression, this error may be corrected, according to a further feature of the invention, by stroking the keys representing a "+" and a space to add one word to the linguistic expression, or stroking the keys representing a "−" and a space to subtract a word from the linguistic expression.

After adding the word or phrase to the vocabulary of linguistic expressions, either the system or the user must define the "keystroke" which is to be used to call up this linguistic expression. This system may do this automatically or this keystroke may be entered into the system by typing, character by character, the individual characters which form the keystroke. For example, if the linguistic expression includes only one word, the new keystroke may comprise the first letter of this word plus a number. If the linguistic expression includes two or more words, the new keystroke may comprise the first letter of the first word, plus a space, plus a number. Alternatively, the new keystroke may comprise the first letters of each one of the words of the linguistic expression.

In still another preferred and advantageous feature of the present invention, the linguistic expressions may be quickly searched and found by associating with each keystroke an address code which is the address of the linguistic expression in memory. This technique permits rapid linking of keystrokes and linguistic expressions, thus minimizing the delay between entry of keystrokes and imaging of their respective linguistic expressions.

In still another preferred and advantageous feature of the present invention, a word spelling help method is provided to assist users of the computer system in entering correctly spelled words. According to this method, a dictionary of correctly spelled words is stored in the computer memory, with each word being defined by a plurality of characters identified by respective "first" character codes. Thereafter, keypresses are accepted from the keyboard and, in response to each keypress, a "second" character code is stored in the memory identifying the character designated by that keypress. The computer displays the successive characters which are entered via the keyboard and identified by the respective "second" character codes and also displays, from its dictionary, those words which commence with the characters just typed.

Thus, for example, if the user wishes to enter the word "supercalafragalisticexpealodotious" and does not know how to spell it, he/she simply commences to type the word, character by character. After the letters "superca" have been entered, the selection of words from the dictionary beginning with these letters will have sufficiently narrowed so that the correctly spelled word can be easily found on the screen.

Preferably, the keyboard includes a key capable of switching a mode between "on" and "off" states, and the spelling help mode is executed only when the mode is in the "on" state. Thus, the user of the system can quickly switch in and out of the spelling help method, so that it is visable and used only when necessary.

The foregoing and other objects, features and advantages of the present invention will become apparent from the following, more particular description of the preferred embodiments of the invention, as illustrated in the accompanyng drawings.

BRIEF DESCRIPTION OF THE DRAWINGS

FIG. 7, which comprises FIGS. 7A, 7B, 7C, 7D, 7E, 7F, 7G, 7H and 7I, are an operational flow diagram for controlling the text processing system to perform the functions of the present invention.

DESCRIPTION OF THE PREFERRED EMBODIMENTS

The invention will now be described as embodied in an interactive text processing system of the type shown in FIG. 1. This embodiment utilizes the following computer hardware and software:

(1) IBM Personal Computer with at least 128K of memory, a monochrome display and at least one diskette drive; and (2) IBM Disk Operating System (DOS) software.

The IBM hardware and software is available commercially from IBM Corp., Yamato Road, Boca Raton, Florida. This embodiment utilizes approximately 96K of memory (in addition to DOS) and is designed to operate with any "well-behaved" word processing program. Depending upon the size of the word processing program, additional memory may be necessary.

Figure 1:
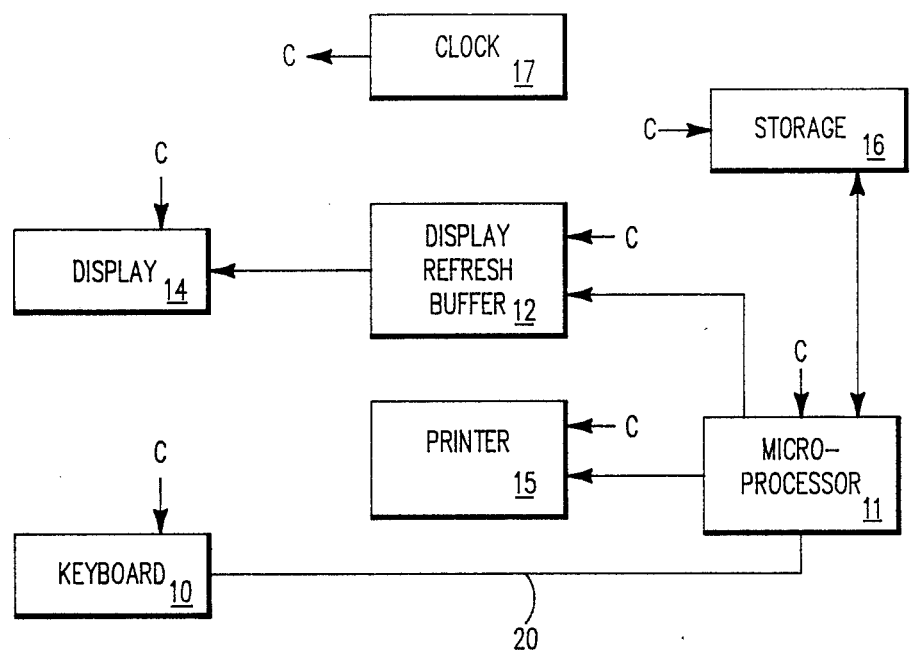
FIG. 1 is a block diagram of an interactive text processing system embodying the present invention.

As shown in FIG. 1, the text processing system comprises a normal typewriter style keyboard 10, a microprocessor 11, a display refresh buffer 12, a display device 14, a printer 15, and an auxiliary direct access storage device 16 such as a disk or diskette drive. A clock 17 for keeping the various components of the system in synchronism is also shown in FIG. 1 and is effectively coupled to each of the units.

Figure 2:
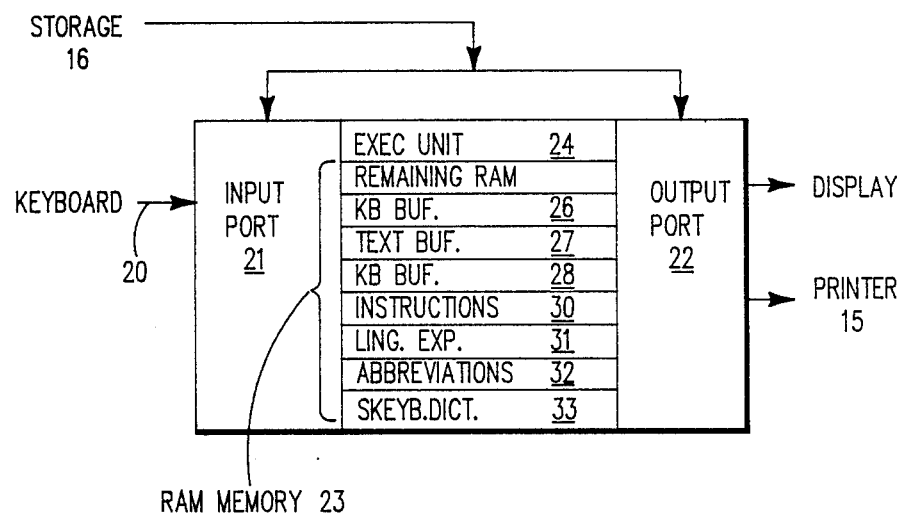
FIG. 2 is a functional diagram of the microprocessor shown in FIG. 1.

The keyboard 10 is connected to the microprocessor 11 by means of a bus 20. The microprocessor 11, as shown in FIG. 2, comprises an input port 21, an output port 22, a random access memory 23, and a process execution unit 24.

Figure 3:
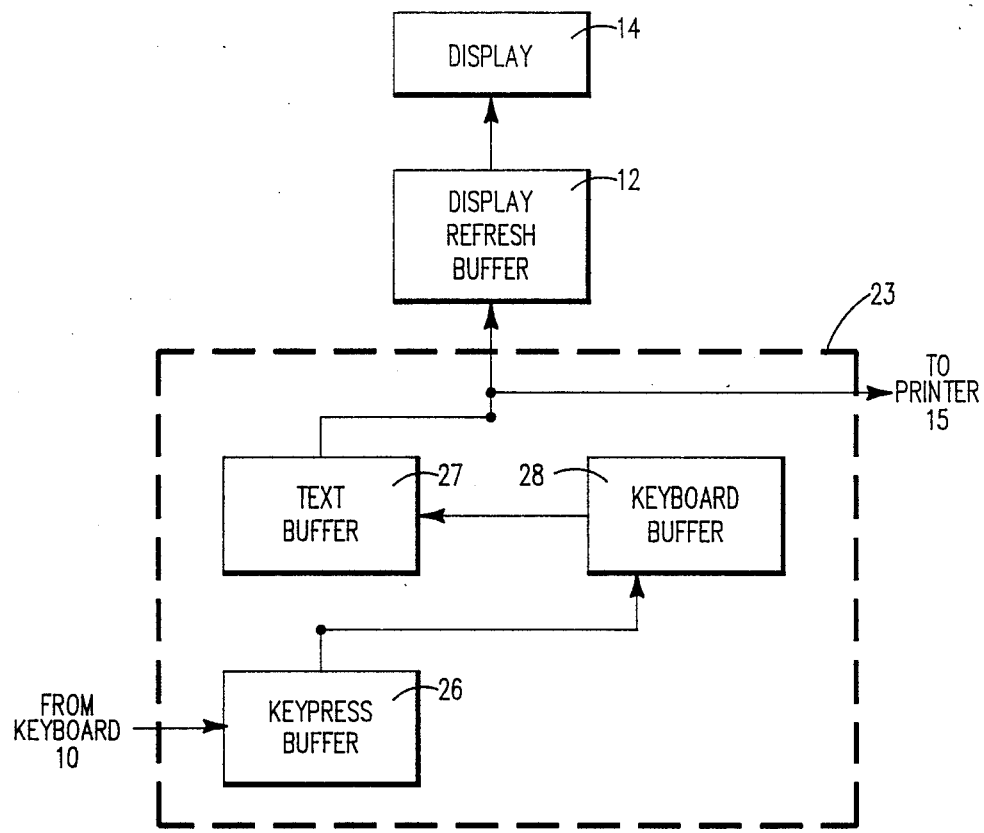
FIG. 3 is a functional diagram illustrating the data flow path between portions of the memory and the microprocessor and the display refresh buffer.

Functionally, memory unit 23 stores both instructions and data in specified sections which will be described in more detail later in the specification. Data is entered into memory 23 from keyboard 10 as bytes of binary information through input port 21. As shown in FIG. 3, the section of RAM 23 which receives the data from keyboard 10 is designated the keypress buffer 26. Data to be displayed is transferred by a series of instructions from the keypress buffer 26 to a keyboard buffer 28 and then to a text buffer section 27. From there the data is supplied to the display refresh buffer 12 through output port 22 of the microprocessor 11. This is achieved in a conventional way by a series of move instructions.

The microprocessor 11 may be an INTEL Model 8088, or any of the recognized functionally equivalent, currently available microprocessors.

The display refresh buffer 12 is shown as a separate buffer connected between the output port 22 and the display device 14. The buffer 12, in practice, is normally a part of the display device 14 and functions to control the generation of characters on the screen of the display device 14 by exercising on-off control of the beam as it traces a series of horizontal and vertical lines across the screen.

Figure 4:
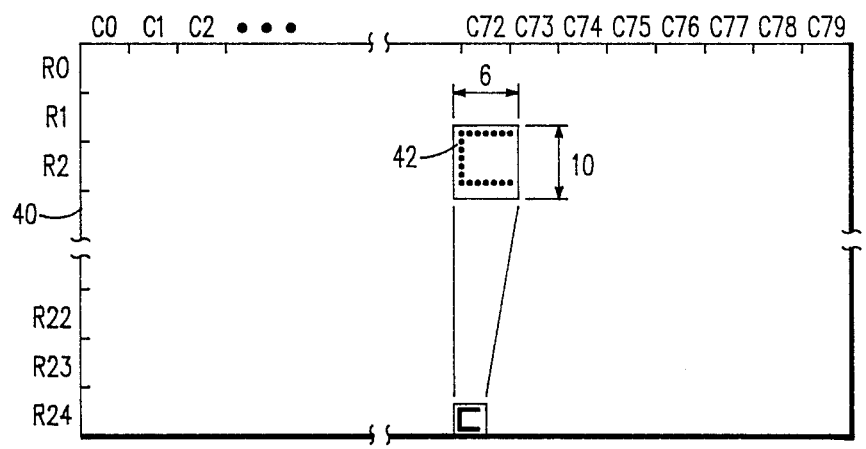
FIG. 4 is a diagrammatic view of the display shown in FIG. 1.

FIG. 4 is a schematic representation of the screen 40 of the display device 14. As shown in FIG. 4, the screen 40 has, for example, the capability of displaying 25 lines of characters where each line consists of 80 character column positions. In practice, one character position consists of a matrix of dot positions or picture elements sometimes referred to as "pixels" or "pels". A typical character matrix for a display of the type represented by device 14 would be a matrix of nine wide by fourteen high pels, which has been designated by reference character 42 in FIG. 4. The interaction of the refresh buffer and the display 14 is to convert the characters stored at a location in the buffer 12 to the corresponding character as formed in a 9×14 dot matrix at the equivalent location on the display screen 40. Display 14 generally is provided with its own set of electronics to achieve that conversion. The microprocessor 11 need only supply the address and load the buffer 12 with the appropriate characters.

It will be understood that all of the above described functions and interactions involving the microprocessor 11 are achieved through suitable programs and data which are also stored in the memory 23 shown as memory blocks 30, 31, 32 and 33 of FIG. 2 and which are called into action in response to data from the keyboard 10 or interrupt signals generated by the various components of the system shown in FIG. 1.

The preferred embodiment of the present invention comprises a set of instructions, stored in memory block 30, for controlling the text processing system of FIG. 1 for accepting keypresses and key releases from the keyboard 10 and either translating groups of keypresses into linguistic expressions which have been previously stored in the memory blocks 31 and 33 and then displaying said linguistic expressions on the display 12, or displaying the individual characters associated with the keypresses on the display screen according to whether the keypresses satisfy one or more decision algorithms which will be described below. The entries in the "dictionary" in memory block 31 include both the linguistic expressions and an appended address code which points to an associated abbreviation in the memory block 32 of abbreviations or keystrokes. The abbreviations in memory block 32 also include an appended address code which points back to the associated linguistic expression in memory block 31. Memory block 31 contains linguistic expressions which can be stroked immediately without typing any individual characters first. Memory block 33 contains linguistic expressions which can be typed with a combination of individual sequential keypresses followed by a keystroke. The linguistic expressions in block 33 are organized so that they may be rapidly displayed on the skeyboard. Both memory blocks 31, 32 and 33 include indexes which are used to quickly fine the approximate location of a given abbreviation or linguistic expression.

Preferably the program stored in memory block 30 provides a self-teaching display screen to assist the user in learning "stroke typing". This display screen includes a screen keyboard or "skeyboard" with one or more linguistic expressions (e.g., words) associated with each key. If so, these linguistic expressions are selected by means of the dictionary, and an associated index, stored in memory block 33.

Whenever the operator presses or releases a key on the keyboard 10 an interrupt signal is sent over the bus 20 to the input port 21 of the microprocessor 11. This interrupt signal causes the microprocessor's process execution unit 24 to jump out of the program being executed and to execute instructions stored in the memory block 30. Some of these instructions fetch a code from the keyboard 10 which indicates whether a key was pressed or released and which key it was. Then other of these instructions determine, based on the yet-to-be-described algorithms, whether to store in the keyboard buffer 28 the character code associated with this key, or to translate a group of keypresses including this keypress to a linguistic expression stored in memory block 31 or 33, and instead to store the character code associated with this linguistic expression in the keyboard buffer 28.

Once the character code or codes are stored in the keyboard buffer, the microprocessor 11 causes the associated characters to be displayed on the display device 14 in the conventional way in the course of executing an application program stored in the memory 23.

Figure 5:
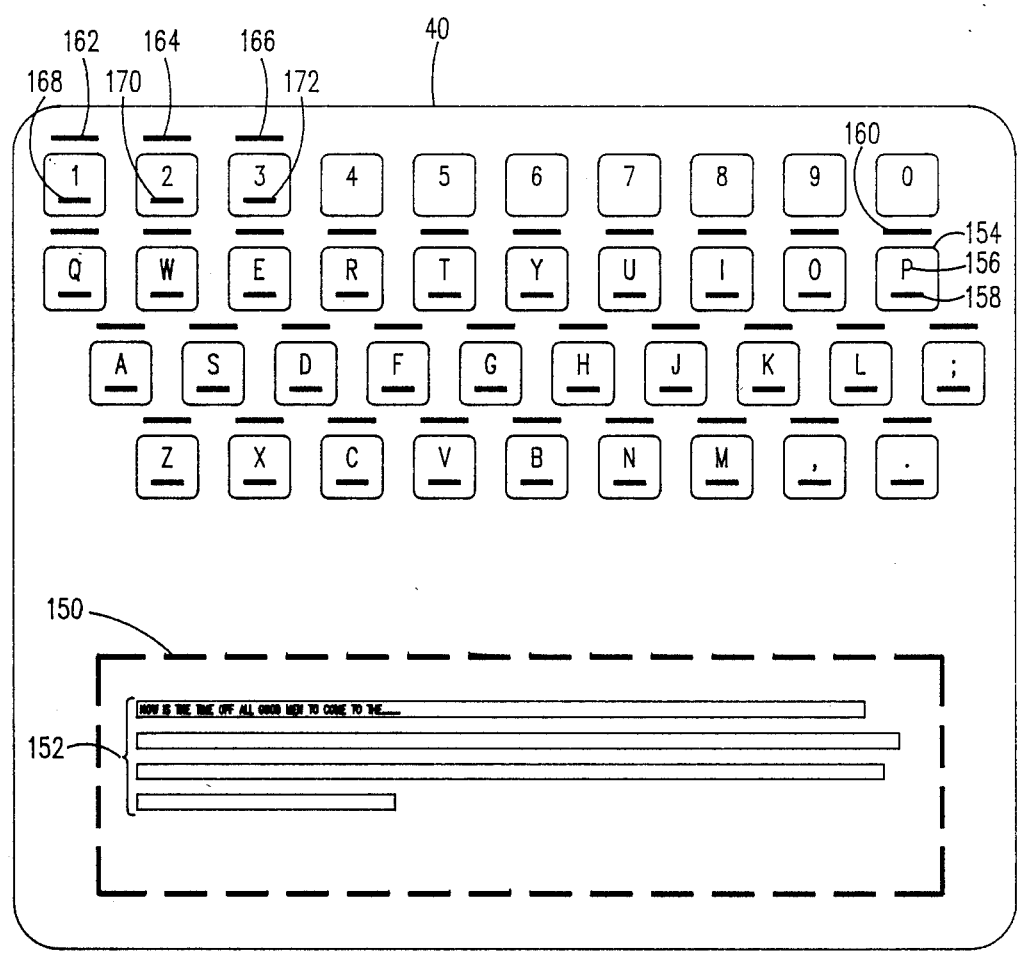
FIG. 5 is an elevational view of a display screen according to a preferred embodiment of the present invention.
Figure 6:
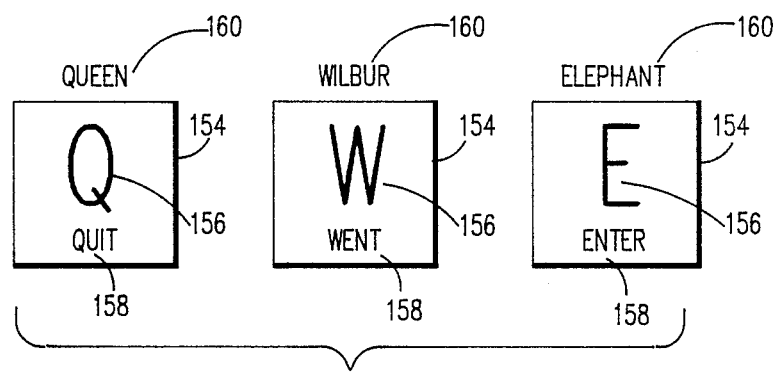
FIG. 6 is an enlarged view of a section of the display screen shown in FIG. 5.
Figure 7A:
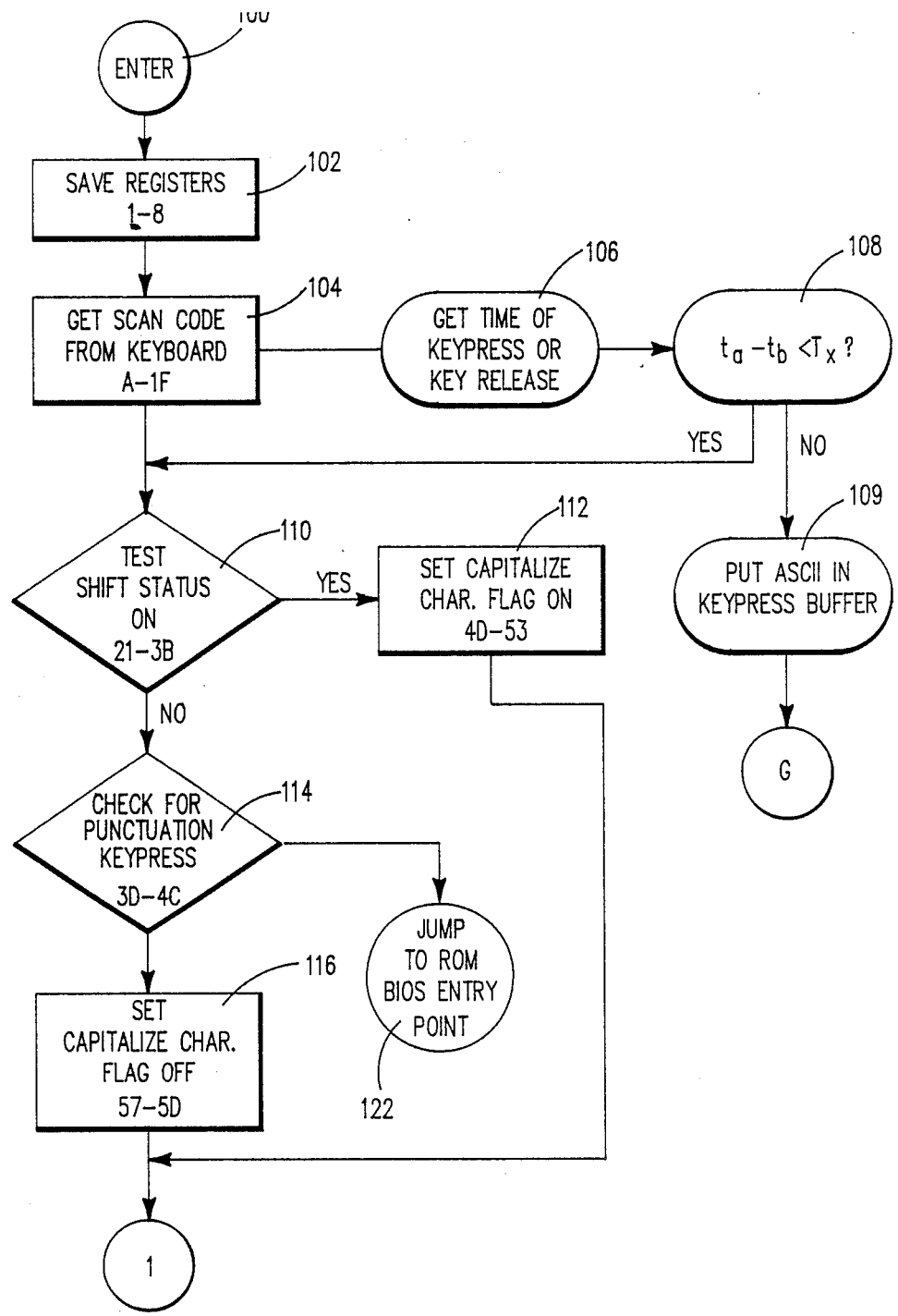
Figure 7B:
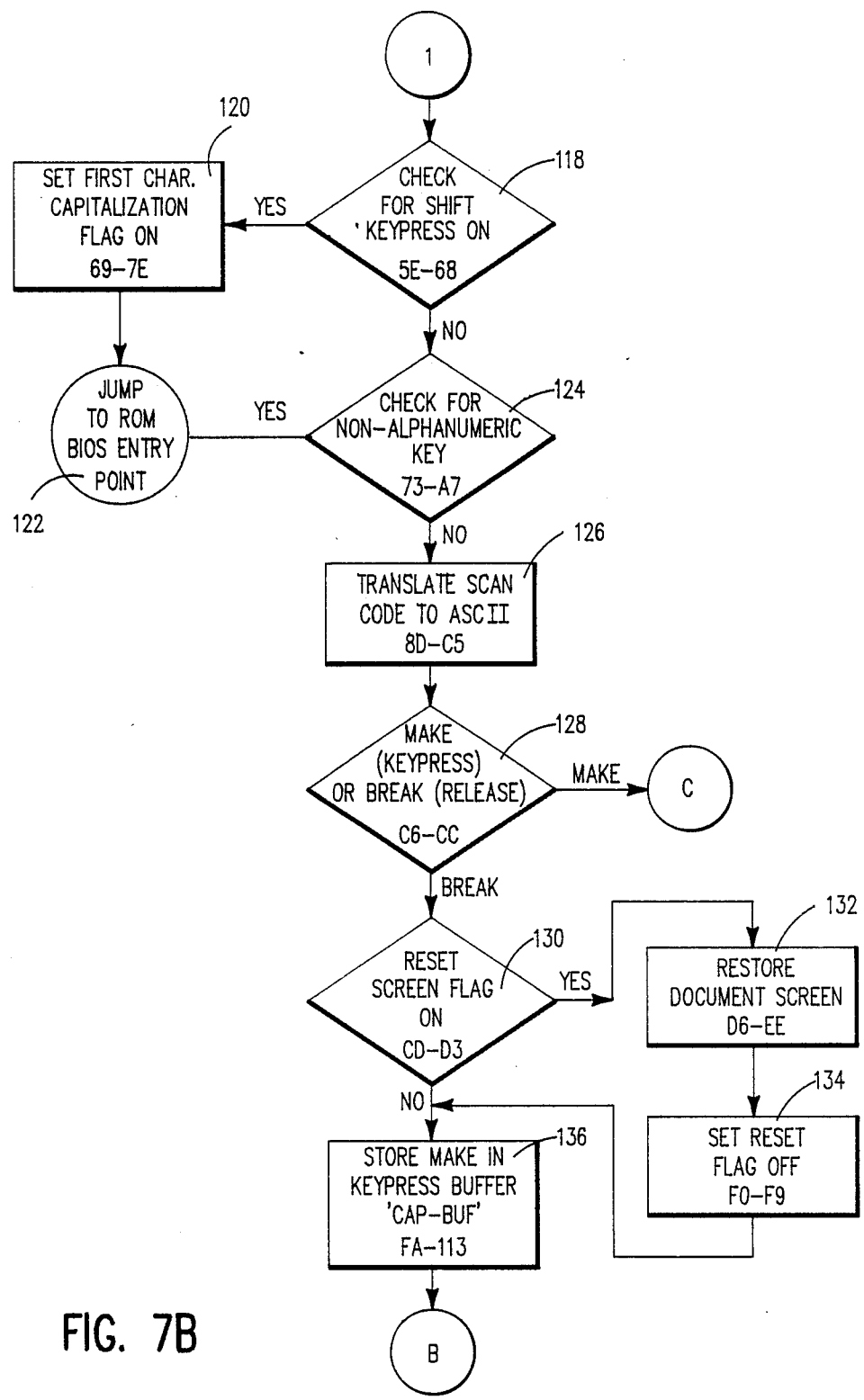
Figure 7C:
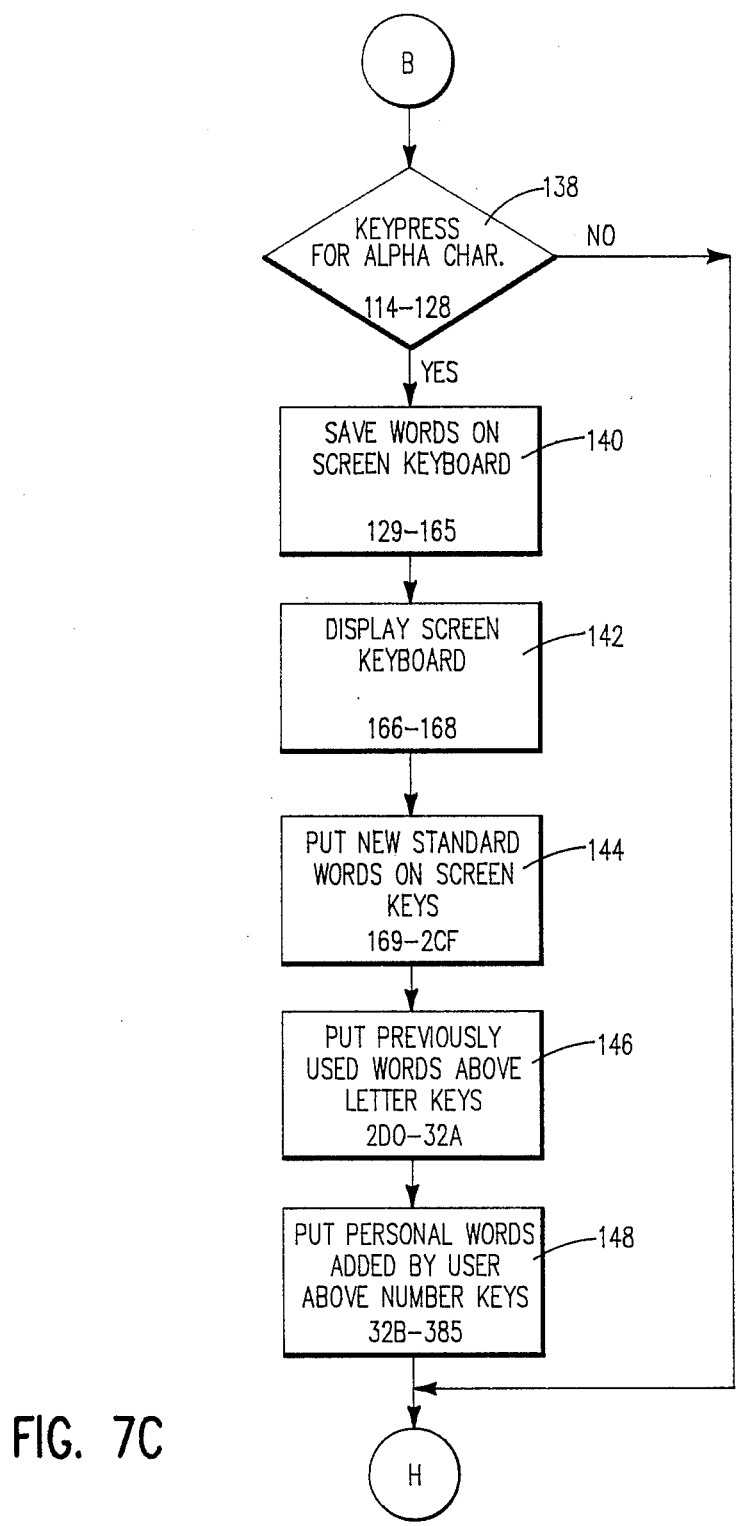
Figure 7D:
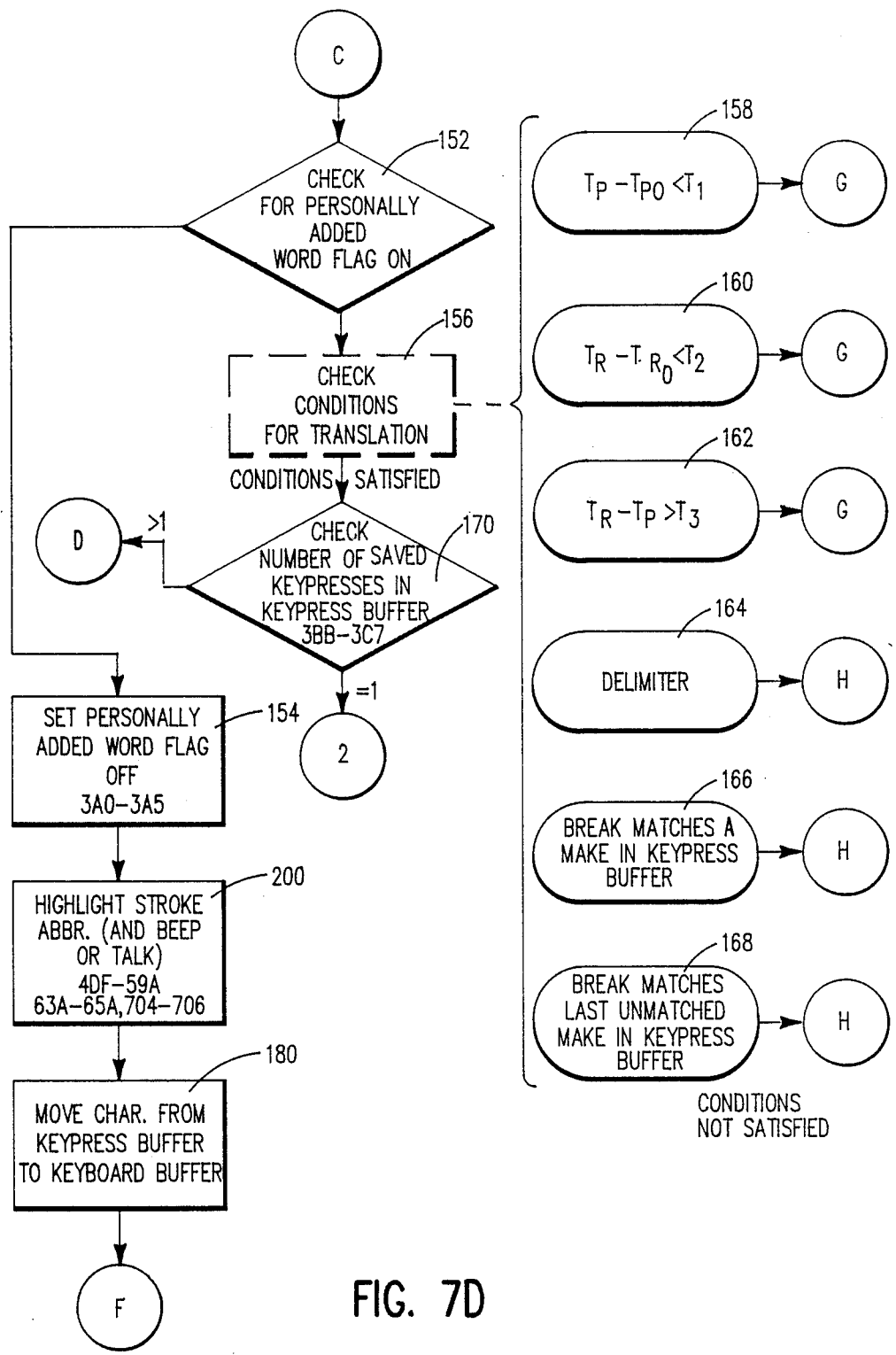
Figure 7E:
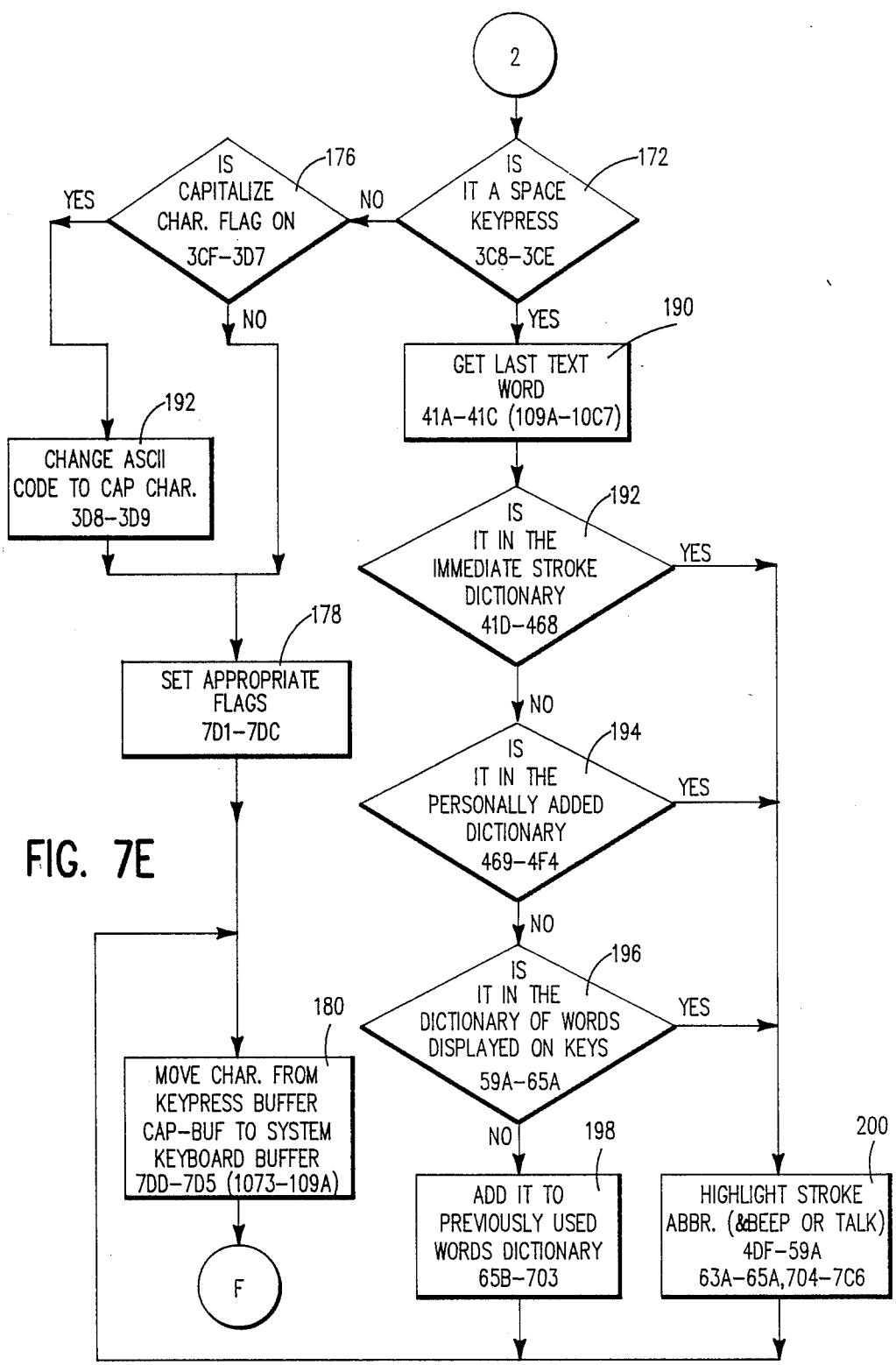
Figure 7F:
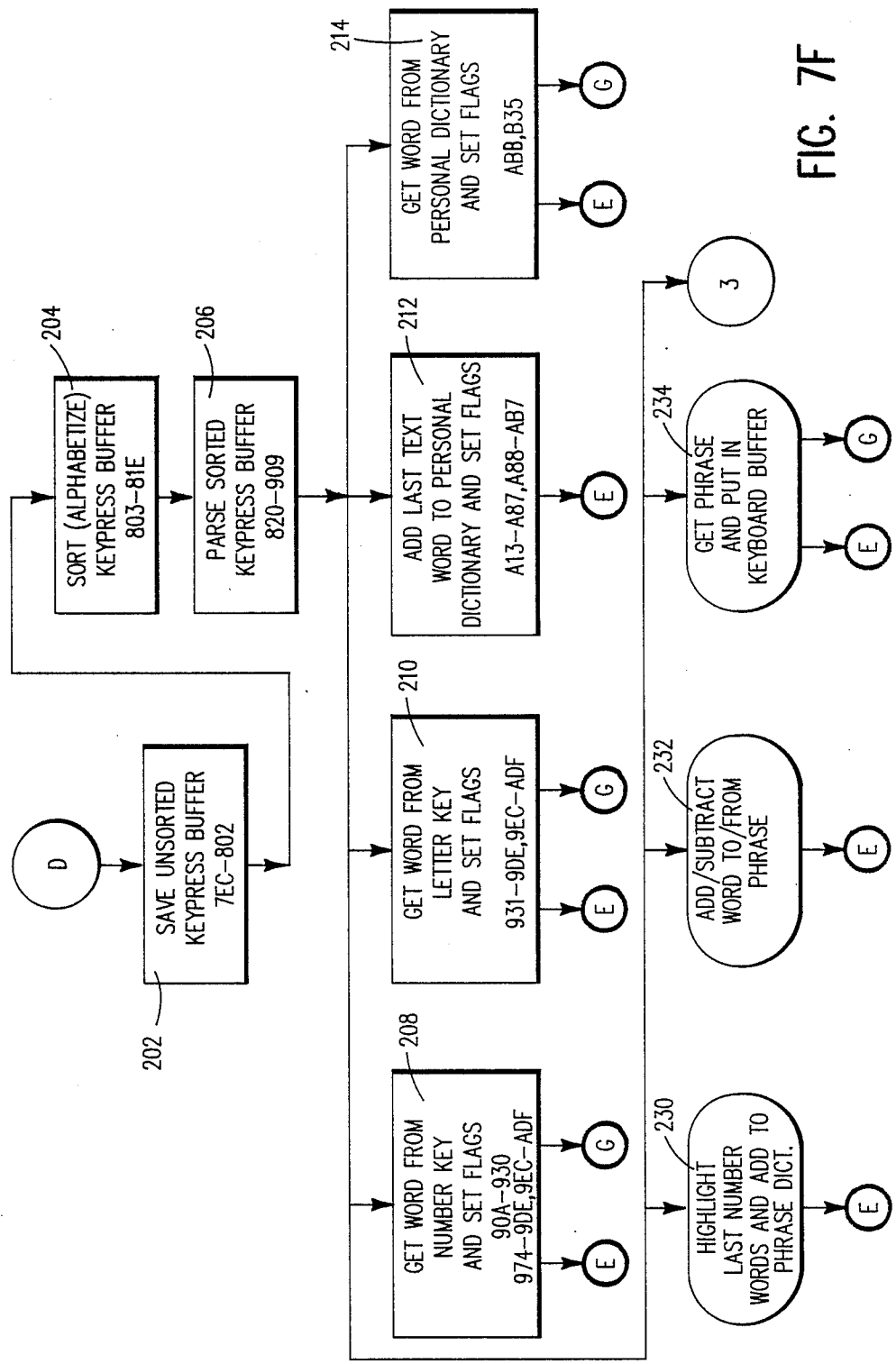
Figure 7H:
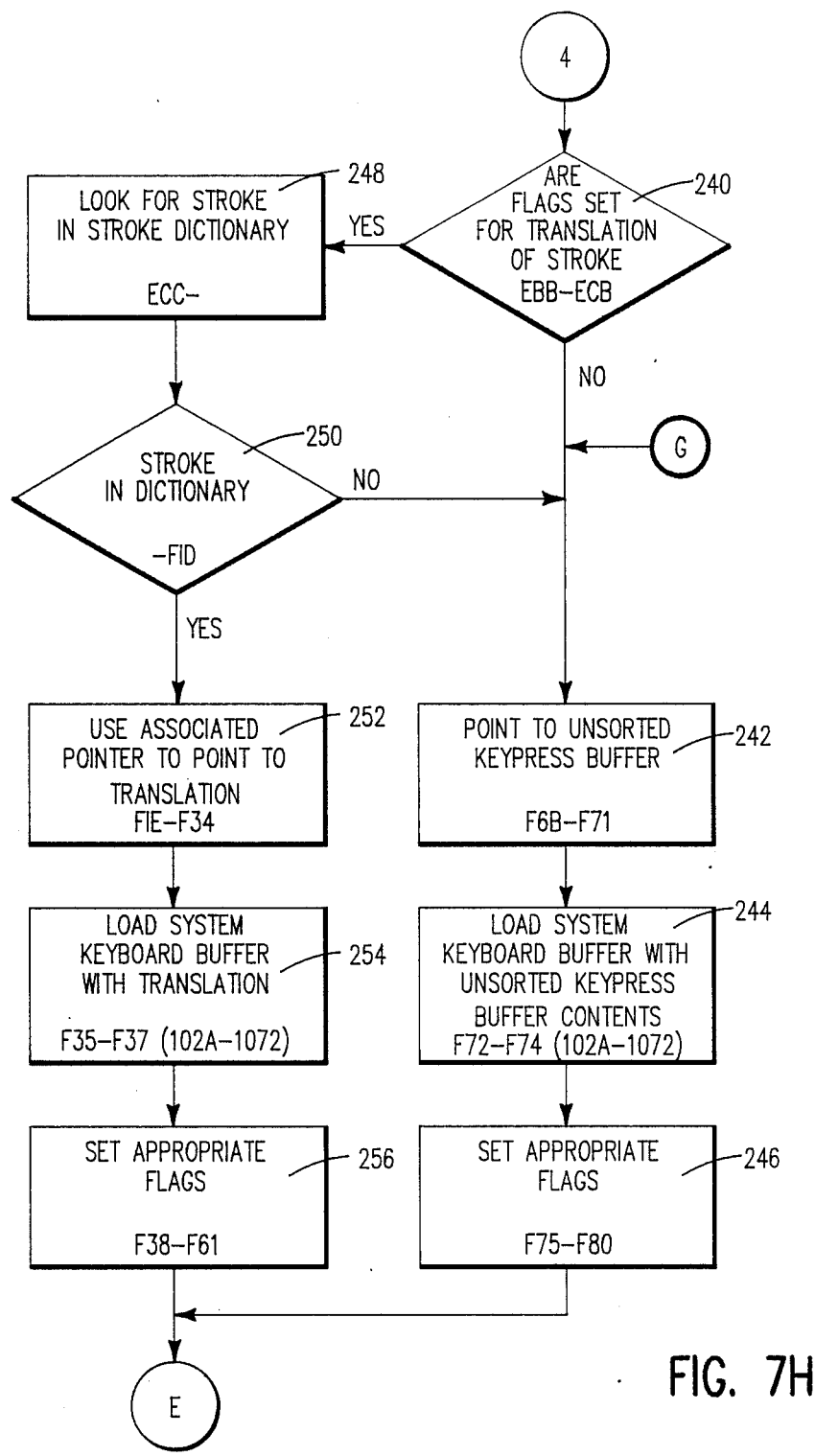
Figure 7I:
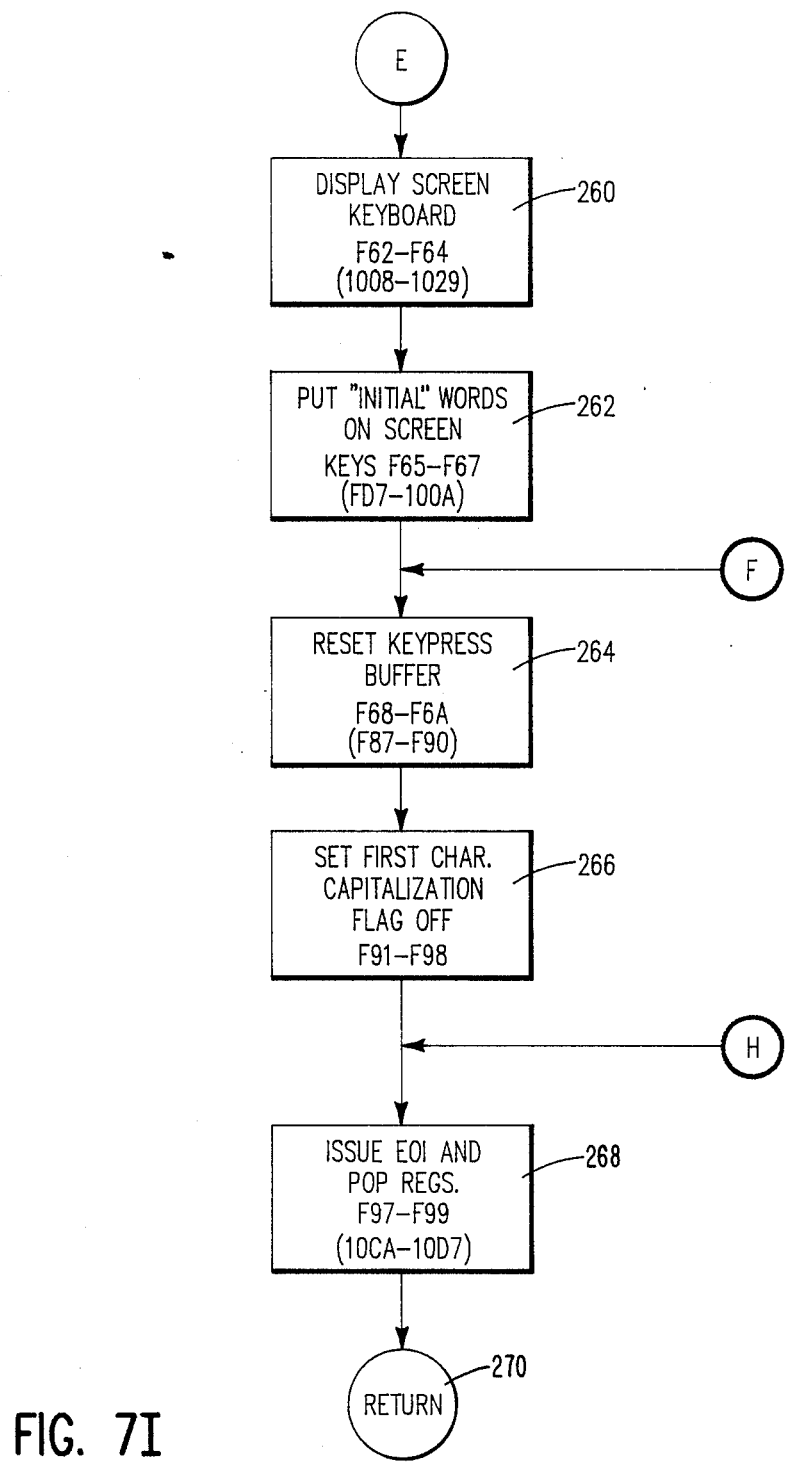

FIG. 5 illustrates a preferred embodiment of an image displayed on the screen 40 of the display device 14 in accordance with the present invention. FIG. 6 is an enlarged view of a small section of this display.

In this embodiment, the text is entered and scrolled upward in an area indicated by the dashed outline 150. It will be understood that the dashed lines representing this outline 150 are not displayed on the screen. Within the area 150, are displayed one or more lines of text 152 as this text is entered by the system user.

Above the area 150 is displayed the enlarged image of a standard "QWERTY" keyboard. Preferably, the "keys" of this keyboard are indicated by lighted boxes with the alphanumeric character associated with each key imaged in "reverse video" within the box. FIG. 6 illustrates three such imaged "keys" comprising illuminated boxes 154 with a darkened character 156 within each box.

The boxes 154 are sufficiently large to permit a word (linguistic expression) 158 to be imaged immediately below the character 156. The characters of the word 158 are preferably the same size as the characters imaged in the lines of text 152, whereas the characters 156 representing keyboard characters are preferably substantially enlarged. The characters forming the word 158 are also imaged in reversed video unless they exceed the area of the box 154.

Immediately above each box 154 is imaged a second word (linguistic expression) 160 in normal video. Like the word 158, this second word 160 is also associated with the character 156 within the box.

Finally, within or above the boxes for some of the numbered keys—such as "1", "2" and "3"—are imaged still further words (linguistic expressions) 162, 164 and 166, etc. Like the words 160 above the letter keys, the words 162–166 above the boxes are in normal video, whereas the words 168–172 within the boxes are in reverse video.

In operation of the stroke typing system according to the present invention, the user or operator of the computer can either enter text into the computer by standard typing, wherein each word is entered character by character, or by "stroke typing" wherein linguistic expressions are entered by means of "keystrokes". During normal typing, the character associated with each keypress is imaged on the display screen in the lower area 150 of the screen, concatenated on the line of text 152 with the text characters previously imaged on the screen.

At least during a training phase, the user enters keystrokes with the aid of the prompts provided by the displayed screen keyboard ("skeyboard") in the upper area of the screen. Initially, the "default" or "null" linguistic expression associated with each letter 156 is displayed below the respective letter as a word 158. This word, e.g., "quiet" associated with "Q", may be entered by typing the letter "q" and the spacebar substantially simultaneously.

The system provides both "standard" words 158 for selection by the user plus what may be termed "personal" words 160. Whereas the standard words—namely, those most commonly used by the public in creating text—are originally built into the system, the personal words are selected by the user, either manually or automatically with the aid of the computer. The personal words may be relatively uncommon words which are frequently typed by the particular operator.

For example, beneath the "W" in FIG. 6 is the standard word "went"; whereas above the "W" is the uncommon, personal word "Wilbur". This personal word is frequently entered by the user in creating text; it may, for example, be the user's own name.

If the word to be typed by the user is neither the default (null) standard word (e.g., "went") nor the default (null) personal word (e.g., "Wilbur"), the user may type the first letter of the word he/she intends to enter using the normal typing mode. Thereafter, all of the words 158, 160, 162, 164 and 166 are changed to words beginning with the letter that was typed.

For example, if the user types "W" then the standard words 158 appearing below each letter will be common words beginning with "W". Preferably these displayed words include the skeyboard letter with which they are associated as the second or subsequent letter of the word.

Thus, after typing "w" the word "enter" beneath the skeyboard letter "E" may change to "well", etc. These words are thus also linguistic expressions which may be "stroked" into the computer system although the initial letter or letters of this linguistic expression have already been typed. In this case, the remainder of the word "well", after the initial "W", may be entered into the system by typing the keystroke "e-space".

Not only is it possible to add personal words 160 to the system in dependence upon statistical frequency of usage, but the system user can add his/her own personal words at any time by first typing the word in the regular manner and then stroking a slash with the spacebar. By doing so, the user instructs the system to assign to the word the stroke consisting of the first letter of the word and the next available number. This word is then displayed next to this number ("1", "2", "3", etc.) on the skeyboard whenever the first letter of this word is subsequently typed. Three such words, 162, 164 and 166 are shown as being displayed on the screen of FIG. 5.

It will be appreciated that a display of the type illustrated in FIG. 5 with its associated program can be of assistance to the user in spelling words. As the user enters a new word, character by character, the computer displays a selection of correctly spelled words commencing with the characters that the user has entered. As each additional character is typed, the field of possible words is narrowed so that the user is presented a smaller and smaller selection of correctly spelled words from which to choose.

In addition, the stroke typing system according to the present invention has many teaching aids that the user may use in both an active and passive way. The skeyboard teaches the strokes for many words as the user types in the normal, sequential, character-by-character manner. When the user so types a word fully that could have been stroked, he/she is reminded in several ways that there is a stroke associated with that word and he/she is presented with visual and/or aural stimuli to teach him/her the stroke.

FIG. 7 shows a flow diagram for the operation of the stroke typing system of the present invention. This flow diagram closely follows an actual software program, designed for use with an IBM Personal Computer operating with IBM DOS and with a "well-behaved" word processing application program.

The program of FIG. 7 operates in conjunction with a dictionary of linguistic expressions stored in memory block 31, a dictionary of abbreviations, stored in memory block 32, and a dictionary that is used to put words on the skeyboard, stored in memory block 33, all of these dictionaries having suitable indices associated therewith.

The software program is set forth in the attached Appendix A to this specification whereas a typical portion of a dictionary for displaying words on the skeyboard and its associated index are set forth in Appendices B and C, respectively.

The contents of Appendices A, B and C are protected by copyright.

When the stroke typing system is loaded by the operator, the program and the associated dictionaries and indices are loaded into memory locations 30, 31, 32 and 33. The immediate stroke dictionary is loaded at location B500 past the beginning of the program and its associated dictionary of linguistic expressions is loaded at D500 past the beginning of the program. An index to the stroke dictionary is loaded at 9500 past the beginning of the program; an index to the associated dictionary of linguistic expressions is loaded at A500 past the beginning of the program.

As noted above, Appendix B contains a portion of the "skeyboard dictionary" that is used to put words on the letter keys of the skeyboard. Appendix C contains a portion of the index for this dictionary. The dictionary will reside in memory at the location 4200 past the start of the program and the index will reside at 2700 past the start of the program. Within the index at location 0 is the number twenty six (1A) which is the number of letters which can start a word. Following the number are the twenty six letters in the order that they appear on the keyboard. After a space character at location 1B, there are twenty six pairs of two byte pointers starting at location 1C corresponding to the twenty six first letters. The first pointer of each pair points into the index to the second letters that can follow the first letter associated with that pair of pointers. Actually it points to the number of second letters that can follow that first letter and immediately following the number are the second letters. Hence at location 1C the first pointer of the pair associated with the first letter "Q" points to location 84, at which the number 1 indicates that there is only one second letter that can follow "Q" and at location 85 we find that second letters is "U". At location 20 the first pointer of the pair associated with the first letter "W" points to location A6, at which the number 6 indicates that there are 6 possible second letters that can follow the first letter "W". Starting a location A7 we find these six are "ERIOAH". The second pointer of each pair points into the dictionary to the location of the words. At 1E of the index the second pointer associated with the first letter "Q" points to location O1 in the dictionary at which we find the word "Q—uality". The two bytes between the "Q" and the "u" contain a two byte displacement 0062 which indicates how for the "U" key of the skeyboard is from the first key of the skeyboard, the "Q" key ("Q" being coincidentally also the first letter of the word). At B4 of the index the second pointer of the pair associated with the sequence "WR" points to location FC in the dictionary where we find "WR—iter—ong". This tells us that there are two words in the dictionary with "WR", "writer" and "wrong". The displacement 0072 before the "i" of "iter" indicates how far the "I" key is from the "Q" key and the displacement 0004 before the "o" of "ong" indicates how far the "O" key is from the final "r" of "writer" when "writer" is put on the skeyboard.

It will be appreciated that the foregoing organization of the dictionary permits very rapid display of words on the skeyboard. Furthermore, by permitting certain tasks to be carried out between keypresses, the organization shortens the processing time immediatelly following the "space" keypresses following a word. Another organization that makes more efficient use of memory at the expense of speed eliminates the displacement bytes and uses the first letter of the rest of the word to locate the proper position on the skeyboard. More space can be saved by eliminating the typed part of the word ("wr" above) from the dictionary. Still more space can be saved by using just 5 bits for each letter and a 5 bit delimiter between words.

Another organization is contemplated to indicate which suffixes are valid for each word and the spelling of the suffix form. A pointer to a suffix template will follow each word. The template will consist of several bytes. The first seven bits of the first byte will indicate whether each of seven suffixes ("s", "ed", "ing", "ly", "tion", "ment" and "er", respectively) are valid for the word with a *standard* spelling. Bit 8 will indicate if any one of these seven has a *non-standard* spelling or if there is another suffix valid for this word. If so then the next byte will contain, in the first 6 bits the number of the suffix and in the last two bits, the number of letters to delete from the end of the rood word before adding the suffix. There will be such a byte for each valid suffix for this word that is not one of the seven and for each of the seven with a non-standard spelling.

For those suffix forms as "countries" or "mice" which cannot be formed by deleting characters from the end of the root form and then adding the suffix, the suffix number of zero will indicate that the next several bytes control the formation of the suffixed word. The first of these next several bytes will contain the suffix number and a bit to indicate whether the suffix should be added. The next byte will contain the number of characters to delete from the root word. The following bytes will contain the characters to add.

Reference numerals identifying the respective blocks in the flow diagram of FIG. 7 are indicated at the upper right-hand corner of each block. Cross-references to the lines of program code, if present, associated with each block are indicated at the bottom of each block.

The operation of the program will now be described with reference to its associated blocks in the flow diagram:

When a key on the keyboard 10 is pressed or released, the program is entered at block 100 from the computer operating system. At block 102 the contents of the 8088 microprocessor registers are saved and the keyboard scan code associated with the key is fetched from the keyboard at block 104. If it will be needed later, the time of this keypress or keyrelease is stored at block 106. Thereafter, a test is done at block 108 to see if this key event (keypress or key release) at time $t_a$ is within the gross time threshold $T_x$ from the last key even at a time$_b$. If the time difference $t_a - t_b$ falls outside the threshold $T_x$, then the associated ASCII code is put in the keypress buffer 26 at block 109 and a jump is taken to block 242 so that the keypresses in the keypress buffer can be put into the keyboard buffer 28 untranslated. If it does fall within the threshold or if the decision algorithm does not require the time of the keypress or release, then at block 110 the shift status is checked. If it is on then at block 112 a flag is set to capitalize this character and a jump to block 118 is taken. If the shift is off, then at block 114 the scan code is checked to see if it represents a punctuation keypress or keyrelease. If it does, then a jump to the standard keyboard interrupt code is taken at block 122 so that this keypress or keyrelease can be handled by that code, which in most cases will put the corresponding ASCII code in the system keyboard buffer. If it does not represent a punctuation character, then at block 116 the capitalization flag is turned off and at block 118 a test is performed to determine if this is a shift keypress. If it is, then at block 120 the first character capitalization flag is set and a jump to the standard code is taken at block 122. If it is not a shift keypress, then at block 124 a test is performed to determine if it is a keypress or a keyrelease for a non-alphanumeric character and, if so, a jump is taken to the standard code at block 122. If it is an alphanumeric character, then at block 126 the scan code is translated to ASCII and at block 128 a test is performed to determine whether the scan code indicates that a key was pressed or that a key was released. If it was a keypress, then at block 130 the restore screen flag is tested to determine if the document screen must be restored following a dictionary display operation. If so then at block 132 the document screen is restored and at block 134 the restore screen flag is turned off. In either case the ASCII code for the key that was pressed is stored in the keypress buffer immediately after previously stored keypress codes at block 136. At block 138 a test is performed to determine if the screen keyboard ("SKEYBOARD") display of linguistic expressions is required to be updated because said keypress is an alphabetic keypress. If not then a jump is taken to block 268 where an end of interrupt code ("EOI") is issued and the registers are restored and the routine returns at block 270. If the skeyboard needs to be updated, then at block 140 the words on the skeyboard are saved in memory locations from which the words can later be retrieved if need be, and at blocks 142 to 148 new words are put on the skeyboard. At block 142 the skeyboard is initialized by moving the appropriate characters to either the text buffer 27 or the non-screen memory location.

At block 144 the section of memory 33 is searched for standard words or linguistic expressions that begin with the sequence of characters (including the one corresponding to the current keypress) that follow the last space character of the text, and those linguistic expressions are moved to locations in the non-screen memory or the text buffer 27 from which they are automatically displayed on the keys of the skeyboard by standard system functions. The section of memory 33 that holds these standard words is organized so that, as each letter of a word is typed, pointers into both the dictionary of linguistic expressions and an index into said dictionary are adjusted to point to the letters that can follow so that the next screen of linguistic expressions can be quickly located in said section of memory 33. At block 146 the previously used words are put above the keys of the skeyboard. At block 148 the personal words added by the user are put above the number keys. Then a jump is taken to block 268. If at block 128 it is determined that it was a key release rather than a keypress that caused the routine to be invoked, then at block 152 a check is done to see if the personally added word flag is on. If it is, then at block 154 it is turned off and at block 200 the appropriate characters of the text word are highlighted and the appropriate keys of the skeyboard are highlighted and the number of beeps is set up or the character names to talk are set up. If the personally added word flag is not on then at block 156 a test is performed to determine if this key release together with the keypresses in the keypress buffer and the corresponding releases which have occurred satisfy a decision algorithm.

As pointed out in the Summary of the Invention above, there are essentially four distinct types of decision algorithms, according to the present invention:

(1) The determination as to whether or not successive keypresses are associated with a keystroke may be made in accordance with the *timing* of the keypresses. In this case, the algorithm keeps track of the instants of time that each key is depressed ($T_P$) and/or released ($T_R$). In any given sequence of keypresses, it is possible to determine one or more of the following:

$$(T_P - T_{P0}) < T_1,$$

$$(T_R - T_{R0}) < T_2,$$

$$(T_R - T_P) > T_3.$$

In the first of these formulae, the determination is made whether the respective instants of time that the successive keyboard keys are depressed fall within a respective first time window ($T_1$). In this case, $T_P$ is the instant of time that the current keyboard key is depressed, and $T_{P0}$ is the instant of time that either the previous keyboard key or the first keyboard key (that has not yet been released) was depressed.

Similarly, the second formula requires that the respective instants of time that the keys, in a group of key depressions, are released fall within a prescribed second time window ($T_2$). This test is advantageous because, when two or more keys are "stroked", they are normally released substantially simultaneously.

Finally, as an alternative or in addition to the tests with respect to the time windows $T_1$ and $T_2$, each key may be tested to determine whether the period during which it was depressed ($T_R - T_P$) exceeds a prescribed third time window ($T_3$). This test is advantageous because, when several keys are "stroked" together they are normally depressed for a longer period of time than when individual keys are depressed.

It will be appreciated, from the description above, that the determination as to whether a keypress is associated with a keystroke depends on the individual time windows $T_1$, $T_2$ and $T_3$. According to a particular feature of the present invention, these time windows may be of different length for different keystroke characters (since certain characters are normally depressed for a longer period of time than others, during standard typing) and for different users of the test entry system (in accordance with the respective typing skill of each operator). According to a still further preferred feature of the present invention, the time window(s) are automatically adapted to the user of the text entry system in dependence upon the skill of the user and in response to prompts by the user.

Still another method of determining whether or not successive keypresses are associated with a keystroke, which depends upon the timing of each keypress (both the instant of time of depression ($T_P$) and time of release ($T_R$)) involves determining whether all the instants of time of depression for a sequence of keypresses precede all the instants of time of release. In this case, it is assumed that, with a keystroke, all the keys associated with that keystroke will be depressed before any of such keys are released.

(2) A second type of decision algorithm according to the invention for determining whether or not successive keypresses are associated with a keystroke involves the use of a known "delimiter character" which may, for example, be a "space" or a "slash" character. If a key which designates such a delimiter character is depressed in succession with other alphanumeric keys, and if the sequence of characters, designated by the keypresses, are capable of being translated into a linguistic expression, then the sequence of keypresses is determined to be a keystroke.

For example, if the delimiter character is a space, and the computer system user types keys designating "n", "o", and "v" plus a "space", and if the sequence "nov-space" has been previously designated as a translatable keystroke, then this sequence of keypresses is determined to be a keystroke. As an example, this keystroke could be translated into the linguistic expression "November".

(3) A third decision algorithm according to the invention for determining whether a keypress is associated with a keystroke may be implemented by attempting to translate all the characters in the computer keypress buffer, or all the characters corresponding to keypresses which have been released, into a linguistic expression upon release of each key, whenever two or more characters are present in the keypress buffer. Thus, when only one key has been depressed and then released, it is assumed that the standard typing mode has been invoked, and the designated character is simply concatenated with the text characters previously imaged on the character display screen. However, when two or more keys are depressed before one of these keys is released, an attempt is made, upon release of each key, to translate the contents of the keypress buffer into a linguistic expression. If the contents do not appear in the dictionary of keystrokes, then it is assumed that the standard typing mode has been invoked. If the sequence of keypresses does appear in the dictionary, they are considered to be a keystroke and the associated linguistic expression is concatenated with the text characters previously imaged on the character display screen.

(4) A fourth decision algorithm according to the invention for determining whether a keypress is associated with a keystroke involves checking the sequence of keypresses that preceded this keypress. For example, if the operator types the characters "b", "e", and "a" sequentially and then strokes the characters "u" and "space" simultaneously, the stroke "u-space" may be translated to the linguistic expression "utiful-space" so that when this linguistic expression is concatenated to the text, the word "beautiful" and a following space will have been added to the text by a combination of individual sequential keypresses followed by a keystroke. Another example involves the punctuation character "comma". If the operator has just stroked a word and then strokes "comma-space", the characters "backspace", "comma", "space" will be added to the text to put the comma immediately after the last character of the text word rather than after the space that follows the last text word. However, if individual keypresses preceded the "comma-space" stroke, then the "comma" and "space" keypresses will be interpreted as two individual keypresses and their associated characters will be added to the text in the order in which the keys were pressed.

In the flow diagram of FIG. 7 the decision algorithm takes place in block 156. As is shown to the right of the block 156, this decision may consist of (1) evaluating the relevant timing thresholds at 158, 160 and 162; (2) determining whether the key release is associated with a delimiter character at 164; or (3) determining whether at the time of the key release, any or all of the keypresses have been matched by key releases at 166 and 168.

If the decision algorithm described above is not satisfied, then either a jump is taken to block 242 where the unsorted keypresses in the keypress buffer are moved to the keyboard buffer or a jump to block 268 is taken if there are no keypresses in the keypress buffer. If the algorithm is satisfied, then at block 170 a test is performed to determine if there is only one keypress in the keypress buffer 26. If so, then at block 172 a test is performed to determine if the keypress is a space bar keypress. If it is not then a test is performed at block 174 to see if the capitalize character flag is on and, if it is on, then at block 176 the ASCII code is changed to capitalize the character. Whether or not the capitalize character flag is on the appropriate flags are set at block 178, and at block 180 the character is put in the system keyboard buffer 28 and a jump is taken to block 264 where the keypress buffer is initialized. If at block 172 the keypress is a space bar keypress, then a pointer to the last text word is obtained at block 190 and at blocks 192, 194 and 196 this text word is compared to the linguistic expressions in the vocabularies of linguistic expressions stored in memory.

At block 192 the immediate dictionary 31 of "immediately strokable" words is checked, at block 194 the dictionary of personally added words is checked, and at block 196 the skeyboard dictionary 33 of standard words that are displayed on the keys of the skeyboard is checked. If the last text word is found in any of these dictionaries, then at block 200 the appropriate characters of the text word are highlighted, the appropriate keys of the skeyboard are highlighted, the number of beeps is set up and/or the character names to talk are set up. These features are provided as teaching aids to the user.

Specifically, the teaching aids may prompt the user to learn the keystrokes associated with linguistic expressions. In the preferred embodiment of the invention, one or more of the following teaching aids may be employed when a linguistic expression is entered, character by character, without the aid of its associated keystroke:

(1) The characters comprising the keystroke, which are imaged as keyboard characters on the skeyboard, may be imaged in a different manner than the remaining characters; e.g., by reverse video, different size or different brightness;

(2) The characters within the linguistic expression displayed on the skeyboard may be imaged in a different manner than the remaining characters of that linguistic expression;

(3) The keystroke characters within the linguistic expression displayed in the body of the text may be imaged in a different manner than the remaining characters of that linguistic expression; and/or (4) Beep tones generated by the computer may indicate, by number and/or pitch, the position of the character or characters, and/or synthesized voice may pronounce the character or characters of the linguistic expression which are contained in the associated keystroke after an entire linguistic expression has been imaged.

Continuing with the flow diagram, if the last text word is not found at blocks 192, 194 or 196 then it is added to the dictionary of previously used words at block 198. In either case, a jump is taken to block 180 where the space character is moved to the system keyboard buffer, and then a jump is taken to block 264. If at block 170 it is found that there is more than one keypress in the keypress buffer, then at block 202 the keypress buffer is saved and at block 204 it is sorted to facilitate parsing it at block 206. From block 206 a jump is taken to one of blocks 208, 210, 212, 214, 216, 218, 220, 222, 224, 226, 230, 232, 234, or 240 depending on the contents of the keypress buffer 26. If the code to get a word or linguistic expression from a number key is there, then this code will include a numeric character and at block 208 this number is used to find the word or linguistic expression that is on that number key on the skeyboard. If there is a word or linguistic expression on that number key, it is put in the keyboard buffer 28 and a jump is taken to block 260. If there is no word or linguistic expression on that key, then a beep is sounded to alert the operator and a jump is taken to 242 where the saved unsorted contents of the keypress buffer are put in the keyboard buffer. If the code to get a word or linguistic expression from a letter key is there, then this code will include a letter character and at block 210 this letter is used to find the word or linguistic expression that is on that letter key on the skeyboard that was saved at block 140. If there is a word or linguistic expression on that letter key, it is put in the keyboard buffer 28 and a jump is taken to block 260. If there is no word or linguistic expression on that key, then a beep is sounded to alert the operator and a jump is taken to 242 where the saved unsorted contents of the keypress buffer are put in the keyboard buffer. If the code to add the last text word to the personal dictionary is there, then at block 212 this word and its stroke abbreviation are added to the personal dictionary and a jump to block 260 is taken. If the code to get a word from the personal dictionary is there, then at block 214 the personal dictionary is searched for the corresponding stroke. If it is there, the personal word is put in the keyboard buffer 28 and a jump is taken to 260. If it is not, then a beep is sounded to alert the operator and a jump is taken to 242 where the saved unsorted contents of the keypress buffer are put in the keyboard buffer.

If the code to add a punctuation character to the last word of text is there, then at block 216 a backspace character is put in the keyboard buffer followed by this punctuation character, followed by a space, and a jump is taken to block 264. If the code to get a previously used word or linguistic expression from above a letter key is there, then this code will include a letter character and at block 218 this letter is used to find the word or linguistic expression that is above that letter key on the skeyboard that was saved at block 140. If there is a word or linguistic expression above that key, it is put in the keyboard buffer 28 and a jump is taken to 260. If there is no word or linguistic expression above that key, then a beep is sounded to alert the operator and a jump is taken to 242 where the saved unsorted contents of the keypress buffer are put in the keyboard buffer. If the code to add the last few text words to the personal phrase dictionary is there, then at block 230 this phrase of words and its stroke abbreviation are added to the personal phrase dictionary and a jump to block 260 is taken. If the code to add or subtract a word or words to or from this phrase is there, then at block 232 this word or words are added or subtracted to or from the aforesaid phrase, and a jump to block 260 is taken. If the code to get a phrase from the phrase dictionary is there, then at block 234 the phrase dictionary is searched for the stroke. If it is there, the phrase is put in the keyboard buffer 28 and a jump to 260 is taken. If it is not, then a beep is sounded to alert the operator and a jump is taken to 242 where the saved unsorted contents of the keypress buffer are put in the keyboard buffer. If the code to display a portion of one of the dictionaries is there, then at block 220 the document screen is saved, the restore screen flag is turned on and this portion of the dictionary is displayed. A jump to block 264 is then taken. If the code to turn on or off the optional skeyboard is there, then at block 222 a pointer is changed to direct the skeyboard characters to the screen or non-screen memory, and a jump to block 264 is taken. If the code to turn on or off the optional beep or talk feature is there, then at block 224 tables are adjusted to turn on or off the beep or talk feature, and a jump to block 264 is taken. If the code (e.g., a slash) designating the entry of a suffix to be added to the last text word is there, then at block 226 the dictionary is searched for this last text word and the associated "suffix template". If this suffix template indicates that the last text word has a standard spelling for this suffix, then a backspace character is put in the keyboard buffer. However, if the suffix template indicates that the last text word has a non-standard spelling for this suffix, then characters are put in the keyboard buffer to change the last text word so that it will be spelled correctly when the suffix is added. In either case, a jump is taken to block 240. If however, the suffix template indicates that the last text word cannot take this suffix, then a beep is sounded to alert the operator, and a jump is taken to 242 where the saved unsorted contents of the keypress buffer are put in the keyboard buffer.

At block 240 the flags are checked to see if the sorted keypress buffer should be translated. If not, then at blocks 242 and 244 the unsorted keypress buffer is put in the keyboard buffer. If the flags are set for translation, then at blocks 248 and 250 the dictionary of stroke abbreviations is searched for the stroke in the sorted keypress buffer. If this stroke is found in the dictionary of stroke abbreviations, then the pointer to the associated linguistic expression (translation) is obtained at block 252. If this stroke is not found in the dictionary of stroke abbreviations, then the pointer to the unsorted keypress buffer is obtained at block 242. In either case, this pointer is used to put either the translation or the unsorted keypress buffer in the keyboard buffer at either block 254 or 244. The appropriate flags are then set at block 256 or block 246 and a jump is taken to block 260. At block 260 the skeyboard is moved to either the display or non-display memory. The skeyboard is then reset at block 262 to the initial words which are displayed before the first letter of a word is typed. At block 264 the keypress buffer is reset and at block 266 the first character capitalization flag is turned off. At block 268 an EOI command is issued and the registers are restored. Finally at 270 the program returns control to the computer operating system.

Numerous additional features may be added to the stroke typing system described above. For example, in addition to the capability of adding linguistic expressions which may be accessed by keystrokes, a user may wish to delete linguistic expressions that are rarely used. In particular, the system may be programmed to respond to a prompt, entered into the keyboard by the user, plus the entry of the linguistic expression to be deleted, to remove such linguistic expression from the vocabulary of linguistic expressions.

There has thus been shown and described a novel stroke typing system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

APPENDIX A 

© Copyright 1985
Eric P. Goldwasser

Page 1-1

```
                              C      include equetc.asm
                              C
       = 0060                 C      kb_data equ 60h
       = 0061                 C      kb_ctl equ 61h
         0000                 C      dseg segment at 40h
         0017                 C      org 17h
         0017   ??            C      kb_flag db ?
         001A                 C      org 1ah
         001A   ????          C      buffer_head dw ?
         001C   ????          C      buffer_tail dw ?
         001E     10 [        C      kb_buffer dw 16 dup (?)
                     ????     C
                         ]    C
                              C
         003E                 C      kb_buffer_end label word
         0050                 C      org 50h
         0050   ????          C      cursor_posn dw ?
         006C                 C      org 6ch
         006C   ????          C      timer_low dw ?
         006E                 C      org 6eh
         006E   ????          C      timer_high dw ?
         0070                 C      dseg ends
         0000                 C      beep segment at 3fe0h
         0000                 C          org 0h
         0000   00            C      beep_count db 0
         0001   00            C      on_off db 0
         0002   07C5          C      beep_freq dw 1989
         0004   01            C      timer_count db 1
         0005                 C      beep ends
         0000                 C      stack segment stack
         0000    80 [         C        db 128 dup (0)
                     00       C
                         ]    C
                              C
         0080                 C      stack ends
                              C
         0000                        cseg segment public
                                     assume cs:cseg,ds:dseg,es:dseg
                                     public kb_int,keybrd_end
         0000                        kb_int proc far
         0000   FB                     sti
                              C      include pushregs.asm ;store registers
                              C
         0001   50            C      push ax
         0002   53            C      push bx
         0003   51            C      push cx
         0004   52            C      push dx
         0005   56            C      push si
         0006   57            C      push di
         0007   1E            C      push ds
         0008   06            C      push es
                              C
         0009   FC                   cld
                              C      include getkbchr.asm ;get keyboard char in al
                              C
         000A   B8 0040       C      mov ax,40h
         000D   8E D8         C      mov ds,ax
         000F   E4 60         C      in al,kb_data
         0011   50            C      push ax
         0012   E4 61         C      in al,kb_ctl
         0014   8A E0         C      mov ah,al
         0016   0C 80         C      or al,80h
         0018   E6 61         C      out kb_ctl,al
         001A   86 E0         C      xchg ah,al
         001C   E6 61         C      out kb_ctl,al
         001E   58            C      pop ax
                              C
```

```
001F  8A E0                              mov ah,al
0021  80 0E 0017 R 00                    or kb_flag,0
0026  74 2F                              jz noshift ; no shift key down
                              C          include chkpunct.asm ;shift key down, return
                                         to BIOS if punct
                              C
0028  8A 1E 0017 R          C            mov bl,kb_flag
002C  80 FB 83              C            cmp bl,83h
002F  77 77                 C            ja romjmp
0031  80 FB 80              C            cmp bl,80h
0034  77 07                 C            ja cmpunct
0036  74 1F                 C            je noshift
0038  80 FB 03              C            cmp bl,3
003B  77 6B                 C            ja romjmp
003D                        C          cmpunct:
003D  3C 10                 C            cmp al,16
003F  72 67                 C            jb romjmp
                            C          ; cmp al,26
                            C          ; je romjmp
                            C          ; cmp al,27
                            C          ; je romjmp
                            C          ; cmp al,39
                            C          ; je romjmp
                            C          ; cmp al,40
                            C          ; je romjmp
                            C          ; cmp al,41
                            C          ; je romjmp
0041  3C 33                 C            cmp al,51
0043  74 63                 C            je romjmp
0045  3C 34                 C            cmp al,52
0047  74 5F                 C            je romjmp
0049  3C 35                 C            cmp al,53
004B  74 5B                 C            je romjmp
004D                        C            setcap:
                            C
004D  2E: C6 06 1106 R 01              mov cs:set_cap,1 ;to cap char
      90
0054  EB 08 90                         jmp capset
0057  2E: C6 06 1106 R 00              noshift: mov cs:set_cap,0
      90
005E                        C          capset: include capfirst.asm ;set sh_flag & sh
                                       _foff to cap first char
                            C
                            C
005E  3C 2A                 C            cmp al,42
0060  74 07                 C            je setfcap
0062  3C 36                 C            cmp al,54
0064  74 03                 C            je setfcap
0066  EB 0B 90              C            jmp nocap
0069                        C          setfcap:
0069  2E: C6 06 1114 R 01   C            mov cs:sh_flag,1
      90                    C
0070  EB 36 90              C            jmp romjmp
0073                        C          nocap:
                            C
                            C          include chkscan.asm ;return to BIOS for nonke
                                       yboard keys
                            C
0073  3C 01                 C            cmp al,1
0075  74 31                 C            je romjmp
0077  3C 0C                 C            cmp al,12
0079  72 32                 C            jb possten
007B  3C 10                 C            cmp al,16
007D  72 29                 C            jb romjmp
007F  3C 1A                 C            cmp al,26
0081  72 2A                 C            jb possten
0083  3C 1E                 C            cmp al,30
0085  72 21                 C            jb romjmp
0087  3C 27                 C            cmp al,39
0089  72 22                 C            jb possten
008B  3C 2A                 C            cmp al,42
008D  72 19                 C            jb romjmp
```

```
008F  3C 37             C    cmp al,55
0091  72 1A             C    jb possten
0093  74 13             C    je romjmp
0095  3C 3A             C      cmp al,58
0097  76 14             C      jbe possten ;space bar or lower make
0099  3C 80             C      cmp al,128
009B  72 0B             C      jb romjmp ;other make
009D  3C BA             C      cmp al,186
009F  77 07             C      ja romjmp ;other break
00A1  3C 9C             C    cmp al,156
00A3  74 03             C    je romjmp
00A5  EB 06 90          C      jmp possten
                        C
00A8  EA E9A6 ---- R         romjmp: jmp far ptr romi ;return to BIOS
00AD                    C    possten: include getascii.asm ;trans scan to a
                             scii
                        C
00AD  8C C9             C      mov cx,cs
00AF  8E D9             C      mov ds,cx
                        C      assume ds:cseg
00B1  50                C      push ax
00B2  24 7F             C      and al,7fh
00B4  BB 1174 R         C      mov bx,offset ascii_tbl
00B7  D7                C      xlat ascii_tbl
00B8  8B D8             C      mov bx,ax
00BA  58                C      pop ax
00BB  0A DB             C      or bl,bl
00BD  75 07             C      jnz chkbrk
00BF  B9 0040           C      mov cx,40h
00C2  8E D9             C      mov ds,cx ;restore ds
00C4  EB E2             C      jmp romjmp
                        C
                               assume ds:cseg
00C6  0A C0                   chkbrk: or al,al ;check for break
00C8  79 03                    jns ckrest ;make
00CA  E9 0392 R                jmp handbrk ;break
00CD  B9 0001                  ckrest: mov cx,1
00D0  38 0E 1113 R             cmp reset_flag,cl
00D4  75 24                    jne stmake
                        C    include restscn.asm ;restore screen
                        C
00D6  8C C9             C    mov cx,cs
00D8  8E D9             C    mov ds,cx
00DA  81 C1 1280        C    add cx,1280h
00DE  8E D9             C    mov ds,cx
00E0  B9 B000           C    mov cx,0b000h
00E3  8E C1             C    mov es,cx
00E5  B9 07D0           C    mov cx,2000
00E8  BE 0000           C    mov si,0
00EB  BF 0000           C    mov di,0
00EE  F3/ A5            C  rep movsw
                        C
00F0  8C C9                    mov cx,cs
00F2  8E D9                    mov ds,cx
00F4  C6 06 1113 R 00 90       setrf0: mov reset_flag,0
00FA  8B C3                    stmake: mov ax,bx ;store make in cap_buf
00FC  8B 1E 112C R             mov bx,[cap_tail]
0100  8B F3                    mov si,bx
0102  83 C3 02                 add bx,2
0105  81 FB 1150 R             cmp bx,offset cap_end
0109  75 03                    jne storeit
010B  E9 0389 R                jmp buffull
010E                           storeit:
010E  89 04                    mov [si],ax
0110  89 1E 112C R             mov cap_tail,bx
                             include keybrd1.asm
0114  2E: 8B 0E 1103 R   C    mov cx,cs:disp_addr
0119  8E C1             C    mov es,cx
011B  3C 7A             C    cmp al,"z"
011D  76 03             C    jbe ckgta
011F  E9 0386 R         C    jmp endkbd
```

```
0122  3C 61              C   ckgta: cmp al,"a"
0124  73 03              C     jae iskb
0126  E9 0386 R          C     jmp endkbd
0129                     C   iskb: include skb1.asm
                         C
0129  8C C9              C     mov cx,cs
012B  8E D9              C     mov ds,cx
012D  81 C1 1680         C     add cx,1680h
0131  8E C1              C     mov es,cx
0133  2E: 8B 0E 1103 R   C     mov cx,cs:disp_addr
0138  8E D9              C     mov ds,cx
013A  BF 0140            C     mov di,320
013D  BE 0140            C     mov si,320
0140  B9 00A0            C     mov cx,160
0143  F3/ A5             C   rep movsw
0145  BF 0320            C     mov di,800
0148  BE 0320            C     mov si,800
014B  B9 00A0            C     mov cx,160
014E  F3/ A5             C   rep movsw
0150  BF 0500            C     mov di,1280
0153  BE 0500            C     mov si,1280
0156  B9 00A0            C     mov cx,160
0159  F3/ A5             C   rep movsw
015B  BF 06E0            C     mov di,1760
015E  BE 06E0            C     mov si,1760
0161  B9 0050            C     mov cx,80
0164  F3/ A5             C   rep movsw
                         C
0166  E8 100B R          C   ibkeys: call disp_keys  ;include blankeys.asm
                         C     include ndsg.asm
0169  50                 C     push ax
016A  2E: 8B 0E 1128 R   C     mov cx,cs:numb_lets
016F  41                 C     inc cx
0170  2E: 89 0E 1128 R   C     mov cs:numb_lets,cx
0175  BB 0001            C     mov bx,1
0178  2E: 38 1E 112A R   C     cmp cs:no_ab,bl
017D  75 03              C     jne ptoindx
017F  E9 0220 R          C     jmp ndsgend
0182                     C   ptoindx:
0182  8C CB              C     mov bx,cs
0184  8E DB              C     mov ds,bx
0186  81 C3 0270         C     add bx,270h
018A  8E DB              C     mov ds,bx              ;point to index
018C  2E: 8B 3E 1124 R   C     mov di,cs:index_ptr   ;get previous pointer, initially 0
0191  8B 0D              C     mov cx,[di]           ;it points to #Q, so get #
0193  B5 00              C     mov ch,0
0195  83 F9 00           C     cmp cx,0
0198  75 03              C     jne ptq
019A  EB 7D 90           C     jmp noab
019D  47                 C   ptq: inc di             ;30001, point to Q
019E  2D 0020            C     sub ax,32             ;capitalize keyed char, A
01A1  8B D1              C     mov dx,cx             ;save #Q
01A3  8A 1D              C   bldi: mov bl,[di]
01A5  3A C3              C     cmp al,bl
01A7  74 09              C     je yesab
01A9  83 C7 01           C     add di,1
01AC  49                 C     dec cx
01AD  77 F4              C     ja bldi
01AF  EB 68 90           C     jmp noab
01B2                     C   yesab:
01B2  03 F9              C     add di,cx             ;di->A + 16(26-10) ->blank
01B4  2B D1              C     sub dx,cx             ;skipped over 10
01B6  D1 E2              C     shl dx,1
01B8  D1 E2              C     shl dx,1              ;times 4 = 40
01BA  03 FA              C     add di,dx             ;skip over 10 pairs of addresses
01BC  47                 C     inc di                ;->1st member of 11th add
```

```
                            ress pair (of #A)
01BD  8B 05              C    mov ax,[di]           ;get address of #A
01BF  86 E0              C    xchg ah,al            ;ah is first in index
01C1  2E: A3 1124 R      C    mov cs:index_ptr,ax   ;save it
01C5  83 C7 02           C    add di,2              ;->2nd member of 11th add
                            ress pair (of A in dict)
01C8  8B 05              C    mov ax,[di]           ;get address
01CA  86 E0              C    xchg ah,al            ;ah is first in index
01CC  8B F0              C    mov si,ax             ;->A in dict (si=111h)
01CE  8B D6              C    mov dx,si             ;->save it
01D0  8C C8              C    mov ax,cs
01D2  8E D8              C    mov ds,ax
01D4  05 0420            C    add ax,420h
01D7  8E D8              C    mov ds,ax             ;->dict
01D9  BF 0320            C    mov di,800            ;->" Q"
01DC  8B F2              C    mov si,dx             ;->A
01DE  2E: 8B 0E 1128 R   C    gnum: mov cx,cs:numb_lets
01E3  03 F1              C    add si,cx             ;skip over caps
01E5  BF 0320            C    mov di,800            ;->Q key
01E8  8B 04              C    mov ax,[si]           ;to get displacement from
                             " Q" or prev word
01EA  8B E9              C    mov bp,cx
01EC                     C    ckzero:
01EC  3D 0000            C    cmp ax,0              ;is it 0
01EF  74 2F              C    je ndsgend            ;yes, done with A words
01F1  86 E0              C    xchg ah,al            ;no, get hi/low right
01F3  03 F8              C    add di,ax             ;add disp
01F5  8B DA              C    mov bx,dx             ;use bx to display caps,
                             ->A
01F7  8B CD              C    mov cx,bp
01F9  8A 07              C    gcaps: mov al,[bx]    ;get cap
01FB  04 20              C    add al,32             ;change to lower case
01FD  26: 88 05          C    mov es:[di],al        ;display it
0200  43                 C    inc bx                ;->next cap
0201  83 C7 02           C    add di,2
0204  49                 C    dec cx                ;more caps?
0205  77 F2              C    ja gcaps              ;yes, get it
0207  83 C6 02           C    add si,2              ;no, ->1st lower case
020A  8B 04              C    gsmall: mov ax,[si]   ;get it
020C  3C 61              C    cmp al,97             ;is it a lower case
020E  72 DC              C    jb ckzero             ;no, its a # so get disp
0210  26: 88 05          C    mov es:[di],al        ;yes, display it
0213  46                 C    inc si                ;->next lower case
0214  83 C7 02           C    add di,2
0217  EB F1              C    jmp gsmall            ;get it
0219  2E: C6 06 112A R 01 C   noab: mov cs:no_ab,1
      90                 C
0220  58                 C    ndsgend: pop ax
                         C
                         C    include nnsg.asm
0221  50                 C    push ax
0222  BB 0001            C    mov bx,1
0225  2E: 38 1E 112B R   C    cmp cs:no_abn,bl
022A  75 03              C    jne ntoindx
022C  E9 02CF R          C    jmp nnsgend
022F                     C    ntoindx:
022F  8C CB              C    mov bx,cs
0231  8E DB              C    mov ds,bx
0233  81 C3 0210         C    add bx,210h
0237  8E DB              C    mov ds,bx             ;point to index
0239  2E: 8B 3E 1126 R   C    mov di,cs:nndex_ptr   ;get previous pointer, in
                            itially 0
023E  8B 0D              C    mov cx,[di]           ;it points to #Q, so get
                             #
0240  B5 00              C    mov ch,0
0242  83 F9 00           C    cmp cx,0
0245  75 03              C    jne ntq
0247  EB 7F 90           C    jmp noabn
024A  47                 C    ntq: inc di           ;30001, point to Q
024B  2D 0020            C    sub ax,32             ;capitalize keyed char, A
024E  8B D1              C    mov dx,cx             ;save #Q
0250  8A 1D              C    nldi: mov bl,[di]
```

```
0252  3A C3              C      cmp al,bl
0254  74 09              C      je yesabn
0256  83 C7 01           C      add di,1
0259  49                 C      dec cx
025A  77 F4              C      ja nldi
025C  EB 6A 90           C      jmp noabn
025F                     C   yesabn:
025F  03 F9              C      add di,cx              ;di->A + 16(26-10) ->blank
0261  2B D1              C      sub dx,cx              ;skipped over 10
0263  D1 E2              C      shl dx,1
0265  D1 E2              C      shl dx,1               ;times 4 = 40
0267  03 FA              C      add di,dx              ;skip over 10 pairs of addresses
0269  47                 C      inc di                 ;->1st member of 11th address pair (of #A)
026A  8B 05              C      mov ax,[di]            ;get address of #A
026C  86 E0              C      xchg ah,al             ;ah is first in index
026E  2E: A3 1126 R      C      mov cs:nndex_ptr,ax    ;save it
0272  83 C7 02           C      add di,2               ;->2nd member of 11th address pair (of A in dict)
0275  8B 05              C      mov ax,[di]            ;get address
0277  86 E0              C      xchg ah,al             ;ah is first in index
0279  8B F0              C      mov si,ax              ;->A in dict (si=111h)
027B  8B D6              C      mov dx,si              ;->save it
027D  8C C8              C      mov ax,cs
027F  8E D8              C      mov ds,ax
0281  05 0220            C      add ax,220h
0284  8E D8              C      mov ds,ax              ;->dict
0286  BF 013E            C      mov di,318             ;->" Q"
0289  8B F2              C      mov si,dx              ;->A
028B  2E: 8B 0E 1128 R   C   nnum: mov cx,cs:numb_lets
0290  03 F1              C      add si,cx              ;skip over caps
0292  BF 013E            C      mov di,318             ;->Q key
0295  8A 04              C      mov al,[si]            ;to get displacement from " Q" or prev word
0297  8B E9              C      mov bp,cx
0299                     C   nkzero:
0299  B4 00              C      mov ah,0
029B  3D 0000            C      cmp ax,0               ;is it 0
029E  74 2F              C      je nnsgend             ;yes, done with A words
02A0  D1 E0              C      shl ax,1
02A2  03 F8              C      add di,ax              ;add disp
02A4  8B DA              C      mov bx,dx              ;use bx to display caps, ->A
02A6  8B CD              C      mov cx,bp
02A8  8A 07              C   ncaps: mov al,[bx]        ;get cap
02AA  04 20              C      add al,32              ;change to lower case
02AC  26: 88 05          C      mov es:[di],al         ;display it
02AF  43                 C      inc bx                 ;->next cap
02B0  83 C7 02           C      add di,2
02B3  49                 C      dec cx                 ;more caps?
02B4  77 F2              C      ja ncaps               ;yes, get it
02B6  83 C6 01           C      add si,1               ;no, ->1st lower case
02B9  8A 04              C   nsmall: mov al,[si]       ;get it
02BB  3C 61              C      cmp al,97              ;is it a lower case
02BD  72 DA              C      jb nkzero              ;no, its a # so get disp
02BF  26: 88 05          C      mov es:[di],al         ;yes, display it
02C2  46                 C      inc si
02C3  83 C7 02           C      add di,2               ;->next lower case
02C6  EB F1              C      jmp nsmall             ;get it
02C8  2E: C6 06 112B R 01 C  noabn: mov cs:no_abn,1
      90                 C
02CF  58                 C   nnsgend: pop ax
                         C
02D0  B9 0001            C      mov cx,1
02D3  2E: 39 0E 1128 R   C      cmp cs:numb_lets,cx
02D8  76 03              C      jbe idpg
02DA  E9 0366 R          C      jmp endkbd
02DD                     C   idpg: include dpergss.asm
02DD  50                 C      push ax
02DE  8C C9              C      mov cx,cs
02E0  8E D9              C      mov ds,cx
```

```
02E2  81 C1 1480    C       add cx,1480h
02E6  8E D9         C       mov ds,cx
02E8  BF 01E2       C       mov di,482
02EB  3C 61         C       cmp al,97
02ED  72 3B         C       jb dpgend
02EF  2C 61         C       sub al,97
02F1  8A E0         C       mov ah,al
02F3  B0 00         C       mov al,0
02F5  8B F0         C       mov si,ax
02F7  B9 0050       C       mov cx,80
02FA  8A 24         C dpg1: mov ah,[si]
02FC  26: 88 25     C       mov es:[di],ah
02FF  83 C7 02      C       add di,2
0302  46            C       inc si
0303  49            C       dec cx
0304  75 F4         C       jnz dpg1
0306  BF 03C2       C       mov di,962
0309  B9 0050       C       mov cx,80
030C  8A 24         C dpg2: mov ah,[si]
030E  26: 88 25     C       mov es:[di],ah
0311  83 C7 02      C       add di,2
0314  46            C       inc si
0315  49            C       dec cx
0316  75 F4         C       jnz dpg2
0318  BF 05A2       C       mov di,1442
031B  B9 0050       C       mov cx,80
031E  8A 24         C dpg3: mov ah,[si]
0320  26: 88 25     C       mov es:[di],ah
0323  83 C7 02      C       add di,2
0326  46            C       inc si
0327  49            C       dec cx
0328  75 F4         C       jnz dpg3
032A  58            C dpgend: pop ax
                    C
032B                C idps: include dispers.asm
                    C
032B  50            C       push ax
032C  8C C9         C       mov cx,cs
032E  8E D9         C       mov ds,cx
0330  81 C1 0950    C       add cx,950h
0334  8E D9         C       mov ds,cx
0336  2C 61         C       sub al,"a"
0338  B4 00         C       mov ah,0
033A  D1 E0         C       shl ax,1
033C  D1 E0         C       shl ax,1
033E  D1 E0         C       shl ax,1
0340  D1 E0         C       shl ax,1
0342  D1 E0         C       shl ax,1
0344  BE 7020       C       mov si,7020h
0347  03 F0         C       add si,ax
0349  BF 0000       C       mov di,0
034C                C pkl32:
034C  8B 04         C       mov ax,[si]
034E  0B C0         C       or ax,ax
0350  75 03         C       jnz pkl6
0352  EB 31 90      C       jmp pk99
0355                C pkl6:
0355  56            C       push si
0356  8B F0         C       mov si,ax
0358  8B 0C         C       mov cx,[si]
035A  51            C       push cx
035B  B5 0E         C       mov ch,14
035D  83 C6 02      C       add si,2
0360  57            C       push di
0361  8A 1C         C pkl01: mov bl,[si]
0363  26: 88 1D     C       mov es:[di],bl
0366  83 C6 02      C       add si,2
0369  83 C7 02      C       add di,2
036C  80 ED 02      C       sub ch,2
036F  74 05         C       jz pkl02
0371  80 E9 02      C       sub cl,2
0374  75 EB         C       jnz pkl01
```

```
0376                        C   pk102:
0376    5F                  C     pop di
0377    59                  C     pop cx
0378    5E                  C     pop si
0379    83 C6 02            C     add si,2
037C    83 C7 10            C     add di,16
037F    81 FF 0140          C     cmp di,320
0383    76 C7               C     jbe pk132
0385    58                  C   pk99: pop ax
                            C
0386                        C     endkbd:
                            C
0386    E9 10CA R               jmpret: jmp return
0389    B8 1130 R               buffull: mov ax,offset cap_buf
038C    A3 112C R                 mov cap_tail,ax
038F    E9 10C7 R                 jmp fulbeep
0392                              handbrk: ;cli ;handle break
0392    8B C3                     mov ax,bx
0394    BE 1130 R               ckperst: mov si,offset cap_buf ;->make buffer
0397    BB 0001                   mov bx,1
039A    38 1E 1107 R              cmp per_steno,bl
039E    75 09                     jne ckbeqm
03A0    C6 06 1107 R 00 90        mov per_steno,0
03A6    EB 71 90                  jmp hilght ;on second break of personal steno
03A9    3B 36 112C R            ckbeqm: cmp si,[cap_tail]
03AD    75 03                     jnz cmpbm
03AF    E9 10CA R                 jmp return ;reached end of make buffer, so br
                                eak<>make
03B2    3A 04                   cmpbm: cmp al,[si]
03B4    74 05                     jz beqm  ;break=make
03B6    83 C6 02                  add si,2
03B9    EB EE                     jmp ckbeqm
03BB    8B 0E 112C R            beqm: mov cx,[cap_tail]
03BF    81 F9 1132 R              cmp cx,offset cap_buf+2
03C3    76 03                     jbe onemake ;1 make in cap_buf
03C5    E9 07E3 R                 jmp setlen ;>1 make in cap_buf
03C8                            onemake:
03C8    A1 1130 R                 mov ax,[cap_buf]
03CB    3C 20                     cmp al," "
03CD    74 0E                     je hilight
03CF    BB 0001                   mov bx,1
03D2    38 1E 1106 R              cmp set_cap,bl
03D6    75 02                     jne jntspce
03D8    2C 20                     sub al,32
03DA    E9 07D1 R               jntspce: jmp ntspace
03DD    C6 06 1115 R 01 90      hilight: mov last_space,1
03E3    C7 06 1124 R 0000         mov index_ptr,0
03E9    C7 06 1126 R 0000         mov nndex_ptr,0
03EF    C7 06 1128 R 0000         mov numb_lets,0
03F5    C6 06 112A R 00 90        mov no_ab,0
03FB    C6 06 112B R 00 90        mov no_abn,0
0401    C6 06 1116 R 00 90        mov last_steno,0
0407    E8 100B R                 call disp_keys
040A    E8 0FD7 R                 call dng
040D    B8 4650                   mov ax,4650h
0410    8C C8                     mov ax,cs
0412    8E D8                     mov ds,ax
0414    05 0950                   add ax,950h
0417    8E C0                     mov es,ax
                                  assume ds:video
0419                        C     hilght: include hili1.asm
                            C
0419    1E                  C       push ds
041A    E8 109A R           C       call gtxtwrd
041D    83 C3 02            C       add bx,2
0420    2B FB               C       sub di,bx
0422    74 45               C       jz k813
0424    8B CF               C       mov cx,di
0426    83 C1 02            C       add cx,2
0429    8B 3F               C       mov di,[bx]
042B    81 E7 00FF          C       and di,0ffh
```

```
042F  03 FF           C     add di,di
0431  81 C7 1000      C     add di,1000h
0435  26: 8B 2D       C     mov bp,es:[di]
0438  26: 8B 55 02    C     mov dx,es:[di+2]
043C  3B EA           C   b130: cmp bp,dx
043E  73 29           C     jae k813
0440  26: 39 4E 00    C     cmp es:[bp],cx
0444  75 1A           C     jnz s132
0446  BE 0002         C     mov si,2
0449  83 C6 02        C   b131: add si,2
044C  3B F1           C     cmp si,cx
044E  75 03           C     jnz b1305
0450  E9 06C8 R       C     jmp k812
0453  8B 40 FE        C   b1305: mov ax,[bx+si-2]
0456  26: 3A 02       C     cmp al,es:[bp+si]
0459  7F 05           C     jg s132
045B  74 EC           C     jz b131
045D  EB 0A 90        C     jmp k813
0460  26: 03 6E 00    C   s132: add bp,es:[bp]
0464  83 C5 04        C     add bp,4
0467  EB D3           C     jmp b130
0469                  C   k813:
0469                  C   ph0:
                      C   ;include pshili.asm
0469  53              C     push bx
046A  51              C     push cx
046B  1E              C     push ds
046C  06              C     push es
046D  8C C8           C     mov ax,cs
046F  8E D8           C     mov ds,ax
0471  05 0950         C     add ax,950h
0474  8E D8           C     mov ds,ax
0476  B8 B000         C     mov ax,0b000h
0479  8E C0           C     mov es,ax
047B  8B D1           C     mov dx,cx
047D  8B FB           C     mov di,bx
047F  26: 8A 05       C     mov al,es:[di]
0482  3C 60           C     cmp al,96
0484  77 02           C     ja h0
0486  04 20           C     add al,32
0488                  C   h0:
0488  B4 00           C     mov ah,0
048A  2C 61           C     sub al,"a"
048C  D1 E0           C     shl ax,1
048E  D1 E0           C     shl ax,1
0490  D1 E0           C     shl ax,1
0492  D1 E0           C     shl ax,1
0494  D1 E0           C     shl ax,1
0496  BE 7020         C     mov si,7020h
0499  03 F0           C     add si,ax
049B  BB 0000         C     mov bx,0
049E                  C   h1:
049E  8B 00           C     mov ax,[si+bx]
04A0  0B C0           C     or ax,ax
04A2  75 03           C     jnz h44
04A4  E9 0596 R       C     jmp h4
04A7                  C   h44:
04A7  56              C     push si
04A8  57              C     push di
04A9  8B F0           C     mov si,ax
04AB  8B 0C           C     mov cx,[si]
04AD  83 C6 02        C     add si,2
04B0  83 E9 02        C     sub cx,2
04B3  26: 8A 05       C     mov al,es:[di]
04B6  3A 04           C     cmp al,[si]
04B8  74 09           C     je cfc
04BA  04 20           C     add al,32
04BC  3A 04           C     cmp al,[si]
04BE  74 03           C     je cfc
```

```
04C0    EB 0A 90              C        jmp cfd
04C3                          C    cfc:
04C3    83 C6 02              C        add si,2
04C6    83 C7 02              C        add di,2
04C9    83 E9 02              C        sub cx,2
04CC                          C    cfd:
04CC    F3/ A6                C    repe cmps [si],[di]
04CE    74 0D                 C        jz h3
04D0                          C    h2:
04D0    5F                    C        pop di
04D1    5E                    C        pop si
04D2    83 C3 02              C        add bx,2
04D5    83 FB 10              C        cmp bx,10h
04D8    76 C4                 C        jbe h1
04DA    E9 0596 R             C        jmp h4
04DD                          C    h3:
04DD    5F                    C        pop di
04DE    5E                    C        pop si
04DF    57                    C        push di
04E0    BF 00A1               C        mov di,161
04E3    03 DB                 C        add bx,bx
04E5    03 DB                 C        add bx,bx
04E7    03 DB                 C        add bx,bx
04E9    03 FB                 C    abx: add di,bx
04EB    B8 0001               C        mov ax,1
04EE    2E: 38 06 1108 R      C        cmp cs:disp_kb,al
04F3    75 0E                 C        jne hpopdi
04F5    B0 8F                 C        mov al,8fh
04F7    26: 88 45 04          C        mov es:[di+4],al
04FB    26: 88 45 06          C        mov es:[di+6],al
04FF    26: 88 45 08          C        mov es:[di+8],al
0503                          C        hpopdi:
0503    5F                    C        pop di
0504    B4 0F                 C        mov ah,15
0506    26: 88 65 01          C        mov es:[di+1],ah
050A    B8 0001               C        mov ax,1
050D    2E: 38 06 1108 R      C        cmp cs:disp_kb,al
0512    75 3D                 C        jne hilkend
0514    26: 8B 05             C        mov ax,es:[di]
0517    53                    C        push bx
0518    57                    C        push di
0519    1E                    C        push ds
051A    8C CB                 C        mov bx,cs
051C    8E DB                 C        mov ds,bx
051E    B4 00                 C        mov ah,0
0520    2C 61                 C        sub al,97
0522    BB 11AF R             C        mov bx,offset kbt
0525    D7                    C        xlat
0526    03 C0                 C        add ax,ax
0528    3D 00A0               C        cmp ax,160
052B    72 0B                 C        jb psh13
052D    3D 0140               C        cmp ax,320
0530    72 03                 C        jb psh12
0532    05 0140               C        add ax,320
0535    05 0140               C    psh12: add ax,320
0538    05 0280               C    psh13: add ax,640
053B    BF 0003               C        mov di,3
053E    03 F8                 C        add di,ax
0540    B0 8F                 C        mov al,8fh
0542    26: 88 45 04          C        mov es:[di+4],al
0546    26: 88 45 06          C        mov es:[di+6],al
054A    26: 88 45 08          C        mov es:[di+8],al
054E    1F                    C        pop ds
054F    5F                    C        pop di
0550    5B                    C        pop bx
0551                          C    hilkend:
0551    8B C3                 C        mov ax,bx
0553    D1 E8                 C        shr ax,1
0555    D1 E8                 C        shr ax,1
0557    D1 E8                 C        shr ax,1
0559    D1 E8                 C        shr ax,1
```

```
055B  05 0031           C     add  ax,31h
055E  B4 0F             C     mov  ah,15
0560  03 FA             C     add  di,dx
0562  26: 88 05         C     mov  es:[di],al
0565  B9 3FE0           C       mov cx,3fe0h
0568  8E D9             C       mov ds,cx
                        C       assume ds:beep
056A  8B C8             C       mov cx,ax
056C  83 E9 30          C       sub cx,30h
056F  D1 E1             C       shl cx,1
0571  88 0E 0000 R      C       mov beep_count,cl
0575  C7 06 0002 R 03E3 C       mov beep_freq,995
057B  2E: 89 3E 1120 R  C     mov cs:[hl_head],di
0580  83 C7 02          C     add  di,2
0583  2E: 89 3E 1122 R  C     mov cs:[hl_tail],di
0588  83 EF 02          C     sub  di,2
058B  2B FA             C     sub  di,dx
058D  8B CA             C     mov  cx,dx
058F  07                C     pop  es
0590  1F                C     pop  ds
0591  59                C     pop  cx
0592  5B                C     pop  bx
0593  E9 07B8 R         C     jmp  s134
0596                    C   h4:
0596  07                C     pop  es
0597  1F                C     pop  ds
0598  59                C     pop  cx
0599  5B                C     pop  bx
059A                    C   ph9:
                        C   include sgh.asm
                        C
059A  1E                C     push ds
059B  06                C     push es
059C  53                C     push bx
059D  51                C     push cx
059E  B8 B000           C     mov  ax,0b000h
05A1  8E C0             C     mov  es,ax            ;->display
05A3  BF 0000           C     mov  di,0             ;->1st text char
05A6  BD 0000           C     mov  bp,0             ;init index ptr
05A9                    C   gptr:
05A9  8C C8             C     mov  ax,cs
05AB  8E D8             C     mov  ds,ax
05AD  05 0270           C     add  ax,270h
05B0  8E D8             C       mov ds,ax           ;point to index
05B2  8B F5             C       mov si,bp           ;get previous pointer, initially 0
05B4  8B 0C             C       mov cx,[si]         ;it points to #@, so get #
05B6  B5 00             C       mov ch,0
05B8  83 F9 00          C       cmp cx,0            ;any letters in index?
05BB  75 03             C       jne ptoq            ;yes
05BD  E9 0657 R         C       jmp noabc           ;no
05C0  46                C     ptoq: inc si         ;30001, point to Q
05C1  26: 8B 01         C       mov ax,es:[bx+di]   ;get next character of text word
05C4  2D 0020           C       sub ax,32           ;capitalize it, A
05C7  8B D1             C       mov dx,cx           ;save #@
05C9  8A 24             C     calah: mov ah,[si]
05CB  3A C4             C       cmp al,ah           ;this letter in index?
05CD  74 09             C       je  yesabc          ;yes
05CF  83 C6 01          C       add si,1
05D2  49                C       dec cx
05D3  77 F4             C       ja  calah           ;more letters
05D5  E9 0657 R         C       jmp noabc           ;no, this letter not in index
05D8  03 F1             C     yesabc: add si,cx    ;si->A + 16(26-10) ->blank
05DA  2B D1             C       sub dx,cx           ;skipped over 10
05DC  D1 E2             C       shl dx,1
05DE  D1 E2             C       shl dx,1            ;times 4 = 40
```

| | | | | |
|---|---|---|---|---|
| 05E0 | 03 F2 | C | add si,dx | ;skip over 10 pairs of addresses |
| 05E2 | 46 | C | inc si | ;->1st member of 11th address pair (of #A) |
| 05E3 | 8B 04 | C | mov ax,[si] | ;get address of #A |
| 05E5 | 86 E0 | C | xchg ah,al | ;ah is first in index |
| 05E7 | 8B E8 | C | mov bp,ax | ;save it |
| 05E9 | 83 C6 02 | C | add si,2 | ;->2nd member of 11th address pair (of A in dict) |
| 05EC | 8B 04 | C | mov ax,[si] | ;get address |
| 05EE | 86 E0 | C | xchg ah,al | ;ah is first in index |
| 05F0 | 8B F0 | C | mov si,ax | ;->A in dict (si=111h) |
| 05F2 | 8C C8 | C | mov ax,cs | |
| 05F4 | 8E D8 | C | mov ds,ax | |
| 05F6 | 05 0420 | C | add ax,420h | |
| 05F9 | 8E D8 | C | mov ds,ax | ;->dict |
| 05FB | 83 C7 02 | C | add di,2 | |
| 05FE | 8B CF | C | mov cx,di | |
| 0600 | D1 E9 | C | shr cx,1 | ;# caps |
| 0602 | 03 F1 | C | add si,cx | ;skip over caps |
| 0604 | 8B 04 | C | mov ax,[si] | ;to get displacement from " Q" or prev word |
| 0606 | 57 | C | pushdi: push di | ;save pos of 1st small |
| 0607 | 83 C6 02 | C | addsi2: add si,2 | ;skip over disp or ->disp |
| 060A | 8B 04 | C | movaxsi: mov ax,[si] | ;get it |
| 060C | 3C 61 | C | cmp al,97 | ;is it a lower case? |
| 060E | 72 18 | C | jb ckdfsp | ;no, its a # so check for space |
| 0610 | 26: 38 01 | C | cmp es:[bx+di],al | ;yes, compare it to text char |
| 0613 | 75 06 | C | jne getend | ;not equal so get following disp |
| 0615 | 46 | C | inc si | ;= so -> next lower case |
| 0616 | 83 C7 02 | C | add di,2 | ;-> next text char |
| 0619 | EB EF | C | jmp movaxsi | ;go get next lower case |
| 061B | 46 | C | getend: inc si | ;->next lower case |
| 061C | 8B 04 | C | mov ax,[si] | ;get it |
| 061E | 3C 61 | C | cmp al,97 | ;is it a disp |
| 0620 | 77 F9 | C | ja getend | ;no get next |
| 0622 | 5F | C | pop di | ;yes, ->1st small |
| 0623 | 83 EE 02 | C | sub si,2 | ;so add si,2 will ->disp |
| 0626 | EB DE | C | jmp pushdi | ;get disp |
| 0628 | B9 0020 | C | ckdfsp: mov cx,32 | |
| 062B | 26: 38 49 02 | C | cmp es:[bx+di+2],cl | ;reached end of text word? |
| 062F | 76 09 | C | jbe matchi | ;yes, go hilight |
| | | C | ;je matchi | ;yes, go hilight |
| 0631 | 3D 0000 | C | cmp ax,0 | ;no, reached last lower case? |
| 0634 | 75 D1 | C | jne addsi2 | ;no skip over disp & get next lower case |
| 0636 | 5F | C | pop di | ;-> next text char as cap |
| 0637 | E9 05A9 R | C | jmp gptr | ;look for it in index |
| 063A | 5F | C | matchi: pop di | ;recover # caps |
| 063B | B4 0F | C | mov ah,15 | |
| 063D | 26: 88 61 01 | C | mov es:[bx+di+1],ah | ;hilight last cap |
| 0641 | 1E | C | push ds | |
| 0642 | B9 3FE0 | C | mov cx,3fe0h | |
| 0645 | 8E D9 | C | mov ds,cx | |
| | | C | assume ds:beep | |
| 0647 | 8B CF | C | mov cx,di | |
| 0649 | 83 C1 02 | C | add cx,2 | |
| 064C | C7 06 0002 R 07C5 | C | mov beep_freq,1989 | |
| 0652 | 88 0E 0000 R | C | mov beep_count,cl | |
| 0656 | 1F | C | pop ds | |
| 0657 | | C | noabc: | |
| 0657 | 59 | C | pop cx | |
| 0658 | 5B | C | pop bx | |
| 0659 | 07 | C | pop es | |
| 065A | 1F | C | pop ds | |
| | | C | | |

```
065B    1E              C   ;include loadper.asm
065C    06              C   push ds
065D    8C C8           C   push es
065F    8E D8           C     mov ax,cs
0661    05 1480         C     mov ds,ax
0664    8E C0           C     add ax,1480h
0666    B8 B000         C   mov es,ax
0669    8E D8           C   mov ax,0b000h
                        C   mov ds,ax
                        C   assume ds:video,es:nothing
066B    8B F3           C   mov si,bx
066D    8A 04           C   mov al,[si]
066F    2C 41           C   sub al,65
0671    3C 20           C   cmp al,32
0673    72 02           C   jb pl0
0675    2C 20           C   sub al,32
0677                    C   pl0:
0677    8A E0           C   mov ah,al
0679    B0 00           C   mov al,0
067B    8B F8           C   mov di,ax
067D    8A 44 02        C   mov al,[si+2]
0680    2C 61           C   sub al,97
0682    B4 00           C   mov ah,0
0684    1E              C   push ds
0685    8C CB           C   mov bx,cs
0687    8E DB           C   mov ds,bx
                        C   assume  ds:cseg
0689    BB 11AF R       C   mov bx,offset kbt
068C    D7              C   xlat
068D    1F              C   pop ds
                        C   assume ds:video
068E    03 F8           C     add di,ax
0690    B9 000F         C   mov cx,15
0693    8A 04           C   pl1: mov al,[si]
0695    3C 2E           C      cmp al,"."
0697    75 05           C      jne pnp
0699    B0 20           C      mov al,32
069B    EB 14 90        C      jmp p13
069E                    C   pnp:
069E    3C 2C           C      cmp al,","
06A0    75 05           C      jne p12
06A2    B0 20           C      mov al,32
06A4    EB 0B 90        C      jmp p13
06A7    3C 61           C      p12: cmp al,97
06A9    73 06           C      jae p13
06AB    3C 41           C      cmp al,65
06AD    72 02           C      jb p13
06AF    04 20           C      add al,32
06B1    26: 88 05       C      p13: mov es:[di],al
06B4    47              C   inc di
06B5    83 C6 02        C   add si,2
06B8    49              C   dec cx
06B9    75 D8           C   jnz pl1
06BB    07              C   pop es
06BC    1F              C   pop ds
06BD    2E: A1 1130 R   C     mov ax,cs:[cap_buf]
06C1    1F              C     pop ds
06C2    E8 1073 R       C     call ptcharb
06C5    E9 0F87 R       C     jmp rsetbuf
06C8    26: 03 6E 00    C   k812: add bp,es:[bp]
06CC    83 C5 02        C     add bp,2
06CF    26: 8B 6E 00    C     mov bp,es:[bp]
06D3    26: 8B 56 00    C     mov dx,es:[bp]
06D7    BF 0000         C     mov di,0
06DA    83 C7 02        C   b132: add di,2
06DD    3B FA           C     cmp di,dx
06DF    76 03           C     jbe b1325
06E1    E9 07B8 R       C     jmp s134
06E4    BE 0000         C   b1325: mov si,0
06E7    26: 8B 03       C   b133: mov ax,es:[bp+di]
06EA    3C 20           C     cmp al,32
```

```
06EC  74 07                      C        je hili0
06EE  3A 00                      C        cmp al,[bx+si]
06F0  74 03                      C        jz hili0
06F2  E9 079F R                  C        jmp s133
06F5                             C      hili0:
06F5  50                         C        push ax
06F6  B8 0001                    C        mov ax,1
06F9  2E: 38 06 1108 R           C        cmp cs:disp_kb,al
06FE  58                         C        pop ax
06FF  74 03                      C        je psh0
0701  E9 0797 R                  C        jmp psh9
0704                             C      psh0:
                                 C      ;include sshili.asm
0704  53                         C        push bx
0705  57                         C        push di
0706  3C 61                      C        cmp al,"a"
0708  72 07                      C        jb shi
070A  3C 7A                      C        cmp al,"z"
070C  77 03                      C        ja shi
070E  EB 52 90                   C        jmp pbk0
0711                             C      shi:
0711  BF 07BE                    C        mov di,1982
0714  B0 53                      C        mov al,53h
0716  88 05                      C        mov [di],al
0718  B0 8F                      C        mov al,8fh
071A  88 45 FF                   C        mov [di-1],al
071D  88 45 01                   C        mov [di+1],al
0720  83 C7 08                   C        add di,8
0723  B0 50                      C        mov al,50h
0725  88 05                      C        mov [di],al
0727  B0 8F                      C        mov al,8fh
0729  88 45 FF                   C        mov [di-1],al
072C  88 45 01                   C        mov [di+1],al
072F  83 C7 08                   C        add di,8
0732  B0 41                      C        mov al,41h
0734  88 05                      C        mov [di],al
0736  B0 8F                      C        mov al,8fh
0738  88 45 FF                   C        mov [di-1],al
073B  88 45 01                   C        mov [di+1],al
073E  83 C7 08                   C        add di,8
0741  B0 43                      C        mov al,43h
0743  88 05                      C        mov [di],al
0745  B0 8F                      C        mov al,8fh
0747  88 45 FF                   C        mov [di-1],al
074A  88 45 01                   C        mov [di+1],al
074D  83 C7 08                   C        add di,8
0750  B0 45                      C        mov al,45h
0752  88 05                      C        mov [di],al
0754  B0 8F                      C        mov al,8fh
0756  88 45 FF                   C        mov [di-1],al
0759  88 45 01                   C        mov [di+1],al
075C  88 45 03                   C        mov [di+3],al
075F  EB 34 90                   C        jmp hiend
0762                             C      pbk0:
0762  1E                         C        push ds
0763  8C CB                      C        mov bx,cs
0765  8E DB                      C        mov ds,bx
                                 C      assume ds:cseg
0767  BB 11AF R                  C        mov bx,offset kbt
076A  B4 00                      C        mov ah,0
076C  2C 61                      C        sub al,97
076E  D7                         C        xlat
076F  1F                         C        pop ds
                                 C      assume ds:video
0770                             C      hili:
0770  03 C0                      C        add ax,ax
0772  3D 00A0                    C        cmp ax,160
0775  72 0B                      C        jb pbk13
0777  3D 0140                    C        cmp ax,320
077A  72 03                      C        jb pbk12
077C  05 0140                    C        add ax,320
```

```
077F  05 0140                    C    pbk12: add ax,320
0782  05 0282                    C    pbk13: add ax,642
0785  BF 0001                    C      mov di,1
0788  03 F8                      C      add di,ax
078A  B0 8F                      C      mov al,8fh
078C  88 45 04                   C      mov [di+4],al
078F  88 45 06                   C      mov [di+6],al
0792  88 45 08                   C      mov [di+8],al
0795                             C    hiend:
0795  5F                         C      pop di
0796  5B                         C      pop bx
0797                             C    psh9:
0797  B0 0F                      C      mov al,15
0799  88 40 01                   C      mov [bx+si+1],al
079C  E9 06DA R                  C      jmp b132
079F  83 C6 02                   C    s133: add si,2
07A2  3B F1                      C      cmp si,cx
07A4  77 03                      C      ja s1335
07A6  E9 06E7 R                  C      jmp b133
07A9                             C    s1335:
07A9  8B F1                      C      mov si,cx
07AB  83 EE 02                   C      sub si,2
07AE  26: 8B 03                  C      mov ax,es:[bp+di]
07B1  B4 70                      C      mov ah,112
07B3  89 00                      C      mov [bx+si],ax
07B5  E9 06DA R                  C      jmp b132
07B8  2E: 89 1E 1120 R           C    s134: mov cs:[hl_head],bx
07BD  03 D9                      C      add bx,cx
07BF  83 EB 02                   C      sub bx,2
07C2  2E: 89 1E 1122 R           C      mov cs:[hl_tail],bx
07C7  B8 4D20                    C      mov ax,4d20h
07CA  E8 1073 R                  C      call ptcharb
07CD  1F                         C      pop ds
                                 C
07CE  E9 0F87 R                       jmp rsetbuf
                                      assume ds:cseg
07D1                                ntspace:
07D1  C6 06 1115 R 00     90       mov last_space,0
07D7  C6 06 1116 R 00     90       mov last_steno,0
07DD  E8 1073 R                    call ptcharb
07E0  E9 0F87 R                    jmp rsetbuf
07E3                              setlen:
07E3  BE 1130 R                    mov si,offset cap_buf
07E6  2B CE                        sub cx,si
07E8  89 0E 112E R                 mov cap_len,cx
                                 C   include savbuf1.asm ;save unalpabetized make
                                     buffer in dap_buf
07EC  06                         C   push es
07ED  51                         C   push cx
07EE  56                         C   push si
07EF  57                         C   push di
07F0  8C C9                      C   mov cx,cs
07F2  8E C1                      C   mov es,cx
07F4  BE 112E R                  C   mov si,offset cap_len
07F7  BF 1152 R                  C   mov di,offset dap_len
07FA  B9 0011                    C   mov cx,17
07FD  F3/ A5                     C  rep movsw
07FF  5F                         C   pop di
0800  5E                         C   pop si
0801  59                         C   pop cx
0802  07                         C   pop es
                                 C
                                 C    include alpbuf.asm
                                 C
0803  83 E9 02                   C  b20: sub cx,2
0806  74 18                      C    jz parsebf
0808  BB 0000                    C    mov bx,0
080B  8B 00                      C  b21: mov ax,[bx][si]
080D  3A 40 02                   C    cmp al,[bx+2][si]
0810  7C 05                      C    jl s20
```

```
0812  87 40 02         C      xchg ax,[bx+2][si]
0815  89 00            C      mov [bx][si],ax
0817  83 C3 02         C  s20: add bx,2
081A  3B D9            C      cmp bx,cx
081C  75 ED            C      jne b21
081E  EB E3            C      jmp b20
                       C
0820                   C  parsebf: include parse1.asm
0820  8C CA            C      mov dx,cs
0822  8E DA            C      mov ds,dx
0824  81 C2 1680       C      add dx,1680h
0828  8E C2            C      mov es,dx
                       C      assume ds:cseg
082A  A1 1130 R        C      mov ax,[cap_buf]
082D  8B 1E 1132 R     C      mov bx,2[cap_buf]
0831  8B 0E 112E R     C      mov cx,[cap_len]
0835  83 F9 04         C      cmp cx,4         ;check for two or less chars
0838  76 03            C      jbe ckfcb        ;go check first char blank
083A  E9 08D7 R        C      jmp ckle3        ;go check cap_buf len equal 3
083D  3C 20            C  ckfcb: cmp al," "    ;check first char blank
083F  74 03            C      je fcb           ;first char blank
0841  EB 41 90         C      jmp fcnb         ;first char not blank
0844  80 FB 61         C  fcb: cmp bl,"a"      ;check sec char alpha
0847  72 0B            C      jb ckscn         ;go check sec char number
0849  80 FB 7A         C      cmp bl,"z"
084C  77 03            C      ja jprcbf        ;first char blank, sec char>z
084E  E9 0931 R        C      jmp fcbsca       ;first char blank, sec char alpha
0851  E9 0EBB R        C  jprcbf: jmp procbuf
0854  80 FB 30         C  ckscn: cmp bl,"0"    ;check sec char number
0857  72 08            C      jb ckscs         ;go check sec char slash
0859  80 FB 39         C      cmp bl,"9"
085C  77 0B            C      ja ckscbs        ;go check sec char back slash
085E  E9 090A R        C      jmp fcbscn       ;first char blank, sec char number
0861  80 FB 2F         C  ckscs: cmp bl,"/"    ;check sec char slash
0864  75 0B            C      jne ckscc        ;go check sec char comma
0866  E9 0A13 R        C  japs: jmp aps        ;add personal steno
0869  80 FB 5C         C  ckscbs: cmp bl,"\"   ;ckeck sec char back slash
086C  74 F8            C      je japs          ;jump to jump to add personal steno
086E  E9 0EBB R        C      jmp procbuf      ;standard steno
0871  80 FB 2C         C  ckscc: cmp bl,","    ;check sec char comma
0874  75 03            C      jne ckscp        ;go ckeck sec char period
0876  E9 0B4A R        C      jmp bcomma       ;first char blank, sec char comma
0879  80 FB 2E         C  ckscp: cmp bl,"."    ;ckeck sec char period
087C  74 03            C      je jbper         ;first char blank, sec char period
087E  E9 0EBB R        C      jmp procbuf
0881  E9 0B35 R        C  jbper: jmp bperiod
0884  3C 01            C  fcnb: cmp al,1       ;first char not blank, check first char 1
0886  75 03            C      jne ckfcn        ;go check first char number
0888  E9 0946 R        C      jmp fc1          ;first char 1 (Alt or Caps Lock)
088B  3C 30            C  ckfcn: cmp al,"0"    ;ckeck first char number
088D  72 11            C      jb ckfcs         ;go check first char slash
088F  3C 39            C      cmp al,"9"
0891  77 1C            C      ja ckfcbs        ;go check first char back slash
0893  80 FB 61         C  fcn: cmp bl,"a"      ;first char number, check sec char alpha
0896  72 B9            C      jb jprcbf        ;sec char <a
0898  80 FB 7A         C      cmp bl,"z"
089B  77 B4            C      ja jprcbf        ;sec char >z
089D  E9 0ABB R        C      jmp gps          ;first char number, sec char alpha, get personal steno
08A0  3C 2F            C  ckfcs: cmp al,"/"    ;check first char slash
08A2  75 12            C      jne ckfcc        ;go check first char comma
08A4  80 FB 5C         C  cksbs: cmp bl,"\"    ;check slash back slash
```

```
08A7  75 03              C   jne jsuf
08A9  E9 0E81 R          C   jmp beeps
08AC  E9 0E3D R          C   jsuf: jmp suffix     ;first char slash - suffix
08AF  3C 5C              C   ckfcbs: cmp al,"\"   ;check first char back slash
08B1  74 F9              C   je jsuf              ;first char back slash - suff
                                                   ix
08B3  E9 0EBB R          C   jmp procbuf
08B6  3C 2C              C   ckfcc: cmp al,","    ;check first char comma
08B8  75 0B              C   jne ckfcp            ;go check first char period
08BA  80 FB 2E           C   cmp bl,"."           ;first char comma, check sec
                                                   char period
08BD  74 03              C   je jfccscp           ;first char comma, sec char p
                                                   eriod
08BF  E9 0C76 R          C   jmp fcc              ;first char comma
08C2  E9 0D41 R          C   jfccscp: jmp fccscp
08C5  3C 2E              C   ckfcp: cmp al,"."    ;check first char period
08C7  74 03              C   je ckps              ;go check for period slash
08C9  E9 0EBB R          C   jmp procbuf
08CC  80 FB 2F           C   ckps: cmp bl,"/"     ;check sec char slash
08CF  74 03              C   je jkbon             ;go toggle screen keyboard
08D1  E9 0EBB R          C   jmp procbuf
08D4  E9 0E11 R          C   jkbon: jmp kbon      ;toggle screen keyboard
08D7  83 F9 06           C   ckle3: cmp cx,6      ;check cap_buf len = 3
08DA  74 03              C   je ckbsa             ;go check blank,slash,alpha (
                                                   personal guess)
08DC  E9 0EBB R          C   jmp procbuf
08DF  3C 20              C   ckbsa: cmp al," "    ;check first char blank
08E1  74 03              C   je cksa              ;go check sec char slash
08E3  E9 0EBB R          C   jmp procbuf
08E6  80 FB 2F           C   cksa: cmp bl,"/"     ;check sec char slash
08E9  74 08              C   je cka               ;go check third char alpha
08EB  80 FB 5C           C   cmp bl,"\"           ;check sec char back slash
08EE  74 03              C   je cka
08F0  E9 0EBB R          C   jmp procbuf
08F3  8B 16 1134 R       C   cka: mov dx,[cap_buf+4]  ;get third char
08F7  83 FA 61           C   cmp dx,"a"           ;check third char alph
                                                   a
08FA  77 03              C   ja ckz
08FC  E9 0EBB R          C   jmp procbuf
08FF  80 FA 7A           C   ckz: cmp dl,"z"
0902  76 03              C   jbe jgpg             ;blank, slash, alpha - get pe
                                                   rsonal guess
0904  E9 0EBB R          C   jmp procbuf
0907  E9 0B5F R          C   jgpg: jmp gpg        ;jump get personal guess
090A                     C   fcbscn:              ;first char blank, second cha
                                                   r number - get standard guess
090A  8B CB              C   mov cx,bx
090C  B5 00              C   mov ch,0
090E  80 E9 30           C   sub cl,30h
0911  80 F9 00           C   cmp cl,0
0914  75 06              C   jne mdc
0916  BF 000A            C   mov di,10
0919  EB 03 90           C   jmp mc4
091C                     C   mdc:
091C  8B F9              C   mov di,cx
091E                     C   mc4:
091E  B1 04              C   mov cl,4
0920  D3 E7              C   shl di,cl
0922  81 C7 0140         C   add di,320
0926  83 EF 10           C   sub di,16
0929  B9 B000            C   mov cx,0b000h
092C  8E C1              C   mov es,cx
092E  EB 44 90           C   jmp adjfnl
                         C   ;fcbsca: mov dx,0    ;first char blank, sec char
                                                   alpha,
                         C   ;cmp numb_lets,dx    ;check for beginning of new w
                                                   ord
                         C   ;jne gsg
                         C   ;jmp procbuf
                         C   ;fcbsca: jmp procbuf
                         C   ;fcbsca: mov dx,1    ;first char blank, sec char
                                                   alpha,
```

```
                     C  ;cmp last_space,dl  ;check for beginning of new
                                             word
                     C  ;je gsg
                     C  ;cmp last_steno,dl
                     C  ;je gsg
                     C  ;jmp untran
0931  BA 0001        C   fcbsca: mov dx,1    ;first char blank, sec char
                                              alpha,
0934  38 16 1115 R   C   cmp last_space,dl   ;check for beginning of new
                                              word
0938  74 09          C   je jpbu
093A  38 16 1116 R   C   cmp last_steno,dl
093E  74 03          C   je jpbu
0940  EB 07 90       C   jmp gsg
0943  E9 0EBB R      C   jpbu: jmp procbuf
0946  E9 0F6B R      C   fc1: jmp untran     ;two chars, first Alt or Cap
                                              s Lock
0949                 C   gsg:                ;get standard guess
0949  8B C3          C    mov ax,bx
094B  8B D3          C    mov dx,bx
094D  B4 00          C    mov ah,0
094F  BB 11AF R      C    mov bx,offset kbt
0952  2C 61          C    sub al,97
0954  D7             C    xlat
0955  03 C0          C    add ax,ax
0957  3D 00A0        C    cmp ax,160
095A  72 0B          C    jb gsg13
095C  3D 0140        C    cmp ax,320
095F  72 03          C    jb gsg12
0961  05 0140        C    add ax,320
0964  05 0140        C    gsg12: add ax,320
0967  05 0320        C    gsg13: add ax,800
096A  8B F8          C    mov di,ax
096C  2E: 8B 1E 1128 R C  mov bx,cs:numb_lets
0971  EB 07 90       C    jmp shlbx
0974                 C   adjfnl:
0974  2E: 8B 1E 1128 R C  mov bx,cs:numb_lets
0979  43             C    inc bx
097A                 C   shlbx:
097A  D1 E3          C    shl bx,1
097C  26: 8B 45 02   C    mov ax,es:[di+2]
0980  3C 20          C    cmp al,32
0982  74 0F          C    je ckdip2
0984  26: 8B 05      C    mov ax,es:[di]
0987  3C 20          C    cmp al,32
0989  74 03          C    je quest
098B  83 EF 02       C    sub di,2
098E                 C   quest:
098E  03 FB          C    add di,bx
0990  EB 14 90       C    jmp gsg0
0993                 C   ckdip2:
0993  83 C7 02       C    add di,2
0996  26: 8B 45 02   C    mov ax,es:[di+2]
099A  03 FB          C    add di,bx
099C  83 EF 02       C    sub di,2
099F  3C 20          C    cmp al,32
09A1  74 03          C    je gsg0
09A3  83 C7 02       C    add di,2
09A6                 C   gsg0:
09A6  B9 0010        C    mov cx,16
09A9  26: 8B 05      C    mov ax,es:[di]
09AC  3C 20          C    cmp al,32
09AE  75 0E          C    jne gsg2
09B0  E8 10D8 R      C    call error_beep
09B3  8B C2          C    mov ax,dx
09B5  E8 1073 R      C    call ptcharb
09B8  EB 26 90       C    jmp gsg8
09BB                 C   gsg1:
09BB  26: 8B 05      C    mov ax,es:[di]
```

```
09BE  3C 61              C   gsg2: cmp al,"a"
09C0  72 1E              C         jb gsg8
09C2  3C 7A              C         cmp al,"z"
09C4  77 1A              C         ja gsg8
09C6  83 FB 02           C         cmp bx,2
09C9  75 0C              C         jne cpcb
09CB  BB 0001            C         mov bx,1
09CE  2E: 38 1E 1114 R   C         cmp cs:sh_flag,bl
09D3  75 02              C         jne cpcb
09D5  2C 20              C         sub al,32
09D7                     C   cpcb:
09D7  E8 1073 R          C         call ptcharb
09DA  83 C7 02           C         add di,2
09DD  49                 C         dec cx
09DE  EB DB              C         jmp gsg1
09E0                     C   gsg8:
09E0  B8 0720            C         mov ax,0720h
09E3  E8 1073 R          C         call ptcharb
09E6  E8 100B R          C         call disp_keys
09E9  E8 0FD7 R          C         call dng
09EC  C7 06 1128 R 0000  C         mov numb_lets,0
09F2  C7 06 1124 R 0000  C         mov index_ptr,0
09F8  C7 06 1126 R 0000  C         mov nndex_ptr,0
09FE  C6 06 112A R 00 90 C         mov no_ab,0
0A04  C6 06 112B R 00 90 C         mov no_abn,0
0A0A  C6 06 1115 R 01 90 C         mov last_space,1
0A10  E9 0F87 R          C         jmp rsetbuf
0A13                     C   aps: include aus1.asm
0A13  8C CA              C         mov dx,cs
0A15  8E DA              C         mov ds,dx
0A17  81 C2 0950         C         add dx,950h
0A1B  8E C2              C         mov es,dx
0A1D  8B 2E 111E R       C         mov bp,pd_tail
0A21  BE 0002            C         mov si,2
0A24  E8 109A R          C         call gtxtwrd
0A27  83 C3 02           C   k801: add bx,2
0A2A  3B DF              C         cmp bx,di
0A2C  77 10              C         ja k802
0A2E  8B 07              C         mov ax,[bx]
0A30  3C 61              C         cmp al,97
0A32  73 02              C         jae k803
0A34  04 20              C         add al,32
0A36  26: 89 02          C   k803: mov es:[bp+si],ax
0A39  83 C6 02           C         add si,2
0A3C  EB E9              C         jmp k801
                         C         assume ds:cseg
0A3E  B8 0720            C   k802: mov ax,0720h
0A41  26: 89 42 FE       C         mov es:[bp+si-2],ax
0A45  8C C8              C         mov ax,cs
0A47  8E D8              C         mov ds,ax
0A49  83 FE 02           C         cmp si,2
0A4C  74 6A              C         jz k804
0A4E  01 36 111E R       C         add pd_tail,si
0A52  83 EE 02           C         sub si,2
0A55  26: 89 76 00       C         mov es:[bp],si
0A59  26: 8B 46 02       C         mov ax,es:[bp+2]
0A5D  32 E4              C         xor ah,ah
0A5F  2D 0060            C         sub ax,60h
0A62  B1 05              C         mov cl,5
0A64  D3 E0              C         shl ax,cl
0A66  8B D8              C         mov bx,ax
0A68  81 C3 7000         C         add bx,7000h
0A6C  BE 0000            C         mov si,0
0A6F  26: 8B 00          C   k805: mov ax,es:[bx+si]
0A72  0B C0              C         or ax,ax
0A74  74 0F              C         jz k806
0A76  83 C6 02           C         add si,2
0A79  83 FE 14           C         cmp si,20
0A7C  75 F1              C         jnz k805
0A7E  89 2E 111E R       C         mov pd_tail,bp
```

```
0A82  E9 10C7 R              C      jmp fulbeep
0A85  26: 89 28               C    k806: mov es:[bx+si],bp
0A88  C6 06 1107 R 01 90      C      mov per_steno,1
0A8E  C6 06 1111 R 01 90      C      mov keep_space,1
0A94  C7 06 1128 R 0000       C      mov numb_lets,0
0A9A  C7 06 1124 R 0000       C      mov index_ptr,0
0AA0  C7 06 1126 R 0000       C      mov nndex_ptr,0
0AA6  C6 06 112A R 00 90      C      mov no_ab,0
0AAC  C6 06 112B R 00 90      C      mov no_abn,0
0AB2  C6 06 1115 R 01 90      C      mov last_space,1
0AB8  E9 0F87 R               C    k804: jmp rsetbuf
                              C
0ABB                          C    gps: include tus1.asm
                              C
0ABB  8C CA                   C      mov dx,cs
0ABD  8E DA                   C      mov ds,dx
0ABF  81 C2 0950              C      add dx,950h
0AC3  8E C2                   C      mov es,dx
0AC5  BB 0001                 C      mov bx,1
0AC8  38 1E 1115 R            C      cmp last_space,bl
0ACC  74 0C                   C      je k791
0ACE  38 1E 1116 R            C      cmp last_steno,bl
0AD2  74 06                   C      je k791
0AD4  B8 4B00                 C      mov ax,4b00h ;right arrow to concatenate to first letter
0AD7  E8 1073 R               C      call ptcharb
0ADA                          C    k791:
0ADA  A1 1132 R               C      mov ax,[cap_buf+2] ;get letter
0ADD  32 E4                   C      xor ah,ah
0ADF  2D 0060                 C      sub ax,60h
0AE2  B1 05                   C      mov cl,5
0AE4  D3 E0                   C      shl ax,cl
0AE6  8B D8                   C      mov bx,ax
0AE8  A1 1130 R               C      mov ax,[cap_buf] ;get #
0AEB                          C    k792:
0AEB  32 E4                   C      xor ah,ah
0AED  2D 0031                 C      sub ax,31h
0AF0  D1 E0                   C      shl ax,1
0AF2  03 D8                   C      add bx,ax
0AF4  81 C3 7000              C      add bx,7000h
0AF8  26: 8B 1F               C      mov bx,es:[bx]
0AFB  0B DB                   C      or bx,bx
0AFD  74 30                   C      jz notran ;no translation
0AFF  E8 102A R               C      call ldkbbuf ;put translation in keyboard buffer
0B02                          C    endk79:
0B02  C7 06 1128 R 0000       C      mov numb_lets,0
0B08  C7 06 1124 R 0000       C      mov index_ptr,0
0B0E  C7 06 1126 R 0000       C      mov nndex_ptr,0
0B14  C6 06 112A R 00 90      C      mov no_ab,0
0B1A  C6 06 112B R 00 90      C      mov no_abn,0
0B20  C6 06 1116 R 01 90      C      mov last_steno,1
0B26  E8 100B R               C      call disp_keys
0B29  E8 0FD7 R               C      call dng
0B2C  E9 0F87 R               C      jmp rsetbuf
0B2F                          C    notran:
0B2F  E8 10D8 R               C      call error_beep
0B32  E9 0F87 R               C      jmp rsetbuf
                              C
0B35                          C    bperiod:
0B35  B8 4B00                 C      mov ax,4b00h
0B38  E8 1073 R               C      call ptcharb
0B3B  B8 072E                 C      mov ax,072eh
0B3E  E8 1073 R               C      call ptcharb
0B41  B8 0720                 C      mov ax,0720h
0B44  E8 1073 R               C      call ptcharb
0B47  E9 0DCF R               C      jmp larrows
0B4A                          C    bcomma:
0B4A  B8 4B00                 C      mov ax,4b00h
0B4D  E8 1073 R               C      call ptcharb
0B50  B8 072C                 C      mov ax,072ch
0B53  E8 1073 R               C      call ptcharb
```

```
0B56  B8 0720              C       mov ax,0720h
0B59  E8 1073 R            C       call ptcharb
0B5C  E9 0DCF R            C       jmp larrows
0B5F                       C   gpg:
0B5F  A1 1134 R            C       mov ax,4[cap_buf]
0B62  B4 00                C       mov ah,0
0B64  BB 11AF R            C       mov bx,offset kbt
0B67  2C 61                C       sub al,97
0B69  D7                   C       xlat
0B6A  03 C0                C       add ax,ax
0B6C  3D 00A0              C       cmp ax,160
0B6F  72 0B                C       jb gpg13
0B71  3D 0140              C       cmp ax,320
0B74  72 03                C       jb gpg12
0B76  05 0140              C       add ax,320
0B79  05 0140              C   gpg12: add ax,320
0B7C  05 01E4              C   gpg13: add ax,484
0B7F  8B F8                C       mov di,ax
0B81  B9 0010              C       mov cx,16
0B84  26: 8B 05            C   gpg1: mov ax,es:[di]
0B87  3C 61                C       cmp al,"a"
0B89  72 0F                C       jb gpg8
0B8B  3C 7A                C       cmp al,"z"
0B8D  77 0B                C       ja gpg8
0B8F  E8 1073 R            C       call ptcharb
0B92  83 C7 02             C       add di,2
0B95  49                   C       dec cx
0B96  74 02                C       jz gpg8
0B98  EB EA                C       jmp gpg1
0B9A                       C   gpg8:
0B9A  B8 0720              C       mov ax,0720h
0B9D  E8 1073 R            C       call ptcharb
0BA0  E8 100B R            C       call disp_keys
0BA3  E8 0FD7 R            C       call dng
0BA6  C7 06 1128 R 0000    C       mov numb_lets,0
0BAC  C7 06 1124 R 0000    C       mov index_ptr,0
0BB2  C7 06 1126 R 0000    C       mov nndex_ptr,0
0BB8  C6 06 112A R 00 90   C       mov no_ab,0
0BBE  C6 06 112B R 00 90   C       mov no_abn,0
0BC4  C6 06 1115 R 01 90   C       mov last_space,1
0BCA  E9 0F87 R            C       jmp rsetbuf
                           C
0BCD  E8 0F9A R            C   fcp: call save_scrn
0BD0  8C DB                C       mov bx,ds
0BD2  8E C3                C       mov es,bx
0BD4  8C CB                C       mov bx,cs
0BD6  8E DB                C       mov ds,bx
                           C       assume ds:cseg
0BD8  B7 70                C       mov bh,112
0BDA  BF 0006              C       mov di,6
0BDD  B3 31                C       mov bl,31h
0BDF  26: 88 7D 01         C   psl1: mov es:[di+1],bh
0BE3  83 C7 02             C       add di,2
0BE6  26: 89 1D            C       mov es:[di],bx
0BE9  83 C7 02             C       add di,2
0BEC  26: 88 7D 01         C       mov es:[di+1],bh
0BF0  FE C3                C       inc bl
0BF2  83 C7 1C             C       add di,28
0BF5  80 FB 3B             C       cmp bl,3bh
0BF8  74 0A                C       je psl2
0BFA  80 FB 36             C       cmp bl,36h
0BFD  75 E0                C       jne psl1
0BFF  BF 03C6              C       mov di,966
0C02  EB DB                C       jmp psl1
0C04  83 EF 1E             C   psl2: sub di,30
0C07  B3 30                C       mov bl,30h
0C09  26: 88 1D            C       mov es:[di],bl
0C0C  8C CB                C       mov bx,cs
0C0E  8E DB                C       mov ds,bx
0C10  81 C3 0950           C       add bx,950h
```

```
OC14   8E DB          C    mov ds,bx
OC16   2C 61          C    sub al,"a"
OC18   B4 00          C    mov ah,0
OC1A   D1 E0          C    shl ax,1
OC1C   D1 E0          C    shl ax,1
OC1E   D1 E0          C    shl ax,1
OC20   D1 E0          C    shl ax,1
OC22   D1 E0          C    shl ax,1
OC24   BE 7020        C    mov si,7020h
OC27   03 F0          C    add si,ax
OC29   BF 0142        C    mov di,322
OC2C   B7 70          C    mov bh,112
OC2E                  C  psl32:
OC2E   8B 04          C    mov ax,[si]
OC30   0B C0          C    or ax,ax
OC32   75 03          C    jnz psl6
OC34   E9 0DCF R      C    jmp larrows
OC37                  C  psl6:
OC37   26: 88 7D FF   C    mov es:[di-1],bh
OC3B   56             C    push si
OC3C   8B F0          C    mov si,ax
OC3E   8B 0C          C    mov cx,[si]
OC40   51             C    push cx
OC41   83 C6 02       C    add si,2
OC44   8A 04          C  psl01: mov al,[si]
OC46   26: 88 05      C    mov es:[di],al
OC49   26: 88 7D 01   C    mov es:[di+1],bh
OC4D   83 C6 02       C    add si,2
OC50   83 C7 02       C    add di,2
OC53   83 E9 02       C    sub cx,2
OC56   75 EC          C    jnz psl01
OC58   59             C    pop cx
OC59   5E             C    pop si
OC5A   83 C6 02       C    add si,2
OC5D   2B F9          C    sub di,cx
OC5F   83 C7 20       C    add di,32
OC62   81 FF 05A0     C    cmp di,1440
OC66   76 03          C    jbe psl7
OC68   E9 0DCF R      C    jmp larrows
OC6B                  C  psl7:
OC6B   81 FF 01E2     C    cmp di,482
OC6F   75 BD          C    jne psl32
OC71   BF 0502        C    mov di,1282
OC74   EB B8          C    jmp psl32
OC76                  C  psl9:
                      C
OC76   E8 0F9A R      C  fcc: call save_scrn
OC79   8C DB          C    mov bx,ds
OC7B   8E C3          C    mov es,bx
OC7D   8B F8          C    mov di,ax
OC7F   81 E7 00FF     C    and di,0ffh
OC83   03 FF          C    add di,di
OC85   8C C8          C    mov ax,cs
OC87   8E D8          C    mov ds,ax
OC89   05 0A50        C    add ax,0a50h
OC8C   8E D8          C    mov ds,ax
OC8E   8B 1D          C    mov bx,[di]
OC90   2D 0100        C    sub ax,100h
OC93   8E D8          C    mov ds,ax
OC95   8B F3          C    mov si,bx
OC97   BB 0000        C    mov bx,0
OC9A   BF 0000        C    mov di,0
OC9D   BA 0018        C  mp31: mov dx,24
OCA0   57             C  mp315: push di
OCA1   8B 0C          C  mp32: mov cx,[si]
OCA3   51             C    push cx
OCA4   83 C6 02       C    add si,2
OCA7   8A 04          C    mov al,[si]
OCA9   8A 64 02       C  mov ah,[si+2]
OCAC   1E             C    push ds
OCAD   8C CD          C    mov bp,cs
```

```
OCAF   8E DD              C    mov  ds,bp
OCB1   3A 06 110F R       C    cmp  al,first_let
OCB5   74 03              C    je   dms1
OCB7   E9 0D3B R          C    jmp  m8
OCBA                      C  dms1:
OCBA   83 FF 00           C    cmp  di,0
OCBD   75 07              C    jne  csec1
OCBF   88 26 1110 R       C    mov  sec_let,ah
OCC3   EB 16 90           C    jmp  mp00
OCC6                      C  csec1:
OCC6   3A 26 1110 R       C    cmp  ah,sec_let
OCCA   74 0F              C    je   mp00
OCCC   88 26 1110 R       C    mov  sec_let,ah
OCD0   1F                 C    pop  ds
OCD1   59                 C    pop  cx
OCD2   5F                 C    pop  di
OCD3   81 C7 00A0         C    add  di,160
OCD7   57                 C    push di
OCD8   51                 C    push cx
OCD9   1E                 C    push ds
OCDA   4A                 C    dec  dx
OCDB   1F                 C  mp00: pop ds
OCDC   8A 04              C  mp01: mov al,[si]
OCDE   26: 88 01          C       mov  es:[di+bx],al
OCE1   83 C6 02           C       add  si,2
OCE4   47                 C       inc  di
OCE5   B0 07              C    mov  al,7
OCE7   26: 88 01          C    mov  es:[di+bx],al
OCEA   47                 C    inc  di
OCEB   83 E9 02           C       sub  cx,2
OCEE   75 EC              C       jnz  mp01
OCF0   59                 C       pop  cx
OCF1   5F                 C       pop  di
OCF2   8B EE              C       mov  bp,si
OCF4   52                 C       push dx
OCF5   8B 34              C       mov  si,[si]
OCF7   8B 14              C       mov  dx,[si]
OCF9   83 C6 02           C       add  si,2
OCFC   51                 C  mb1330: push cx
OCFD   57                 C    push di
OCFE   8B 04              C  mb133: mov ax,[si]
OD00   26: 3A 01          C  mb134: cmp al,es:[di+bx]
OD03   75 08              C       jnz  ms133
OD05   B4 0F              C       mov  ah,15
OD07   26: 89 01          C       mov  es:[di+bx],ax
OD0A   EB 09 90           C       jmp  mb132
OD0D   83 C7 02           C  ms133: add di,2
OD10   83 E9 02           C       sub  cx,2
OD13   75 EB              C       jnz  mb134
OD15   83 C6 02           C  mb132: add si,2
OD18   5F                 C    pop  di
OD19   59                 C       pop  cx
OD1A   83 EA 02           C       sub  dx,2
OD1D   75 DD              C       jnz  mb1330
OD1F   81 C7 00A0         C       add  di,160
OD23   8B F5              C       mov  si,bp
OD25   83 C6 02           C       add  si,2
OD28   5A                 C       pop  dx
OD29   4A                 C       dec  dx
OD2A   83 FA 00           C       cmp  dx,0
OD2D   76 03              C       jbe  mdi0
OD2F   E9 0CA0 R          C       jmp  mp315
OD32                      C    mdi0:
OD32   BF 0000            C       mov  di,0
OD35   83 C3 1A           C       add  bx,26
OD38   E9 0C9D R          C       jmp  mp31
OD3B                      C  m8:
OD3B   1F                 C       pop  ds  ;
OD3C   59                 C       pop  cx
OD3D   5F                 C       pop  di
OD3E   E9 0DCF R          C       jmp  larrows
```

```
0D41                         C   fccscp:
0D41    E8 0F9A R            C       call save_scrn
0D44    8C DB                C       mov bx,ds
0D46    8E C3                C       mov es,bx
0D48    BB 0000              C       mov bx,0
0D4B    BF 0000              C       mov di,0
0D4E    B0 31                C       mov al,31h
0D50    26: 88 01            C   p1: mov es:[di+bx],al
0D53    81 C7 00A0           C       add di,160
0D57    81 FF 0320           C       cmp di,800
0D5B    72 0F                C       jb p2
0D5D    81 C3 03C0           C       add bx,960
0D61    81 FB 0C80           C       cmp bx,3200
0D65    77 08                C       ja p3
0D67    BF 0000              C       mov di,0
0D6A    B0 30                C       mov al,30h
0D6C    40                   C     p2: inc ax
0D6D    EB E1                C       jmp p1
0D6F                         C     p3:
0D6F    8C C8                C   mov ax,cs
0D71    8E D8                C   mov ds,ax
0D73    05 0950              C   add ax,950h
0D76    8E D8                C       mov ds,ax
0D78    BB 0000              C       mov bx,0
0D7B    BF 0006              C       mov di,6
0D7E    57                   C       push di
0D7F    BE 7020              C       mov si,7020h
0D82    8B EE                C       mov bp,si
0D84    BA 0005              C   p31:mov dx,5
0D87                         C   p32:
0D87    8B 04                C       mov ax,[si]
0D89    0B C0                C       or ax,ax
0D8B    74 24                C       jz p4
0D8D    56                   C       push si
0D8E    8B F0                C       mov si,ax
0D90    8B 0C                C       mov cx,[si]
0D92    51                   C       push cx
0D93    83 C6 02             C       add si,2
0D96    8A 04                C   p01: mov al,[si]
0D98    26: 88 01            C       mov es:[di+bx],al
0D9B    46                   C       inc si
0D9C    47                   C       inc di
0D9D    49                   C       dec cx
0D9E    75 F6                C       jnz p01
0DA0    59                   C       pop cx
0DA1    5E                   C       pop si
0DA2    83 C6 02             C       add si,2
0DA5    2B F9                C       sub di,cx
0DA7    81 C7 00A0           C       add di,160
0DAB    4A                   C       dec dx
0DAC    83 FA 00             C       cmp dx,0
0DAF    75 D6                C       jnz p32
0DB1                         C     p4:
0DB1    5F                   C       pop di
0DB2    57                   C       push di
0DB3    83 C3 1A             C       add bx,26
0DB6    81 FB 008C           C       cmp bx,140
0DBA    72 4B                C       jb p5
0DBC    BB 0000              C       mov bx,0
0DBF    5F                   C       pop di
0DC0    81 C7 03C0           C       add di,960
0DC4    57                   C       push di
0DC5    81 FF 0F3C           C       cmp di,3900
0DC9    72 3C                C       jb p5
0DCB    5F                   C       pop di
0DCC    EB 01 90             C       jmp larrows
                             C
0DCF                         C   larrows:
                             C   assume ds:cseg
```

```
0DCF  8C C8              C    mov ax,cs
0DD1  8E D8              C    mov ds,ax
0DD3  E9 0F87 R          C    jmp rsetbuf
                         C
0DD6  B8 4B00            C  ps00: mov ax,4b00h
0DD9  8B 1E 112C R       C    mov bx,[cap_tail]
0DDD  8B F3              C    mov si,bx
0DDF  83 C3 02           C    add bx,2
0DE2  81 FB 1150 R       C    cmp bx,offset cap_end
0DE6  74 16              C    jz ps01
0DE8  89 04              C    mov [si],ax
0DEA  8B F3              C    mov si,bx
0DEC  83 C3 02           C    add bx,2
0DEF  81 FB 1150 R       C    cmp bx,offset cap_end
0DF3  74 09              C    jz ps01
0DF5  89 04              C    mov [si],ax
0DF7  89 1E 112C R       C    mov cap_tail,bx
0DFB  E9 10CA R          C    jmp return
0DFE  B8 1130 R          C  ps01: mov ax,offset cap_buf
0E01  A3 112C R          C    mov cap_tail,ax
0E04  E9 10C7 R          C    jmp fulbeep
0E07  8B F5              C     p5: mov si,bp
0E09  83 C6 20           C       add si,20h
0E0C  8B EE              C       mov bp,si
0E0E  E9 0D84 R          C       jmp p31
                         C
0E11                     C  kbon:
0E11  B9 B000            C    mov cx,0b000h
0E14  2E: 3B 0E 1103 R   C    cmp cx,cs:disp_addr
0E19  74 0E              C    je kboff
0E1B  2E: 89 0E 1103 R   C    mov cs:disp_addr,cx
0E20  2E: C6 06 1108 R 01 C   mov cs:disp_kb,1
      90
0E27  EB A6              C    jmp larrows
0E29                     C  kboff:
0E29  8C C9              C    mov cx,cs
0E2B  8E D9              C    mov ds,cx
0E2D  81 C1 1280         C    add cx,1280h
0E31  89 0E 1103 R       C    mov disp_addr,cx
0E35  C6 06 1108 R 00 90 C    mov disp_kb,0
0E3B  EB 92              C    jmp larrows
                         C
                         C
0E3D                     C  suffix:
0E3D                     C    concat2:
0E3D  A1 1132 R          C    mov ax,2[cap_buf]
0E40  3C 67              C    cmp al,"g"
0E42  74 22              C    je tstfore
0E44  3C 64              C    cmp al,"d"
0E46  74 03              C    je tstnoe
0E48  EB 2E 90           C    jmp concat
0E4B                     C  tstnoe:
0E4B  1E                 C    push ds
0E4C  E8 109A R          C    call gtxtwrd
0E4F  8B 47 FE           C    mov ax,[bx-2]
0E52  1F                 C    pop ds
                         C    assume ds:cseg
0E53  3C 65              C    cmp al,"e"
0E55  74 21              C    je concat
0E57  B8 4B00            C    mov ax,4b00h
0E5A  E8 1073 R          C    call ptcharb
0E5D  B8 0765            C    mov ax,0765h
0E60  E8 1073 R          C    call ptcharb
0E63  EB 56 90           C    jmp procbuf
0E66                     C  tstfore:
0E66  1E                 C    push ds
0E67  E8 109A R          C    call gtxtwrd
0E6A  8B 47 FE           C    mov ax,[bx-2]
0E6D  1F                 C    pop ds
                         C    assume ds:cseg
```

```
0E6E  3C 65              C      cmp al,"e"
0E70  75 06              C      jne concat
0E72  B8 4B00            C      mov ax,4b00h
0E75  E8 1073 R          C      call ptcharb
0E78  B8 4B00            C      concat: mov ax,4b00h
0E7B  E8 1073 R          C    call ptcharb
0E7E  EB 3B 90           C    jmp procbuf
                         C
0E81                     C    beeps:
0E81  B8 0000            C      mov ax,0
0E84  8E D8              C      mov ds,ax
0E86  BF 0070            C      mov di,70h
0E89  8B 05              C      mov ax,[di]
0E8B  3D 0000            C      cmp ax,0
0E8E  74 17              C      je beepoff
0E90  FA                 C      cli
0E91  8C C8              C      mov ax,cs
0E93  05 0178            C      add ax,178h
0E96  C6 05 00           C      mov byte ptr [di],00h
0E99  C6 45 01 00        C      mov byte ptr [di+1],00h
0E9D  88 45 02           C      mov byte ptr [di+2],al
0EA0  88 65 03           C      mov byte ptr [di+3],ah
0EA3  FB                 C      sti
0EA4  E9 0DCF R          C      jmp larrows
0EA7  FA                 C    beepoff: cli
0EA8  C6 05 53           C      mov byte ptr [di],53h
0EAB  C6 45 01 FF        C      mov byte ptr [di+1],0ffh
0EAF  C6 45 02 00        C      mov byte ptr [di+2],00h
0EB3  C6 45 03 F0        C      mov byte ptr [di+3],0f0h
0EB7  FB                 C      sti
0EB8  E9 0DCF R          C      jmp larrows
                         C
                         C
0EBB  B2 01                     procbuf: mov dl,1
0EBD  3A 16 1115 R              cmp dl,last_space
0EC1  74 09                     je fndsten
0EC3  3A 16 1116 R              cmp dl,last_steno
0EC7  74 03                     je fndsten
0EC9  E9 0F6B R                 jmp untran ;don't translate
0ECC                            fndsten:
0ECC  B8 4650                   mov ax,4650h
0ECF  8C C8                   mov ax,cs
0ED1  8E D8                   mov ds,ax
0ED3  05 0950                 add ax,950h
0ED6  8E C0                   mov es,ax
                         C      include fndsten.asm ;find steno=keystroke
                         C
0ED8  8B 3E 1130 R        C      mov di,[cap_buf]
0EDC  81 E7 00FF          C      and di,0ffh
0EE0  03 FF               C      add di,di
0EE2  26: 8B 1D           C      mov bx,es:[di] ;addr of stenos starting with
                                first char of keystroke
0EE5  26: 8B 55 02        C      mov dx,es:[di+2] ;addr of "      "      "
                                next ascii char
0EE9  3B DA               C    b30: cmp bx,dx ;have we tried all stenos start
                                ing with first char?
0EEB  7C 03               C      jl s30 ;no
0EED  EB 7C 90            C      jmp untran ;yes, don't translate
0EF0  8B 2E 112E R        C    s30: mov bp,[cap_len]
0EF4  26: 39 2F           C      cmp es:[bx],bp ;len(steno)=cap_len?
0EF7  75 1D               C      jne s32 ;no, try next steno
0EF9  BE 0002             C      mov si,2 ;yes, check for match
0EFC  83 C6 02            C    b31: add si,2
0EFF  8B 84 112E R        C      mov ax,cap_buf[si-2]
0F03  26: 3A 00           C      cmp al,es:[bx][si]
0F06  7F 0E               C      jg s32 ;no match, try next steno
0F08  74 03               C      je s31 ;=, check len
0F0A  EB 5F 90            C      jmp untran ;steno>keystroke, don't translate
0F0D  3B 36 112E R        C    s31: cmp si,[cap_len]
0F11  75 E9               C      jne b31 ;check next char
0F13  EB 09 90            C      jmp gettran ;keystroke=steno, match!
```

```
0F16    26: 03 1F              C     s32: add bx,es:[bx]
0F19    83 C3 04               C          add bx,4
0F1C    EB CB                  C          jmp b30
                               C
0F1E                           C     gettran: include gettran.asm
                               C
0F1E    26: 03 1F              C          add bx,es:[bx] ;go to end of steno
0F21    2E: C6 06 1116 R 01    C          mov cs:last_steno,1
        90                     C
0F28    2E: C6 06 1115 R 00    C          mov cs:last_space,0
        90
0F2F    83 C3 02               C          add bx,2 ;->addr of translation
0F32    26: 8B 1F              C          mov bx,es:[bx] ;addr of translation
                               C
0F35    E8 102A R                        call ldkbbuf ;put translation in keyboard buf
                                    fer
0F38    C6 06 1116 R 01 90               mov last_steno,1
0F3E    C6 06 1115 R 00 90               mov last_space,0
0F44    C7 06 1128 R 0000                mov numb_lets,0
0F4A    C7 06 1124 R 0000                mov index_ptr,0
0F50    C7 06 1126 R 0000                mov nndex_ptr,0
0F56    C6 06 112A R 00 90               mov no_ab,0
0F5C    C6 06 112B R 00 90               mov no_abn,0
0F62    E8 100B R                        call disp_keys
0F65    E8 0FD7 R                        call dng
0F68    EB 1D 90                         jmp rsetbuf
0F6B                                 untran:
0F6B    8C C8                           mov ax,cs
0F6D    8E C0                           mov es,ax
0F6F    BB 1152 R                       mov bx,offset dap_len ;->unalphabetized keypr
                                    esses
0F72    E8 102A R                       call ldkbbuf ;put keypresses in keyboard buff
                                    er
0F75    C6 06 1116 R 00 90              mov last_steno,0
0F7B    C6 06 1115 R 00 90              mov last_space,0
0F81    E8 100B R                       call disp_keys
0F84    E8 0FD7 R                       call dng
0F87                                 rsetbuf:
0F87    8C C8                           mov ax,cs
0F89    8E D8                           mov ds,ax
                                        assume ds:cseg
0F8B    B8 1130 R                       mov ax,offset cap_buf ;initialize make buffer
0F8E    A3 112C R                       mov cap_tail,ax ;tail=head
0F91    C6 06 1114 R 00 90              mov sh_flag,0
0F97    E9 10CA R                       jmp return
0F9A                                 save_scrn proc near
                               C       include savscn.asm
                               C
                               C
0F9A    C6 06 1113 R 01 90     C     mov reset_flag,1
0FA0    A1 1132 R              C     mov ax,[cap_buf+2]
0FA3    A2 110F R              C     mov first_let,al
0FA6    8C C9                  C     mov cx,cs
0FA8    8E D9                  C     mov ds,cx
0FAA    81 C1 1280             C     add cx,1280h
0FAE    8E C1                  C     mov es,cx
0FB0    BB B000                C     mov bx,0b000h
0FB3    8E DB                  C     mov ds,bx
0FB5    BF 0000                C     mov di,0
0FB8    BE 0000                C     mov si,0
0FBB    B9 07D0                C     mov cx,2000
0FBE    F3/ A5                 C   rep movsw
0FC0    BF 0000                C     mov di,0
0FC3    BE 0000                C     mov si,0
0FC6    8C D9                  C     mov cx,ds
0FC8    8E C1                  C     mov es,cx
0FCA    B9 07D0                C     mov cx,2000
0FCD    8B D8                  C     mov bx,ax
0FCF    B8 0720                C     mov ax,0720h
0FD2    F3/ AB                 C   rep stosw
0FD4    8B C3                  C     mov ax,bx
```

```
OFD6    C3                          C   ret
OFD7                                C   save_scrn endp
                                    C
OFD7                                        dng proc near
                                    C       include disnulg.asm
OFD7    50                          C   push ax
OFD8    1E                          C   push ds
OFD9    06                          C   push es
OFDA    2E: A1 1103 R               C   mov ax,cs:disp_addr
OFDE    8E C0                       C   mov es,ax
OFE0    8C C8                       C   mov ax,cs
OFE2    8E D8                       C   mov ds,ax
                                    C   assume ds:cseg
OFE4    BE 11C9 R                   C   mov si,offset are
OFE7    BF 0140                     C   mov di,320
OFEA    B9 0050                     C   mov cx,80
OFED    F3/ A5                      C   rep movsw
OFEF    BF 0320                     C   mov di,800
OFF2    B9 0050                     C   mov cx,80
OFF5    F3/ A5                      C   rep movsw
OFF7    BF 0500                     C   mov di,1280
OFFA    B9 0050                     C   mov cx,80
OFFD    F3/ A5                      C   rep movsw
OFFF    BF 06E0                     C   mov di,1760
1002    B9 0046                     C   mov cx,70
1005    F3/ A5                      C   rep movsw
1007    07                          C   pop es
1008    1F                          C   pop ds
1009    58                          C   pop ax
100A    C3                          C   ret
100B                                C   dng endp
                                    C
100B                                        disp_keys proc near
                                    C       include dispkey1.asm
100B    1E                          C   push ds
100C    2E: 8B 0E 1103 R            C   mov cx,cs:disp_addr
1011    8E C1                       C   mov es,cx
1013    8C C9                       C   mov cx,cs
1015    8E D9                       C   mov ds,cx
1017    81 C1 0180                  C   add cx,180h
101B    8E D9                       C   mov ds,cx
101D    BE 0000                     C   mov si,0
1020    BF 0000                     C   mov di,0
1023    B9 0410                     C   mov cx,1040
1026    F3/ A5                      C   rep movsw
1028    1F                          C   pop ds
1029    C3                          C   ret
102A                                C   disp_keys endp
                                    C
102A                                        ldkbbuf proc near ;load keyboard buffer
                                    C       include ldkbbuf2.asm
102A    1E                          C   push ds
102B    BA 0040                     C   mov dx,40h
102E    8E DA                       C   mov ds,dx
                                    C   assume ds:dseg
1030    8B 3E 001C R                C   mov di,[buffer_tail]        ;get the end poin
                                        ter to the buffer
1034    BD 003E R                   C   mov bp,offset kb_buffer_end
1037    8B 0E 001A R                C   mov cx,[buffer_head]
103B    BE 0000                     C   mov si,0
103E    83 C6 02                    C   1750: add si,2
1041    26: 8B 00                   C   mov ax,es:[bx][si]
1044    83 FE 02                    C   cmp si,2
1047    75 0B                       C   jne 1k77
1049    2E: 80 0E 1114 R 00         C   or cs:sh_flag,0
        90                          C
1050    74 02                       C   jz 1k77
1052    2C 20                       C   sub al,"a"-"A"
1054                                C   1k77:
```

```
1054  8B D7           C    mov  dx,di                    ;save the value
1056  83 C2 02        C    add  dx,2                     ;move to next wor
                           d in list
1059  3B D5           C    cmp  dx,bp                    ;at end of buffer
                           ?
105B  75 03           C    jne  1770                     ;no,continue
105D  BA 001E R       C    mov  dx,offset kb_buffer      ;yes, reset to bu
                           ffer beginning
1060  3B D1           C    1770: cmp dx,cx               ;has the buffer w
                           rapped around
1062  74 04           C    je   1771
1064  89 05           C    mov  [di],ax                  ;store the value
1066  8B FA           C    mov  di,dx
1068                  C    1771:
1068  26: 3B 37       C    cmp  si,es:[bx]
106B  7C D1           C    jl   1750
106D  89 16 001C R    C    mov  buffer_tail,dx           ;move the pointer
                           up
1071  1F              C    pop  ds
1072  C3              C    ret
1073                  C    ldkbbuf endp
                      C
                           assume ds:dseg
1073                       ptcharb proc near ;transfer char from ax to ke
                           yboard buffer
                      C      include ptcharb1.asm
                      C
1073  1E              C    push ds
1074  57              C    push di
1075  BA 0040         C    mov  dx,40h
1078  8E DA           C    mov  ds,dx
                      C    assume ds:dseg
107A  8B 16 001C R    C    mov  dx,[buffer_tail]         ;get the end poin
                           ter to the buffer
107E  8B FA           C    mov  di,dx                    ;save the value
1080  83 C2 02        C    add  dx,2                     ;move to next wor
                           d in list
1083  83 FA 3E        C    cmp  dx,offset kb_buffer_end  ;at end of buffer
                           ?
1086  75 03           C    jne  k770                     ;no,continue
1088  BA 001E R       C    mov  dx,offset kb_buffer      ;yes, reset to bu
                           ffer beginning
108B  3B 16 001A R    C    k770: cmp dx,[buffer_head]    ;has the buffer w
                           rapped around
108F  74 06           C    je   k771
1091  89 05           C    mov  [di],ax                  ;store the value
1093  89 16 001C R    C    mov  buffer_tail,dx           ;move the pointer
                           up
1097  5F              C    k771: pop di
1098  1F              C    pop  ds
1099  C3              C    ret
109A                  C    ptcharb endp
                      C
                           assume ds:cseg
109A                       gtxtwrd proc near ;get text word preceding cur
                           sor, di->last letter, bx->first letter
                      C      include gtxtwrd.asm
                      C
109A  B8 ---- R       C    mov  ax,seg dseg
109D  8E D8           C    mov  ds,ax
                      C    assume ds:dseg
109F  8B 1E 0050 R    C    mov  bx,cursor_posn
10A3  B8 B000         C    mov  ax,0b000h
10A6  8E D8           C    mov  ds,ax
                      C    assume ds:video
10A8  53              C    push bx
10A9  32 DB           C    xor  bl,bl
10AB  B1 04           C    mov  cl,4
10AD  D3 EB           C    shr  bx,cl
10AF  B8 000A         C    mov  ax,10
10B2  F7 EB           C    imul bx
```

```
10B4  5B              C       pop bx
10B5  32 FF           C       xor bh,bh
10B7  D1 E3           C       shl bx,1
10B9  03 D8           C       add bx,ax
10BB  8B FB           C       mov di,bx
10BD  83 EB 02        C  b120: sub bx,2
10C0  8A 07           C       mov al,[bx]
10C2  3C 20           C       cmp al,32
10C4  77 F7           C       ja b120
10C6  C3              C       ret
10C7                  C     gtxtwrd endp .
                      C
                              assume ds:cseg
10C7  E8 10D8 R               fulbeep: call error_beep
10CA  FA                      return: cli
10CB  B0 20                     mov al,20h
10CD  E6 20                     out 20h,al
                      C       include popregs.asm
10CF  07              C    pop es
10D0  1F              C    pop ds
10D1  5F              C    pop di
10D2  5E              C    pop si
10D3  5A              C    pop dx
10D4  59              C    pop cx
10D5  5B              C    pop bx
10D6  58              C    pop ax
                      C
10D7  CF                     iret
10D8                         error_beep proc near
                      C        include errbeep.asm
                      C
10D8  50              C       push ax
10D9  53              C       push bx
10DA  51              C       push cx
10DB  BB 00C0         C       mov bx,0c0h
10DE  E4 61           C       in al,61h
10E0  50              C       push ax
10E1  24 FC           C   aa1: and al,0fch
10E3  E6 61           C       out 61h,al
10E5  B9 0048         C       mov cx,48h
10E8  E2 FE           C   lp1: loop lp1
10EA  0C 02           C       or al,2
10EC  E6 61           C       out 61h,al
10EE  B9 0048         C       mov cx,48h
10F1  E2 FE           C   lp2: loop lp2
10F3  4B              C       dec bx
10F4  75 EB           C       jnz aa1
10F6  58              C       pop ax
10F7  E6 61           C       out 61h,al
10F9  59              C       pop cx
10FA  5B              C       pop bx
10FB  58              C       pop ax
10FC  C3              C       ret
10FD                  C    error_beep endp
                      C
10FD                         kb_int endp
                      C        include flags.asm
                      C
10FD  0000            C    mem_pos  dw 0000h
10FF  ????            C    timer0   dw ?
1101  ????            C    btimer0  dw ?
1103  4A80            C    disp_addr dw 4a80h
1105  00              C    fake_cap db 0
1106  00              C    set_cap  db 0
1107  00              C    per_steno db 0
1108  00              C    disp_kb  db 0
1109  ????            C    no_lets  dw ?
110B  ??              C    sec_lets db ?
110C  ????            C    int_steno dw ?
110E  00              C    num_breaks db 0
110F  ??              C    first_let db ?
1110  ??              C    sec_let  db ?
```

```
1111  00                              C   keep_space db 0
1112  00                              C   old_count db 0
1113  00                              C   reset_flag db 0h
1114  00                              C   sh_flag db 0h
1115  ??                              C   last_space db ?
1116  01                              C   last_steno db 1
1117  ??                              C   last_char db ?
1118  ????                            C   old_make dw ?
111A  ????                            C   time_stamp dw ?
111C  ????                            C   break_stamp dw ?
111E  8000                            C   pd_tail dw 8000h
1120  ????                            C   hl_head dw ?
1122  ????                            C   hl_tail dw ?
1124  0000                            C   index_ptr dw 0
1126  0000                            C   nndex_ptr dw 0
1128  0000                            C   numb_lets dw 0
112A  00                              C   no_ab db 0
112B  00                              C   no_abn db 0
                                      C
112C  1130 R                              cap_tail dw offset cap_buf
112E  ????                                cap_len dw ?
1130       10 [                            cap_buf dw 16 dup (?)
                ????
                     ]

1150                                      cap_end label word
1150  1154 R                              dap_tail dw offset dap_buf
1152  ????                                dap_len dw ?
1154       10 [                            dap_buf dw 16 dup (?)
                ????
                     ]

1174                                      dap_end label word
1174  00 1B 31 32 33 34                   ascii_tbl db 0,27,"1234567890",0,0,0,0,"qwerty
                                          uiop[]",0,0,"asdfghjkl;'`"
      35 36 37 38 39 30
      00 00 00 00 71 77
      65 72 74 79 75 69
      6F 70 5B 5D 00 00
      61 73 64 66 67 68
      6A 6B 6C 3B 27 60
119E  00 5C 7A 78 63 76                     db 0,"\zxcvbnm,./",0,0,0," ",0
      62 6E 6D 2C 2E 2F
      00 00 00 20 00
11AF  52 C7 B7 62 10 6A                   kbt db 82,199,183,98,16,106,114,122,56
      72 7A 38
11B8  82 8A 92 D7 CF 40                     db 130,138,146,215,207,64,72
      48
11BF  00 18 5A 20 30 BF                     db 0,24,90,32,48,191,8,175,40,167
      08 AF 28 A7
                                      C   include nulscn.asm
11C9  7061 7072 7065 7020             C   are dw 7061h,7072h,7065h,7020h,7020h,7020h,7020
                                          h ;are
      7020 7020 7020                  C
11D7  0720 7066 7072 706F             C           dw 0720h,7066h,7072h,706Fh,706Dh,7020h,
                                          7020h,7020h.;from
      706D 7020 7020 7020             C
11E7  0720 706F 7075 7072             C           dw 0720h,706Fh,7075h,7072h,7020h,7020h,
                                          7020h,7020h ;of
      7020 7020 7020 7020             C
11F7  0720 7074 7068 7061             C           dw 0720h,7074h,7068h,7061h,7074h,7020h,
                                          7020h,7020h ;that
      7074 7020 7020 7020             C
1207  0720 7074 7068 7069             C           dw 0720h,7074h,7068h,7069h,7073h,7020h,
                                          7020h,7020h ;this
      7073 7020 7020 7020             C
```

```
1217   0720 7077 7061 7073   C        dw 0720h,7077h,7061h,7073h,7020h,7020h,
       7020 7020 7020 7020   C     7020h,7020h ;was
1227   0720 7077 7068 7069   C        dw 0720h,7077h,7068h,7069h,7063h,7068h,
       7063 7068 7020 7020   C     7020h,7020h ;which
1237   0720 7077 7069 7074   C        dw 0720h,7077h,7069h,7074h,7068h,7020h,
       7068 7020 7020 7020   C     7020h,7020h ;with
1247   0720 7077 706F 7075   C        dw 0720h,7077h,706fh,7075h,706ch,7064h,
       706C 7064 7020 7020   C     7020h,7020h ;would
1257   0720 7079 706F 7075   C        dw 0720h,7079h,706fh,7075h,7072h,7020h,
       7072 7020 7020 7020   C     7020h,7020h ;your
1267   0720                  C        dw 0720h
1269   7071 7075 7065 7073   C        dw 7071h,7075h,7065h,7073h,7074h,7069h,
       7074 7069 706F 706E   C     706fh,706eh ;question
1279   0720 7077 7069 706C   C        dw 0720h,7077h,7069h,706ch,706ch,7020h,
       706C 7020 7020 7020   C     7020h,7020h ;will
1289   0720 7065 7061 7063   C        dw 0720h,7065h,7061h,7063h,7068h,7020h,
       7068 7020 7020 7020   C     7020h,7020h ;each
1299   0720 7072 7065 7071   C        dw 0720h,7072h,7065h,7071h,7075h,7069h,
       7075 7069 7072 7065   C     7072h,7065h ;require
12A9   0720 7074 7068 7065   C        dw 0720h,7074h,7068h,7065h,7020h,7020h,
       7020 7020 7020 7020   C     7020h,7020h ;the
12B9   0720 7079 706F 7075   C        dw 0720h,7079h,706fh,7075h,7020h,7020h,
       7020 7020 7020 7020   C     7020h,7020h ;you
12C9   0720 7075 7073 7065   C        dw 0720h,7075h,7073h,7065h,7020h,7020h,
       7020 7020 7020 7020   C     7020h,7020h ;use
12D9   0720 7069 706E 7020   C        dw 0720h,7069h,706eh,7020h,7020h,7020h,
       7020 7020 7020 7020   C     7020h,7020h ;in
12E9   0720 706F 7066 7020   C        dw 0720h,706fh,7066h,7020h,7020h,7020h,
       7020 7020 7020 7020   C     7020h,7020h ;of
12F9   0720 7070 706C 7065   C        dw 0720h,7070h,706ch,7065h,7061h,7073h,
       7061 7073 7065 7020   C     7065h,7020h ;please
1309   0720 0720             C        dw 0720h,0720h
130D   0720 7061 7020 7020   C        dw 0720h,7061h,7020h,7020h,7020h,7020h,
       7020 7020 7020 7020   C     7020h,7020h ;a
131D   0720 7073 7068 706F   C        dw 0720h,7073h,7068h,706fh,7075h,706ch,
       7075 706C 7064 7020   C     7064h,7020h ;should
132D   0720 7064 7065 7070   C        dw 0720h,7064h,7065h,7070h,7061h,7072h,
       7061 7072 7074 7020   C     7074h,7020h ;depart
133D   0720 7066 706F 7072   C        dw 0720h,7066h,706fh,7072h,7020h,7020h,
       7020 7020 7020 7020   C     7020h,7020h ;for
134D   0720 7067 7065 706E   C        dw 0720h,7067h,7065h,706eh,7065h,7072h,
       7065 7072 7061 706C   C     7061h,706ch ;general
135D   0720 7068 7061 7076   C        dw 0720h,7068h,7061h,7076h,7065h,7020h,
       7065 7020 7020 7020   C     7020h,7020h ;have
136D   0720 706A 706F 7062   C        dw 0720h,706ah,706fh,7062h,7020h,7020h,
       7020 7020 7020 7020   C     7020h,7020h ;job
137D   0720 706B 706E 706F   C        dw 0720h,706bh,706eh,706fh,7077h,7020h,
       7077 7020 7020 7020   C     7020h,7020h ;know
```

```
138D   0720 706C 7065 7074   C          dw 0720h,706ch,7065h,7074h,7074h,7065h,
                                  7072h,7020h ;letter
       7074 7065 7072 7020   C
139D   0720 0720 0720 0720   C          dw 0720h,0720h,0720h,0720h,0720h,0720h,
                                  0720h,0720h ;;
       0720 0720 0720 0720   C
                             C          dw 0720h,0720h,0720h,0720h,0720h
13AD   0720 0720 0720 0720   C
       0720                  C
13B7   0720 7061 706E 7064   C          dw 0720h,7061h,706eh,7064h,7020h,7020h,
                                  7020h,7020h ;Z-and
       7020 7020 7020 7020   C
13C7   0720 706E 706F 7074   C          dw 0720h,706eh,706fh,7074h,7020h,7020h,
                                  7020h,7020h ;X-not
       7020 7020 7020 7020   C
13D7   0720 7063 706F 706D   C          dw 0720h,7063h,706fh,706dh,7070h,7061h,
                                  706eh,7079h ;company
       7070 7061 706E 7079   C
13E7   0720 7076 7065 7072   C          dw 0720h,7076h,7065h,7072h,7079h,7020h,
                                  7020h,7020h ;very
       7079 7020 7020 7020   C
13F7   0720 7062 7065 7020   C          dw 0720h,7062h,7065h,7020h,7020h,7020h,
                                  7020h,7020h ;be
       7020 7020 7020 7020   C
1407   0720 706E 706F 7020   C          dw 0720h,706eh,706fh,7020h,7020h,7020h,
                                  7020h,7020h ;no
       7020 7020 7020 7020   C
1417   0720 706D 7065 7065   C          dw 0720h,706dh,7065h,7065h,7074h,7020h,
                                  7020h,7020h ;meet
       7074 7020 7020 7020   C
                             C
1500                                    org 1500h
1500                                     keybrd_end label byte
1500                                    cseg ends
0000                                    video segment at 0b000h
0000   0FA0 [                            dw 4000 dup (?)
            ????
              ]

1F40                                    video ends
0000                                    rom segment at 0f000h
                                         assume cs:rom
E82E                                     org 0e82eh
E82E                                    keyboard_io label far
E9A6                                     org 0e9a6h
E9A6                                    romi label far
E9A6                                    rom ends
                                         end
```

Segments and groups:

| Name | Size | align | combine class |
|---|---|---|---|
| BEEP | 0005 | AT | 3FE0 |
| CSEG | 1500 | PARA | PUBLIC |
| DSEG | 0070 | AT | 0040 |
| ROM | E9A6 | AT | F000 |
| STACK | 0080 | PARA | STACK |
| VIDEO | 1F40 | AT | B000 |

Symbols:

| Name | Type | Value | Attr | |
|---|---|---|---|---|
| AAL | L NEAR | 10E1 | CSEG | |
| ABX | L NEAR | 04E9 | CSEG | |
| ADDSI2 | L NEAR | 0607 | CSEG | |
| ADJFNL | L NEAR | 0974 | CSEG | |
| APS | L NEAR | 0A13 | CSEG | |
| ARE | L WORD | 11C9 | CSEG | |
| ASCII_TBL | L BYTE | 1174 | CSEG | |
| B120 | L NEAR | 10BD | CSEG | |
| B130 | L NEAR | 043C | CSEG | |
| B1305 | L NEAR | 0453 | CSEG | |
| B131 | L NEAR | 0449 | CSEG | |
| B132 | L NEAR | 06DA | CSEG | |
| B1325 | L NEAR | 06E4 | CSEG | |
| B133 | L NEAR | 06E7 | CSEG | |
| B20 | L NEAR | 0803 | CSEG | |
| B21 | L NEAR | 080B | CSEG | |
| B30 | L NEAR | 0EE9 | CSEG | |
| B31 | L NEAR | 0EFC | CSEG | |
| BCOMMA | L NEAR | 0B4A | CSEG | |
| BEEPOFF | L NEAR | 0EA7 | CSEG | |
| BEEPS | L NEAR | 0E81 | CSEG | |
| BEEP_COUNT | L BYTE | 0000 | BEEP | |
| BEEP_FREQ | L WORD | 0002 | BEEP | |
| BEQM | L NEAR | 03BB | CSEG | |
| BLDI | L NEAR | 01A3 | CSEG | |
| BPERIOD | L NEAR | 0B35 | CSEG | |
| BREAK_STAMP | L WORD | 111C | CSEG | |
| BTIMER0 | L WORD | 1101 | CSEG | |
| BUFFER_HEAD | L WORD | 001A | DSEG | |
| BUFFER_TAIL | L WORD | 001C | DSEG | |
| BUFFULL | L NEAR | 0389 | CSEG | |
| CALAH | L NEAR | 05C9 | CSEG | |
| CAPSET | L NEAR | 005E | CSEG | |
| CAP_BUF | L WORD | 1130 | CSEG | Length =0010 |
| CAP_END | L WORD | 1150 | CSEG | |
| CAP_LEN | L WORD | 112E | CSEG | |
| CAP_TAIL | L WORD | 112C | CSEG | |
| CFC | L NEAR | 04C3 | CSEG | |
| CFD | L NEAR | 04CC | CSEG | |
| CHKBRK | L NEAR | 00C6 | CSEG | |
| CKA | L NEAR | 08F3 | CSEG | |
| CKBEQM | L NEAR | 03A9 | CSEG | |
| CKBSA | L NEAR | 08DF | CSEG | |
| CKDFSP | L NEAR | 0628 | CSEG | |
| CKDIP2 | L NEAR | 0993 | CSEG | |
| CKFCB | L NEAR | 083D | CSEG | |
| CKFCBS | L NEAR | 08AF | CSEG | |
| CKFCC | L NEAR | 08B6 | CSEG | |
| CKFCN | L NEAR | 088B | CSEG | |
| CKFCP | L NEAR | 08C5 | CSEG | |
| CKFCS | L NEAR | 08A0 | CSEG | |
| CKGTA | L NEAR | 0122 | CSEG | |
| CKLE3 | L NEAR | 08D7 | CSEG | |
| CKPERST | L NEAR | 0394 | CSEG | |
| CKPS | L NEAR | 08CC | CSEG | |
| CKREST | L NEAR | 00CD | CSEG | |

| Symbol | Type | Addr | Segment | Length |
|---|---|---|---|---|
| CKSA | L NEAR | 08E6 | CSEG | |
| CKSBS | L NEAR | 08A4 | CSEG | |
| CKSCBS | L NEAR | 0869 | CSEG | |
| CKSCC | L NEAR | 0871 | CSEG | |
| CKSCN | L NEAR | 0854 | CSEG | |
| CKSCP | L NEAR | 0879 | CSEG | |
| CKSCS | L NEAR | 0861 | CSEG | |
| CKZ | L NEAR | 08FF | CSEG | |
| CKZERO | L NEAR | 01EC | CSEG | |
| CMPBM | L NEAR | 03B2 | CSEG | |
| CMPUNCT | L NEAR | 003D | CSEG | |
| CONCAT | L NEAR | 0E78 | CSEG | |
| CONCAT2 | L NEAR | 0E3D | CSEG | |
| CPCB | L NEAR | 09D7 | CSEG | |
| CSECL | L NEAR | 0CC6 | CSEG | |
| CURSOR_POSN | L WORD | 0050 | DSEG | |
| DAP_BUF | L WORD | 1154 | CSEG | Length =0010 |
| DAP_END | L WORD | 1174 | CSEG | |
| DAP_LEN | L WORD | 1152 | CSEG | |
| DAP_TAIL | L WORD | 1150 | CSEG | |
| DISP_ADDR | L WORD | 1103 | CSEG | |
| DISP_KB | L BYTE | 1108 | CSEG | |
| DISP_KEYS | N PROC | 100B | CSEG | Length =001F |
| DMS1 | L NEAR | 0CBA | CSEG | |
| DNG | N PROC | 0FD7 | CSEG | Length =0034 |
| DPG1 | L NEAR | 02FA | CSEG | |
| DPG2 | L NEAR | 030C | CSEG | |
| DPG3 | L NEAR | 031E | CSEG | |
| DPGEND | L NEAR | 032A | CSEG | |
| ENDK79 | L NEAR | 0B02 | CSEG | |
| ENDKBD | L NEAR | 0386 | CSEG | |
| ERROR_BEEP | N PROC | 10D8 | CSEG | Length =0025 |
| FAKE_CAP | L BYTE | 1105 | CSEG | |
| FC1 | L NEAR | 0946 | CSEG | |
| FCB | L NEAR | 0844 | CSEG | |
| FCBSCA | L NEAR | 0931 | CSEG | |
| FCBSCN | L NEAR | 090A | CSEG | |
| FCC | L NEAR | 0C76 | CSEG | |
| FCCSCP | L NEAR | 0D41 | CSEG | |
| FCN | L NEAR | 0893 | CSEG | |
| FCNB | L NEAR | 0884 | CSEG | |
| FCP | L NEAR | 0BCD | CSEG | |
| FIRST_LET | L BYTE | 110F | CSEG | |
| FNDSTEN | L NEAR | 0ECC | CSEG | |
| FULBEEP | L NEAR | 10C7 | CSEG | |
| GCAPS | L NEAR | 01F9 | CSEG | |
| GETEND | L NEAR | 061B | CSEG | |
| GETTRAN | L NEAR | 0F1E | CSEG | |
| GNUM | L NEAR | 01DE | CSEG | |
| GPG | L NEAR | 0B5F | CSEG | |
| GPG1 | L NEAR | 0B84 | CSEG | |
| GPG12 | L NEAR | 0B79 | CSEG | |
| GPG13 | L NEAR | 0B7C | CSEG | |
| GPG8 | L NEAR | 0B9A | CSEG | |
| GPS | L NEAR | 0ABB | CSEG | |
| GPTR | L NEAR | 05A9 | CSEG | |
| GSG | L NEAR | 0949 | CSEG | |
| GSG0 | L NEAR | 09A6 | CSEG | |
| GSG1 | L NEAR | 09BB | CSEG | |
| GSG12 | L NEAR | 0964 | CSEG | |
| GSG13 | L NEAR | 0967 | CSEG | |
| GSG2 | L NEAR | 09BE | CSEG | |
| GSG8 | L NEAR | 09E0 | CSEG | |
| GSMALL | L NEAR | 020A | CSEG | |
| GTXTWRD | N PROC | 109A | CSEG | Length =002D |
| H0 | L NEAR | 0488 | CSEG | |
| H1 | L NEAR | 049E | CSEG | |
| H2 | L NEAR | 04D0 | CSEG | |
| H3 | L NEAR | 04DD | CSEG | |
| H4 | L NEAR | 0596 | CSEG | |

| | | | | |
|---|---|---|---|---|
| H44. . . . . . . . . . . . . . . . . . . | L NEAR | 04A7 | CSEG | |
| HANDBRK. . . . . . . . . . . . . . . . | L NEAR | 0392 | CSEG | |
| HIEND. . . . . . . . . . . . . . . . . | L NEAR | 0795 | CSEG | |
| HILGHT . . . . . . . . . . . . . . . . | L NEAR | 0419 | CSEG | |
| HILI . . . . . . . . . . . . . . . . . | L NEAR | 0770 | CSEG | |
| HILIO. . . . . . . . . . . . . . . . . | L NEAR | 06F5 | CSEG | |
| HILIGHT. . . . . . . . . . . . . . . . | L NEAR | 03DD | CSEG | |
| HILKEND. . . . . . . . . . . . . . . . | L NEAR | 0551 | CSEG | |
| HL_HEAD. . . . . . . . . . . . . . . . | L WORD | 1120 | CSEG | |
| HL_TAIL. . . . . . . . . . . . . . . . | L WORD | 1122 | CSEG | |
| HPOPDI . . . . . . . . . . . . . . . . | L NEAR | 0503 | CSEG | |
| IBKEYS . . . . . . . . . . . . . . . . | L NEAR | 0166 | CSEG | |
| IDPG . . . . . . . . . . . . . . . . . | L NEAR | 02DD | CSEG | |
| IDPS . . . . . . . . . . . . . . . . . | L NEAR | 032B | CSEG | |
| INDEX_PTR. . . . . . . . . . . . . . . | L WORD | 1124 | CSEG | |
| INT_STENO. . . . . . . . . . . . . . . | L WORD | 110C | CSEG | |
| ISKB . . . . . . . . . . . . . . . . . | L NEAR | 0129 | CSEG | |
| JAPS . . . . . . . . . . . . . . . . . | L NEAR | 0866 | CSEG | |
| JBPER. . . . . . . . . . . . . . . . . | L NEAR | 0881 | CSEG | |
| JFCCSCP. . . . . . . . . . . . . . . . | L NEAR | 08C2 | CSEG | |
| JGPG . . . . . . . . . . . . . . . . . | L NEAR | 0907 | CSEG | |
| JKBON. . . . . . . . . . . . . . . . . | L NEAR | 08D4 | CSEG | |
| JMPRET . . . . . . . . . . . . . . . . | L NEAR | 0386 | CSEG | |
| JNTSPCE. . . . . . . . . . . . . . . . | L NEAR | 03DA | CSEG | |
| JPBU . . . . . . . . . . . . . . . . . | L NEAR | 0943 | CSEG | |
| JPRCBF . . . . . . . . . . . . . . . . | L NEAR | 0851 | CSEG | |
| JSUF . . . . . . . . . . . . . . . . . | L NEAR | 08AC | CSEG | |
| K770 . . . . . . . . . . . . . . . . . | L NEAR | 108B | CSEG | |
| K771 . . . . . . . . . . . . . . . . . | L NEAR | 1097 | CSEG | |
| K791 . . . . . . . . . . . . . . . . . | L NEAR | 0ADA | CSEG | |
| K792 . . . . . . . . . . . . . . . . . | L NEAR | 0AEB | CSEG | |
| K801 . . . . . . . . . . . . . . . . . | L NEAR | 0A27 | CSEG | |
| K802 . . . . . . . . . . . . . . . . . | L NEAR | 0A3E | CSEG | |
| K803 . . . . . . . . . . . . . . . . . | L NEAR | 0A36 | CSEG | |
| K804 . . . . . . . . . . . . . . . . . | L NEAR | 0AB8 | CSEG | |
| K805 . . . . . . . . . . . . . . . . . | L NEAR | 0A6F | CSEG | |
| K806 . . . . . . . . . . . . . . . . . | L NEAR | 0A85 | CSEG | |
| K812 . . . . . . . . . . . . . . . . . | L NEAR | 06C8 | CSEG | |
| K813 . . . . . . . . . . . . . . . . . | L NEAR | 0469 | CSEG | |
| KBOFF. . . . . . . . . . . . . . . . . | L NEAR | 0E29 | CSEG | |
| KBON . . . . . . . . . . . . . . . . . | L NEAR | 0E11 | CSEG | |
| KBT. . . . . . . . . . . . . . . . . . | L BYTE | 11AF | CSEG | |
| KB_BUFFER. . . . . . . . . . . . . . . | L WORD | 001E | DSEG | Length =0010 |
| KB_BUFFER_END. . . . . . . . . . . . . | L WORD | 003E | DSEG | |
| KB_CTL . . . . . . . . . . . . . . . . | Number | 0061 | | |
| KB_DATA. . . . . . . . . . . . . . . . | Number | 0060 | | |
| KB_FLAG. . . . . . . . . . . . . . . . | L BYTE | 0017 | DSEG | |
| KB_INT . . . . . . . . . . . . . . . . | F PROC | 0000 | CSEG | Global Length =10FD |
| KEEP_SPACE . . . . . . . . . . . . . . | L BYTE | 1111 | CSEG | |
| KEYBOARD_IO. . . . . . . . . . . . . . | L FAR | E82E | ROM | |
| KEYBRD_END . . . . . . . . . . . . . . | L BYTE | 1500 | CSEG | Global |
| L750 . . . . . . . . . . . . . . . . . | L NEAR | 103E | CSEG | |
| L770 . . . . . . . . . . . . . . . . . | L NEAR | 1060 | CSEG | |
| L771 . . . . . . . . . . . . . . . . . | L NEAR | 1068 | CSEG | |
| LARROWS. . . . . . . . . . . . . . . . | L NEAR | 0DCF | CSEG | |
| LAST_CHAR. . . . . . . . . . . . . . . | L BYTE | 1117 | CSEG | |
| LAST_SPACE . . . . . . . . . . . . . . | L BYTE | 1115 | CSEG | |
| LAST_STENO . . . . . . . . . . . . . . | L BYTE | 1116 | CSEG | |
| LDKBBUF. . . . . . . . . . . . . . . . | N PROC | 102A | CSEG | Length =0049 |
| LK77 . . . . . . . . . . . . . . . . . | L NEAR | 1054 | CSEG | |
| LP1. . . . . . . . . . . . . . . . . . | L NEAR | 10E8 | CSEG | |
| LP2. . . . . . . . . . . . . . . . . . | L NEAR | 10F1 | CSEG | |
| M8 . . . . . . . . . . . . . . . . . . | L NEAR | 0D3B | CSEG | |
| MATCHI . . . . . . . . . . . . . . . . | L NEAR | 063A | CSEG | |
| MB132. . . . . . . . . . . . . . . . . | L NEAR | 0D15 | CSEG | |
| MB133. . . . . . . . . . . . . . . . . | L NEAR | 0CFE | CSEG | |
| MB1330 . . . . . . . . . . . . . . . . | L NEAR | 0CFC | CSEG | |
| MB134. . . . . . . . . . . . . . . . . | L NEAR | 0D00 | CSEG | |
| MC4. . . . . . . . . . . . . . . . . . | L NEAR | 091E | CSEG | |
| MDC. . . . . . . . . . . . . . . . . . | L NEAR | 091C | CSEG | |

| | | | |
|---|---|---|---|
| MDIO . . . . . . . . . . . . . . . | L NEAR | 0D32 | CSEG |
| MEM_POS. . . . . . . . . . . . . . | L WORD | 10FD | CSEG |
| MOVAXSI. . . . . . . . . . . . . . | L NEAR | 060A | CSEG |
| MP00 . . . . . . . . . . . . . . . | L NEAR | 0CDB | CSEG |
| MP01 . . . . . . . . . . . . . . . | L NEAR | 0CDC | CSEG |
| MP31 . . . . . . . . . . . . . . . | L NEAR | 0C9D | CSEG |
| MP315. . . . . . . . . . . . . . . | L NEAR | 0CA0 | CSEG |
| MP32 . . . . . . . . . . . . . . . | L NEAR | 0CA1 | CSEG |
| MS133. . . . . . . . . . . . . . . | L NEAR | 0D0D | CSEG |
| NCAPS. . . . . . . . . . . . . . . | L NEAR | 02A8 | CSEG |
| NDSGEND. . . . . . . . . . . . . . | L NEAR | 0220 | CSEG |
| NKZERO . . . . . . . . . . . . . . | L NEAR | 0299 | CSEG |
| NLDI . . . . . . . . . . . . . . . | L NEAR | 0250 | CSEG |
| NNDEX_PTR. . . . . . . . . . . . . | L WORD | 1126 | CSEG |
| NNSGEND. . . . . . . . . . . . . . | L NEAR | 02CF | CSEG |
| NNUM . . . . . . . . . . . . . . . | L NEAR | 028B | CSEG |
| NOAB . . . . . . . . . . . . . . . | L NEAR | 0219 | CSEG |
| NOABC. . . . . . . . . . . . . . . | L NEAR | 0657 | CSEG |
| NOABN. . . . . . . . . . . . . . . | L NEAR | 02C8 | CSEG |
| NOCAP. . . . . . . . . . . . . . . | L NEAR | 0073 | CSEG |
| NOSHIFT. . . . . . . . . . . . . . | L NEAR | 0057 | CSEG |
| NOTRAN . . . . . . . . . . . . . . | L NEAR | 0B2F | CSEG |
| NO_AB. . . . . . . . . . . . . . . | L BYTE | 112A | CSEG |
| NO_ABN . . . . . . . . . . . . . . | L BYTE | 112B | CSEG |
| NO_LETS. . . . . . . . . . . . . . | L WORD | 1109 | CSEG |
| NSMALL . . . . . . . . . . . . . . | L NEAR | 02B9 | CSEG |
| NTOINDX. . . . . . . . . . . . . . | L NEAR | 022F | CSEG |
| NTQ. . . . . . . . . . . . . . . . | L NEAR | 024A | CSEG |
| NTSPACE. . . . . . . . . . . . . . | L NEAR | 07D1 | CSEG |
| NUMB_LETS. . . . . . . . . . . . . | L WORD | 1128 | CSEG |
| NUM_BREAKS . . . . . . . . . . . . | L BYTE | 110E | CSEG |
| OLD_COUNT. . . . . . . . . . . . . | L BYTE | 1112 | CSEG |
| OLD_MAKE . . . . . . . . . . . . . | L WORD | 1118 | CSEG |
| ONEMAKE. . . . . . . . . . . . . . | L NEAR | 03C8 | CSEG |
| ON_OFF . . . . . . . . . . . . . . | L BYTE | 0001 | BEEP |
| P01. . . . . . . . . . . . . . . . | L NEAR | 0D96 | CSEG |
| P1 . . . . . . . . . . . . . . . . | L NEAR | 0D50 | CSEG |
| P12. . . . . . . . . . . . . . . . | L NEAR | 06A7 | CSEG |
| P13. . . . . . . . . . . . . . . . | L NEAR | 06B1 | CSEG |
| P2 . . . . . . . . . . . . . . . . | L NEAR | 0D6C | CSEG |
| P3 . . . . . . . . . . . . . . . . | L NEAR | 0D6F | CSEG |
| P31. . . . . . . . . . . . . . . . | L NEAR | 0D84 | CSEG |
| P32. . . . . . . . . . . . . . . . | L NEAR | 0D87 | CSEG |
| P4 . . . . . . . . . . . . . . . . | L NEAR | 0DB1 | CSEG |
| P5 . . . . . . . . . . . . . . . . | L NEAR | 0E07 | CSEG |
| PARSEBF. . . . . . . . . . . . . . | L NEAR | 0820 | CSEG |
| PBK0 . . . . . . . . . . . . . . . | L NEAR | 0762 | CSEG |
| PBK12. . . . . . . . . . . . . . . | L NEAR | 077F | CSEG |
| PBK13. . . . . . . . . . . . . . . | L NEAR | 0782 | CSEG |
| PD_TAIL. . . . . . . . . . . . . . | L WORD | 111E | CSEG |
| PER_STENO. . . . . . . . . . . . . | L BYTE | 1107 | CSEG |
| PH0. . . . . . . . . . . . . . . . | L NEAR | 0469 | CSEG |
| PH9. . . . . . . . . . . . . . . . | L NEAR | 059A | CSEG |
| PK99 . . . . . . . . . . . . . . . | L NEAR | 0385 | CSEG |
| PKL01. . . . . . . . . . . . . . . | L NEAR | 0361 | CSEG |
| PKL02. . . . . . . . . . . . . . . | L NEAR | 0376 | CSEG |
| PKL32. . . . . . . . . . . . . . . | L NEAR | 034C | CSEG |
| PKL6 . . . . . . . . . . . . . . . | L NEAR | 0355 | CSEG |
| PL0. . . . . . . . . . . . . . . . | L NEAR | 0677 | CSEG |
| PL1. . . . . . . . . . . . . . . . | L NEAR | 0693 | CSEG |
| PNP. . . . . . . . . . . . . . . . | L NEAR | 069E | CSEG |
| POSSTEN. . . . . . . . . . . . . . | L NEAR | 00AD | CSEG |
| PROCBUF. . . . . . . . . . . . . . | L NEAR | 0EBB | CSEG |
| PS00 . . . . . . . . . . . . . . . | L NEAR | 0DD6 | CSEG |
| PS01 . . . . . . . . . . . . . . . | L NEAR | 0DFE | CSEG |
| PSH0 . . . . . . . . . . . . . . . | L NEAR | 0704 | CSEG |
| PSH12. . . . . . . . . . . . . . . | L NEAR | 0535 | CSEG |
| PSH13. . . . . . . . . . . . . . . | L NEAR | 0538 | CSEG |
| PSH9 . . . . . . . . . . . . . . . | L NEAR | 0797 | CSEG |
| PSL01. . . . . . . . . . . . . . . | L NEAR | 0C44 | CSEG |
| PSL1 . . . . . . . . . . . . . . . | L NEAR | 0BDF | CSEG |

| | | | | |
|---|---|---|---|---|
| PSL2 | L | NEAR | 0C04 | CSEG |
| PSL32 | L | NEAR | 0C2E | CSEG |
| PSL6 | L | NEAR | 0C37 | CSEG |
| PSL7 | L | NEAR | 0C6B | CSEG |
| PSL9 | L | NEAR | 0C76 | CSEG |
| PTCHARB | N | PROC | 1073 | CSEG    Length =0027 |
| PTOINDX | L | NEAR | 0182 | CSEG |
| PTOQ | L | NEAR | 05C0 | CSEG |
| PTQ | L | NEAR | 019D | CSEG |
| PUSHDI | L | NEAR | 0606 | CSEG |
| QUEST | L | NEAR | 098E | CSEG |
| RESET_FLAG | L | BYTE | 1113 | CSEG |
| RETURN | L | NEAR | 10CA | CSEG |
| ROMI | L | FAR | E9A6 | ROM |
| ROMJMP | L | NEAR | 00A8 | CSEG |
| RSETBUF | L | NEAR | 0FB7 | CSEG |
| S132 | L | NEAR | 0460 | CSEG |
| S133 | L | NEAR | 079F | CSEG |
| S1335 | L | NEAR | 07A9 | CSEG |
| S134 | L | NEAR | 07B8 | CSEG |
| S20 | L | NEAR | 0817 | CSEG |
| S30 | L | NEAR | 0EF0 | CSEG |
| S31 | L | NEAR | 0F0D | CSEG |
| S32 | L | NEAR | 0F16 | CSEG |
| SAVE_SCRN | N | PROC | 0F9A | CSEG    Length =003D |
| SEC_LET | L | BYTE | 1110 | CSEG |
| SEC_LETS | L | BYTE | 110B | CSEG |
| SETCAP | L | NEAR | 004D | CSEG |
| SETFCAP | L | NEAR | 0069 | CSEG |
| SETLEN | L | NEAR | 07E3 | CSEG |
| SETRFO | L | NEAR | 00F4 | CSEG |
| SET_CAP | L | BYTE | 1106 | CSEG |
| SHI | L | NEAR | 0711 | CSEG |
| SHLBX | L | NEAR | 097A | CSEG |
| SH_FLAG | L | BYTE | 1114 | CSEG |
| STMAKE | L | NEAR | 00FA | CSEG |
| STOREIT | L | NEAR | 010E | CSEG |
| SUFFIX | L | NEAR | 0E3D | CSEG |
| TIMER0 | L | WORD | 10FF | CSEG |
| TIMER_COUNT | L | BYTE | 0004 | BEEP |
| TIMER_HIGH | L | WORD | 006E | DSEG |
| TIMER_LOW | L | WORD | 006C | DSEG |
| TIME_STAMP | L | WORD | 111A | CSEG |
| TSTFORE | L | NEAR | 0E66 | CSEG |
| TSTNOE | L | NEAR | 0E4B | CSEG |
| UNTRAN | L | NEAR | 0F6B | CSEG |
| YESAB | L | NEAR | 01B2 | CSEG |
| YESABC | L | NEAR | 05D8 | CSEG |
| YESABN | L | NEAR | 025F | CSEG |

Warning  Severe
Errors   Errors
0        0

APPENDIX B

© Copyright 1985
Eric P. Goldwasser

```
d3c20:0 10f
3C20:0000  00 51 00 62 75 61 6C 69-74 79 00 00 51 55 00 22   .Q.buality..QU."
3C20:0010  65 73 74 69 6F 6E 00 40-69 74 65 00 06 6F 74 65   estion.@ite..ote
3C20:0020  01 5A 61 72 74 65 72 00-00 51 55 45 00 22 65 6E   .Zarter..QUE."en
3C20:0030  00 16 74 69 6F 6E 61 69-72 65 00 00 51 55 49   ..tionnaire..QUI
3C20:0040  00 22 65 74 01 DA 64 61-6E 63 65 01 DA 63 6B 00   ."et.Zdance.Zck.
3C20:0050  00 51 55 41 00 32 72 72-65 6C 02 26 6C 69 66 69   .QUA.2rrel.&lifi
3C20:0060  63 61 74 69 6F 6E 01 A0-6E 74 69 74 79 00 00 51   cation. ntity..Q
3C20:0070  55 41 4C 00 72 69 66 79-00 00 57 00 22 65 00 0C   UAL.rify..W."e..
3C20:0080  72 69 74 65 00 36 69 74-68 00 08 6F 75 6C 64 01   rite.6ith..ould.
3C20:0090  5A 61 73 00 4A 68 69 63-68 00 00 57 45 00 22 65   Zas.Jhich..WE."e
3C20:00A0  6B 00 08 72 65 00 08 74-00 2A 69 67 68 74 01 68   k..re..t.*ight.h
3C20:00B0  61 72 00 08 73 74 65 72-6E 00 02 64 64 69 6E 67   ar..stern..dding
3C20:00C0  00 52 6C 6C 00 00 57 45-45 02 56 6B 65 6E 64 00   .Rll..WEE.Vkend.
3C20:00D0  00 57 45 41 00 42 74 68-65 72 00 42 70 6F 6E 01   .WEA.Bther.Bpon.
```

APPENDIX C

© Copyright 1985
Eric P. Goldwasser

```
d3a70:0 cf
3A70:0000  1A 51 57 45 52 54 59 55-49 4F 50 41 53 44 46 47   .QWERTYUIOPASDFG
3A70:0010  48 4A 4B 4C 5A 58 43 56-42 4E 4D 20 00 84 00 01   HJKLZXCVBNM ....
3A70:0020  00 A6 00 7A 01 7F 02 C6-03 20 07 DE 04 7C 0C 54   .&.z...F. .^.|.T
3A70:0030  05 FC 10 C2 06 18 11 14-06 71 12 6E 07 88 16 4E   .|.B.....q.n...N
3A70:0040  08 26 18 3E 09 F9 1F 04-0C 23 26 3A 0F 59 30 15   .&.>.y...#&:.Y0.
3A70:0050  10 AF 34 FB 11 E7 38 BB-12 82 3A 6E 13 3C 3C 8E   ./4{.g8;..:n.<<.
3A70:0060  13 77 3D 23 13 9F 3D 86-14 7E 40 23 14 7F 40 2B   .w=#..=..~@#..@+
3A70:0070  14 80 40 38 16 96 47 67-17 0D 48 CE 18 4B 4C 4C   ..@8..Gg..HN.KLL
3A70:0080  18 EB 4E 23 01 55 20 00-6B 00 0C 03 45 49 41 20   .kN#.U .....EIA
3A70:0090  00 9C 00 29 00 9D 00 3D-00 9E 00 51 00 00 01 4C   ...)...=...Q...L
3A70:00A0  20 00 A5 00 6F 00 06 45-52 49 4F 41 48 20 00 C6    .%.o..ERIOAH .F
3A70:00B0  00 9B 00 DA 00 FC 00 E2-01 16 01 09 01 8B 01 2A   ...Z.|.b.......*
3A70:00C0  01 E8 01 57 02 5B 03 45-41 4C 20 00 D7 00 C6 00   .h.W.[.EAL .W.F.
```

What is claimed is:

1. A method of creating written text consisting of individual words, punctuation marks and spaces formed of symbolic characters and including prescribed linguistic expressions, said method using a digital computer system having a central processing unit, a memory, a character imaging device and a character keyboard capable of sensing keypresses by a system operator that designate respective ones of said characters, each character being identified in said computer system by an associated character code, said method comprising the steps of:

(a) storing in said memory a vocabulary of said linguistic expressions, each linguistic expression comprising at least two characters, each linguistic expression being stored in said vocabulary as a respective first group of character codes;

(b) storing in said memory a vocabulary of keystrokes, each keystroke being associated with at least one linguistic expression and comprising at least two characters, each keystroke being stored in said vocabulary as a respective second group of character codes;

(c) accepting keypresses from said keyboard and storing in said memory, in response to each keypress, a third character code identifying the character designated by that keypress;

(d) determining with respect to each successive keypress whether such successive keypress is associated with one of said stored keystrokes, by determining whether its respective third character code designates, at least in part, a particular keystroke, and (1) if such keypress is determined to be associated with a keystroke then
  (i) identifying such keystroke, and thereby its associated linguistic expression, by retrieving the second character codes of such keystroke; and
  (ii) imaging the characters comprising the associated linguistic expression on said character imaging device using said first character codes which identify such characters, the imaged characters being concatenated with text characters previously imaged on said character imaging device; and (2) if such keypress is determined not to be associated with a keystroke, whereby its respective third character code designates an associated individual character, then imaging the character associated with said keypress, using the third character code which identifies such character, the imaged character being concatenated with text characters previously imaged on said character imaging device.

2. The method defined in claim 1, wherein said symbolic characters designated by said keypresses are alphanumeric characters, including said punctuation marks and a space character.

3. The method defined in claim 2, wherein the second group of character codes corresponding to each linguistic expression includes at least one character of the linguistic expression, and at least one additional alphanumeric character.

4. The method defined in claim 3, wherein said at least one additional alphanumeric character is a space.

5. The method defined in claim 1, wherein sad step of determining whether or not successive keypresses are associated with a keystroke is executed in dependence upon the timing of successive keypresses.

6. The method defined in claim 5, wherein said determining step comprises the steps of:
  (i) identifying the timing of each keypress; and
  (ii) determining whether the respective elapsed time between one or more successive keypresses is within at least one prescribed time window.

7. The method defined in claim 6, wherein said timing of each keypress includes the instant of time that the associated keyboard key is depressed.

8. The method defined in claim 7, wherein said determining step comprises the step of determining whether the elapsed time between the respective instants of time at which the associated keyboard keys are depressed falls within a prescribed time window.

9. The method defined in claim 8, wherein said timing of each keypress includes the instant of time that the associated keyboard key is released.

10. The method defined in claim 9, wherein said determining step comprises the step of determining whether the elapsed time between the respective instants of time at which the associated keys are released falls within a prescribed time window.

11. The method defined in claim 6, wherein said timing of each keypress includes both a first instant of time that the associated keyboard key is depressed and a second instant of time that said key is released.

12. The method defined in claim 11, wherein said determining step comprises the steps of:
  determining whether the respective first instants of time fall within a prescribed first time window; and
  determining whether the respective second instants of time fall within a prescribed second time window.

13. The method defined in claim 11, wherein said determining step comprises the steps of:
  determining whether the respective first and second instants of time, taken with respect to each other, fall outside a prescribed third time window.

14. The method defined in claim 7, wherein said time window is initiated by the first one of said instants of time which occurs after a keyboard key is released.

15. The method defined in claim 6, wherein said at least one prescribed time window is of different length for different keystroke characters.

16. The method defined in claim 6, wherein said at least one prescribed time window is of different length for different users of said digital computer system.

17. The method defined in claim 16, further comprising the steps of
  (A) automatically recording the instants of time of the keypresses over a predetermined period of time; and
  (B) determining from the sequence of said recorded instants of time which time instants of said sequence of recorded time instants are associated with keystrokes stored in said vocabulary of keystrokes and which time instants of said sequence are associated with keypresses that are associated with individual characters; and
  (C) choosing the length of said at least one prescribed time window to be shorter than most of the time intervals between successive time instants of said sequence which are associated with individual keypresses and longer than most of the time intervals between the pairs of time instants associated with the first and last keypresses of keystrokes;
thereby adapting the length of said at least one prescribed time window to a user of said digital computer system.

18. The method defined in claim 5, wherein said determining step comprises the steps of:
  (i) identifying, with respect to each keypress, a first instant of time that the associated keyboard key is depressed and a second instant of time that said key is released; and
  (ii) determining whether all the first instants of time for said successive keypresses precede all the second instants of time.

19. The method defined in claim 1, wherein said imaging step (d)(1) (ii) includes the steps of:
  (i) determining whether a portion of a linguistic expression identified in response to a present keypress determined to be part of a keystroke has previously been imaged in response to keypresses not previously associated with a keystroke;
  (ii) if a portion of the identified linguistic expression has not been imaged, imaging the entire linguistic expression; or
  (iii) if a portion of the identified linguistic expression has been imaged, imaging the remainder of said linguistic expression.

20. The method defined in claim 19, wherein said second group of character codes associated with a linguistic expression includes a code corresponding to a character in said linguistic expression plus a code corresponding to at least one additional alphanumeric character.

21. The method defined in claim 20, wherein said at least one additional alphanumeric character is a space.

22. The method defined in claim 19, wherein said linguistic expressions include suffixes, and wherein step (ii) includes the step of adjusting the spelling of a previously imaged word or the spelling of the suffix, or the spelling of the previously imaged word and the spelling of the suffix, when said linguistic expression is a suffix, to form a correctly spelled word consisting of the adjusted or unadjusted previously imaged word concatenated with the adjusted or unadjusted suffix.

23. The method defined in claim 22, wherein said previously imaged word was itself a linguistic expression which was imaged by means of a keystroke.

24. The method defined in claim 22, wherein said previously imaged word was imaged by means of successive keypresses each of which designated a single character.

25. The method defined in claim 19, wherein said linguistic expression is identified, in part, by the portion thereof previously imaged and also determined, in part, by said present keypress.

26. The method defined in claim 1, wherein said linguistic expression consists of at least one punctuation mark, and wherein said previously imaged text ends with a space character, the step of imaging said at least one punctuation mark concatenated to the last non space character of said previously imaged text.

27. The method defined in claim 1, further comprising the steps of:
  (i) determining whether individual words and phrases entered character by character by the user of said digital computer system are linguistic expressions; and
  (ii) if they are not linguistic expressions, storing said words and phrases in memory along with a counter for each word or phrase which counter is incremented each time the associated word or phrase is used, thereby automatically determining the frequency of usage of said words and phrases; and
  (iii) adopting as new linguistic expressions the words most frequently used by said user by adding most frequently used words and phrases to said vocabulary of linguistic expressions.

28. The method defined in claim 27, wherein said adopting step includes the step of adding an associated keystroke to said vocabulary of keystrokes.

29. The method defined in claim 1, wherein said character imaging device is a display device.

30. The method defined in claim 29, further comprising the step of imaging on said display device an imaged keyboard representation of said character keyboard, with the imaged keyboard characters imaged in the same relative positions as they appear on said character keyboard.

31. The method defined in claim 30, further comprising the step of imaging on said display device a plurality of said linguistic expressions in association with the displayed characters of said keyboard.

32. The method defined in claim 31, wherein each linguistic expression has a character in common with the keyboard character with which it is associated.

33. The method defined in claim 32, wherein said character in common is the initial character of each linguistic expression.

34. The method defined in claim 32, wherein said character in common is a character subsequent to said initial character, and wherein all of the displayed linguistic expressions commence with the same character.

35. The method defined in claim 31, wherein the characters of each displayed linguistic expression which are used in the keystroke associated therewith are displayed in a different manner than the remaining characters of that linguistic expression.

36. The method defined in claim 35, wherein said characters used in said keystrokes are displayed with greater brightness than said remaining characters.

37. The method defined in claim 35, wherein said differently displayed characters include a space, if a space is used in the keystroke associated with the displayed linguistic expression.

38. The method defined in claim 29, wherein the characters of each displayed linguistic expression which are used in the keystroke associated therewith are displayed in the text in a different manner than the remaining characters of that linguistic expression.

39. The method defined in claim 38, wherein said characters used in said keystrokes are displayed with greater brightness than said remaining characters.

40. The method defined in claim 38, wherein said differently displayed characters include a space, if a space is used in the keystroke associated with the displayed linguistic expression.

41. The method defined in claim 30, wherein said keyboard includes a key capable of switching a mode between "on" and "off" states, and wherein said step of imaging a representation of said character keyboard is executed only when said mode is in the "on" state, whereby said word processing system is responsive to the state of said mode for imaging or not imaging, respectively, said representation of said character keyboard.

42. The method defined in claim 29, further comprising the step of imaging on said display device a plurality of said linguistic expressions.

43. The method defined in claim 42, wherein the characters of each displayed linguistic expression which are used in the keystroke associated therewith are displayed in a different manner than the remaining characters of that linguistic expression.

44. The method defined in claim 43, wherein said characters used in said keystroke are displayed with greater brightness than said remaining characters.

45. The method defined in claim 43, wherein said differently displayed characters include a space, if a space is used in the keystroke associated with the displayed linguistic expression.

46. The method defined in claim 1, further comprising the step of storing in said memory a plurality of address codes, each address code being associated with one of said linguistic expressions and designating the address of a corresponding one of said keystrokes; and further comprising the steps of:

(i) identifying such linguistic expressions and thereby its associated address code by means of the first character codes associated with that linguistic expression; and (ii) addressing the keystroke using the address code determined by the identified linguistic expression.

47. The method defined in claim 19, wherein there are at least two keystrokes associated with at least one linguistic expression, a first keystroke for imaging an entire linguistic expression and at least one second, and different keystroke for imaging a remaining portion of a linguistic expression that has previously been partly entered.

48. The method defined in claim 19, further comprising the step of producing an audible sound after at least one character of a linguistic expression has been imaged without use of a keystroke.

49. The method defined in claim 48, wherein said audible sound is at least one beep tone.

50. The method defined in claim 49, wherein the beep tones indicate, by number or pitch, the position in said linguistic expressions of the character or characters of said linguistic expression which are contained in the associated keystroke, after an entire linguistic expression has been imaged.

51. The method defined in claim 48, wherein said audible sound is a synthesized voice pronouncing the character or characters of said linguistic expression which are contained in the associated keystroke after an entire linguistic expression has been imaged.

52. The method defined in claim 1, further comprising the step of responding to a prompt entered into said keyboard by a user immediately after the entry of at least one word, entered character by character, to add said at least one word to as a new entry in said vocabulary of linguistic expressions.

53. The method defined in claim 52, wherein said at least one word is only one word and wherein said prompt is the keystroke comprising a space and a slash.

54. The method defined in claim 52, wherein said prompt is entered into said keyboard in association with the entry of at least two words; wherein said prompt is the keystroke comprising at least one alphanumeric character plus a number; and wherein said at least one alphanumeric character designates the keystroke as being a prompt and said number designates the number of words which are to be added to said vocabulary of linguistic expressions as a single linguistic expression.

55. The method defined in claim 54, further comprising the step of responding to a second prompt entered into said keyboard by the user to change the number of words in said single linguistic expression.

56. The method defined in claim 55, wherein said second prompt includes the depression of a key representing a "+", thereby to indicate the addition of one word to said single linguistic expression.

57. The method defined in claim 55, wherein said second prompt includes the depression of a key representing a "−", thereby to indicate the subtraction of one word from said single linguistic expression.

58. The method defined in claim 52, further comprising the step of responding to a prompt entered into said keyboard by a user to define a new keystroke associated with said at least one word which has been added to said vocabulary of linguistic expressions.

59. The method defined in claim 52, further comprising the step of automatically selecting, via a predetermined algorithm, a new keystroke associated with said new entry which has been added to said vocabulary of linguistic expressions.

60. The method defined in claim 59, wherein said new entry includes only one word and wherein said new keystroke comprises the first letter of said word plus a number character.

61. The method defined in claim 60, further comprising the step of responding to a prompt from the user to display said words which have been added to said vocabulary of linguistic expressions.

62. The method defined in claim 59, wherein said new entry is at least two words, and wherein said new keystroke comprises the first letter of the first word, a space, and a number character.

63. The method defined in claim 59, wherein said new entry is at least two words, and wherein said new keystroke comprises the first letters of each of said at least two words.

64. The method defined in claim 30, wherein the characters of a keystroke associated with a linguistic expression, displayed as keyboard characters on said imaged keyboard, are imaged in a different manner from the other characters on said imaged keyboard, when said linguistic expression is entered character by character without the aid of said keystroke.

65. The method defined in claim 1, further comprising the step of responding to a prompt entered into said keyboard by a user plus the entry of a linguistic expression, to delete such linguistic expression from said vocabulary of linguistic expressions.

66. The method defined in claim 1, further comprising the step of storing in said memory a plurality of address codes, each address code being associated with one of said keystokes and designating the address of a coresponding one of said linguistic expressions; and wherein said retrieving step includes the steps of:
(i) identifying such keystroke and thereby its associated address code by means of the second character codes associated with that keystroke; and
(ii) addressing the linguistic expression using the address code determined by the identified keystroke.

67. The method defined in claim 1, wherein said step of determining whether or not successive keypresses are associated with a keystroke comprises the steps of determining the presence or absence of at least one predetermined delimiter character at the beginning or end of said successive keypresses.

68. The method defined in claim 67, wherein a space is one of said predetermined delimiter characters.

69. The method defined in claim 1, wherein said step of determining whether or not successive keypresses are associated with a keystroke comprises the step of determining whether said successive keypresses are present, as a group, in a dictionary of stored groups of keypresses.

70. The method defined in claim 1, wherein said step of determining whether or not successive keypresses are associated with a keystroke comprises the step of determining the presence or absence of a particular sequence of keypresses at the beginning or end of said successive keypresses.

71. The method defined in claim 1 wherein said imaging step include the steps of:
(I) storing the characters to be imaged in said memory; and
(II) subsequently imaging said characters on said imaging device.

72. The method defined in claim 1, wherein said imaging device is a hard copy printer.

73. The method defined in claim 1, wherein each linguistic expression includes alphanumeric characters defining at least one word plus a space character which immediately follows said at least one word.

74. A text input method for a word processing system using a digital computer having a central processing unit, a memory, a character keyboard for entering alphanumeric characters into said computer and a display device for imaging said characters, said method comprising the steps of:
(a) storing in said memory a dictionary of correctly spelled words, each word consisting of a plurality of characters, each character identified by a first group of character codes;
(b) accepting keypresses from said keyboard and storing in said memory, in response to each keypress, a second character code identifying the character designated by that keypress;
(c) imaging on said display device the characters corresponding to the accepted keypresses, each displayed character corresponding to one of said second character codes;
(d) imaging on said display device one or more words stored in said dictionary commencing with the sequence of imaged characters, the characters of said words being identified by respective ones of said first character codes; and
(e) updating said imaged words on the display as additional keypresses indicative of further sequential characters are accepted.

75. The method defined in claim 74, wherein step (a) includes the step of storing an index for said dictionary and wherein step (d) includes the step of using said index to point to the section of said dictionary where the words commencing with the characters that the user has entered are stored, after each character that the user enters, thereby to advance through said index as each character is entered to permit quick identification of the location in said dictionary of the words which are to be displayed after the next keypress.

76. The method defined in claim 74, further comprising the step of producing an error identification signal such as a screen image or a beep sound to the user if there are no words in said dictionary commencing with said displayed characters that the user has entered.

77. The method defined in claim 74, wherein said displayed characters form root words, said method further comprising the step of adjusting the spelling of said root word or of an entered suffix, in response to the entry of such suffix for said root word, thereby to form a correctly spelled "suffixed" form of said root word.

78. The method defined in claim 74, wherein said keyboard includes a key capable of switching a mode between "on" and "off" states, and wherein step (d) is executed only when said mode is in the "on" state, whereby said word processing system is responsive to the state of said mode for switching in and out of said spelling help method.

79. The method definedin claim 74, further comprising the step of imaging on said display device a representation of said character keyboard, with the keyboard characters imaged in the same relative positions as they appear on said keyboard.

80. The method defined in claim 79, further comprising the step of imaging on said display device a plurality of said correctly spelled words in association with the displayed characters of said keyboard.

81. The method defined in claim 80, wherein each displayed word has a character in common with the keyboard character with which it is associated.

82. The method defined in claim 81, wherein said character in common is the initial character of each displayed word.

83. The method defined in claim 81, wherein said character in common is a character subsequent to said initial character, and wherein all of said displayed words commence with the same character or characters.

84. A method of creating written text consisting of individual words formed of symbolic characters, said method using a computer having a memory, text entry means and means for imaging text, said method comprising the steps of:
  (a) receiving symbolic characters from said text entry means, wherein individual ones of said symbolic characters received upon operation of said text entry means by an operator of said computer are interpreted by said computer as individual symbolic characters to be added to said text or as commands directing said computer to access words to be so added from a dictionary of stored words, said symbolic characters and said words forming a line of text to be imaged by said text imaging means;
  (b) determining whether at least one symbolic character representing a suffix has been received;
  (c) if at least one symbolic character representing a suffix has been received, adjusting the spelling of the word which was received immediately prior to said character, or the suffix itself, to form a correctly spelled word consisting of said suffix concatenated to said word; and
  (d) imaging said correctly spelled word concatenated to the end of said line of text.

85. The method defined in claim 84, wherein said determining step includes the steps of:
  (1) storing in said memory a dictionary of symbolic characters representing suffixes;
  (2) comparing received symbolic characters with the symbolic characters in said dictionary.

86. The method defined in claim 84, further comprising the steps of:
  (1) storing in said memory a dictionary of symbolic characters representing frequently used words and, in association with each of said words, a suffix template indicative of the correct spelling of the forms of said respective words which forms are formed by combining said words with the suffixes associated with said suffix templates;
  (2) if a suffix has been received, retrieving the suffix template associated with the word received prior to said suffix; and
  (3) adjusting the spelling of the suffixed form of said word in accordance with said template.

87. The method defined in claim 86, wherein a pointer is stored in said memory following the symbolic characters representing each word, said pointer indicating the location of the suffix template associated with the respective word.

88. The method defined in claim 86, wherein said suffix template consists of at least one byte, at least some of the bits of said byte indicating whether respective ones of said suffixes are to be added to said word without change in spelling of either said word or said suffix.

89. The method defined in claim 84, wherein said symbolic characters are alphanumeric characters.

90. The method defined in claim 84, wherein said symbolic characters include at least one special character which indicates that a suffix is being entered, and wherein said determining step includes the step of determining whether said special character has been received.

91. The method defined in claim 90, wherein said special character is a slash ("/").

92. The method defined in claim 84, wherein said symbolic characters represent frequently used suffixes in abbreviated form, thereby to reduce the time required for entering a suffix using said text entry means.

93. The method defined in claim 84, wherein said symbolic characters represent frequently used words in abbreviated form, thereby to reduce the time required for entering a word using said text entry means.

94. The method defined in claim 93, wherein the representation of said symbolic characters is dependent upon the respective instants of time that said symbolic characters are received.

95. The method defined in claim 94, wherein said text entry means is a keyboard, having a plurality of keys, and wherein said instants of time include the instants that individual ones of said keys are depressed.

96. The method defined in claim 95, wherein said instants of time further include the instants that individual ones of said keys are released.

97. The method of claim 74, comprising the further step (f) of indicating on said display device the additional keys to be pressed to cause one of said imaged words to be selected and concatenated to previously input text.

* * * * *